(12) United States Patent
Goto et al.

(10) Patent No.: US 8,378,044 B2
(45) Date of Patent: Feb. 19, 2013

(54) LIVING RADICAL POLYMERIZATION METHOD USING ALCOHOL AS CATALYST

(75) Inventors: Atsushi Goto, Gokasho Uji (JP); Takeshi Fukuda, Gokasho Uji (JP); Yoshinobu Tsujii, Gokasho Uji (JP)

(73) Assignee: Kyoto University, Kyoto-shi, Kyoto (JP)

( * ) Notice: Subject to any disclaimer, the term of this patent is extended or adjusted under 35 U.S.C. 154(b) by 41 days.

(21) Appl. No.: 12/991,838

(22) PCT Filed: Feb. 6, 2009

(86) PCT No.: PCT/JP2009/052115
§ 371 (c)(1),
(2), (4) Date: Feb. 4, 2011

(87) PCT Pub. No.: WO2009/136510
PCT Pub. Date: Nov. 12, 2009

(65) Prior Publication Data
US 2011/0124832 A1    May 26, 2011

(30) Foreign Application Priority Data

May 9, 2008  (JP) .................................. 2008-123817

(51) Int. Cl.
*C08F 2/00*       (2006.01)
*C08F 210/00*     (2006.01)
*C07D 473/00*     (2006.01)
*C07D 311/00*     (2006.01)
*C07F 15/00*      (2006.01)
*C07C 49/00*      (2006.01)
*C07C 41/00*      (2006.01)
*C07C 255/00*     (2006.01)

(52) U.S. Cl. ........ 526/204; 526/210; 526/348; 544/265; 549/400; 549/408; 568/300; 568/379; 568/650; 568/706; 568/716; 558/423

(58) Field of Classification Search .................. 526/204, 526/210, 348; 544/265; 549/400, 408; 568/300, 568/379, 650, 706, 716; 558/423
See application file for complete search history.

(56) References Cited

U.S. PATENT DOCUMENTS
2002/0010294 A1*   1/2002  Nakai et al. .................. 526/204

FOREIGN PATENT DOCUMENTS
JP      47-13366       4/1972
WO   WO 2008/139980 A1   11/2008

OTHER PUBLICATIONS

Ando et al., "Amino Alcohol Additives for the Fast Living Radical Polymerization of Methyl Methacrylate with RuCl$_2$(PPh$_3$)$_3$," *Journal of Polymer Science, Part A: Polymer Chemistry* 41(22): 3597-3605, 2003.

*Primary Examiner* — William Cheung
(74) *Attorney, Agent, or Firm* — Seed IP Law Group PLLC

(57) ABSTRACT

Provided is a low-cost, environmentally friendly living radical polymerization catalyst having high activity. The catalyst is used for a living radical polymerization method, and contains a central element consisting of oxygen and at least one halogen atom bound to the central element. Furthermore, an alcohol compound can be used as a catalyst precursor. By polymerizing a monomer in the presence of the catalyst, a polymer having narrow molecular weight distribution can be obtained, and the cost of the living radical polymerization can be remarkably reduced. The present invention is significantly more environmentally friendly and economically excellent than conventional living radical polymerization methods, due to advantages of the catalyst such as low toxicity of the catalyst, low amount of the catalyst necessary, high solubility of the catalyst, mild reaction conditions, and no coloration/no odor (which do not require a post-treatment for a molded article), and the like.

14 Claims, 10 Drawing Sheets

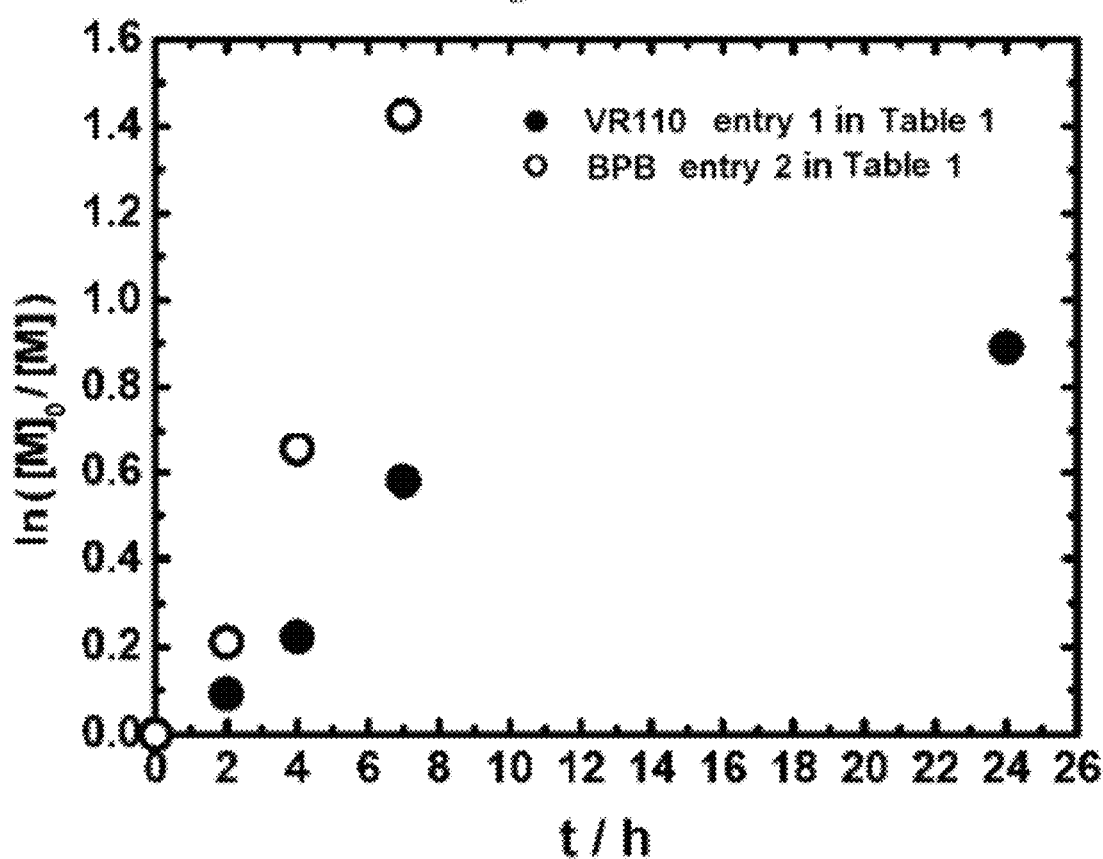

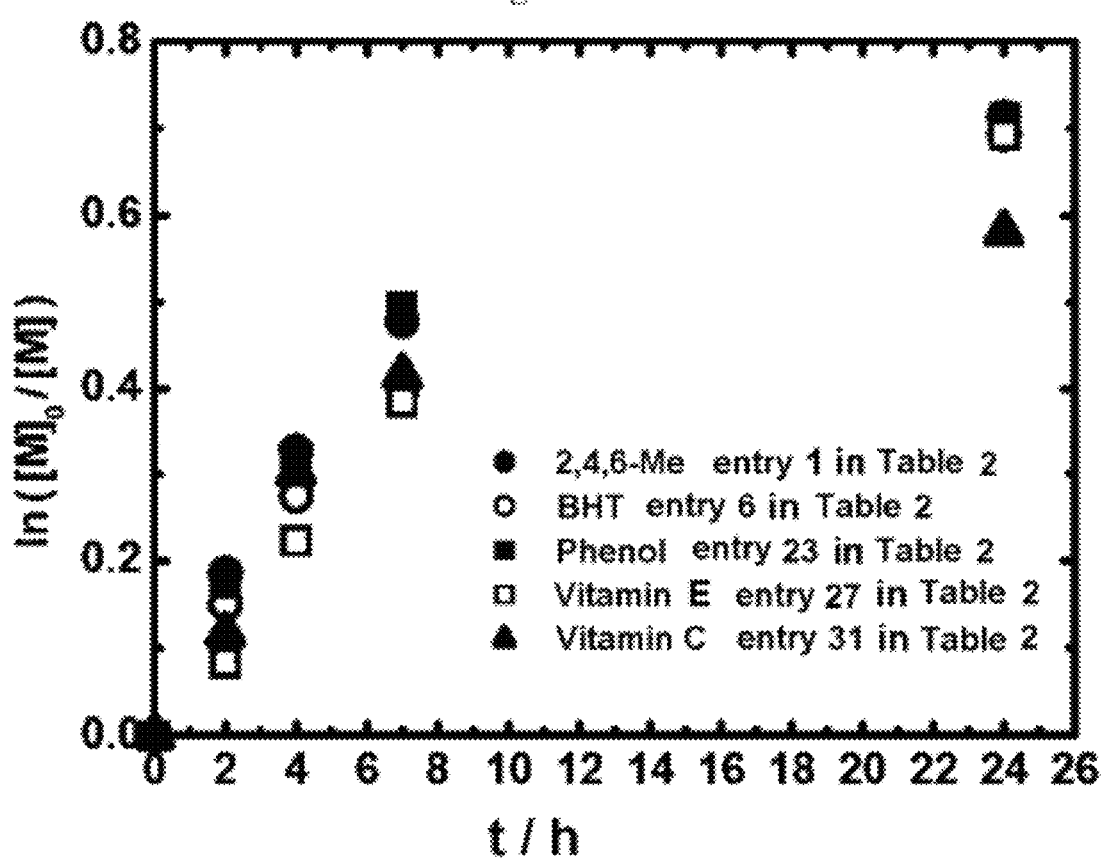

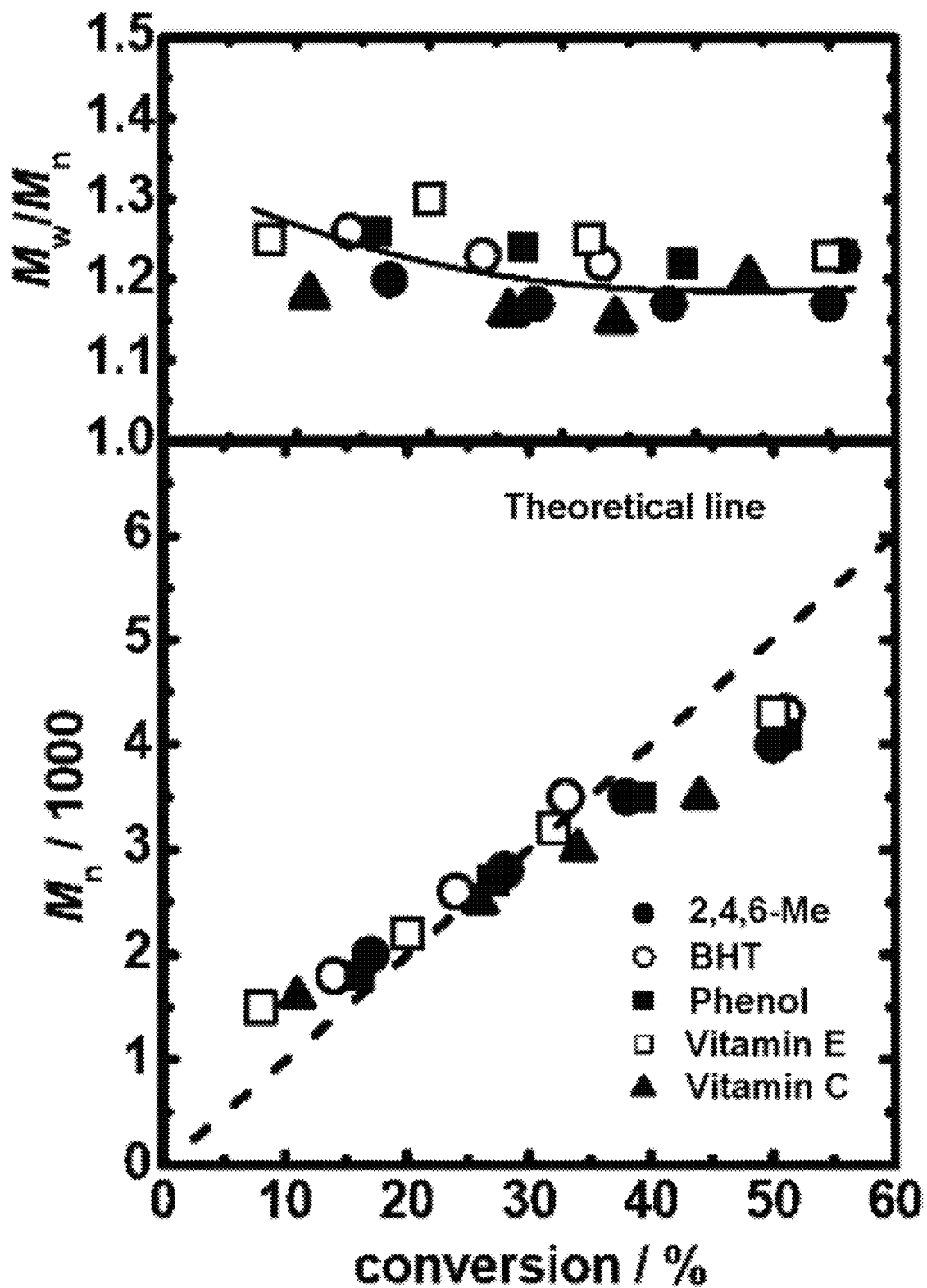

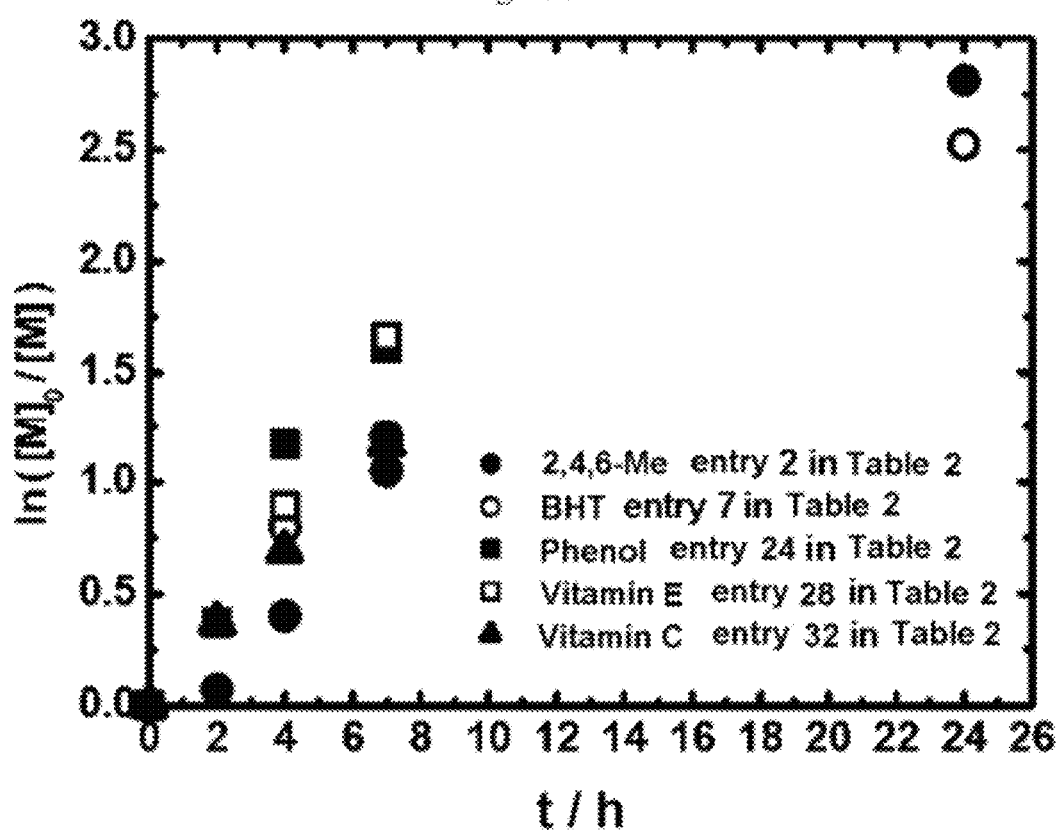

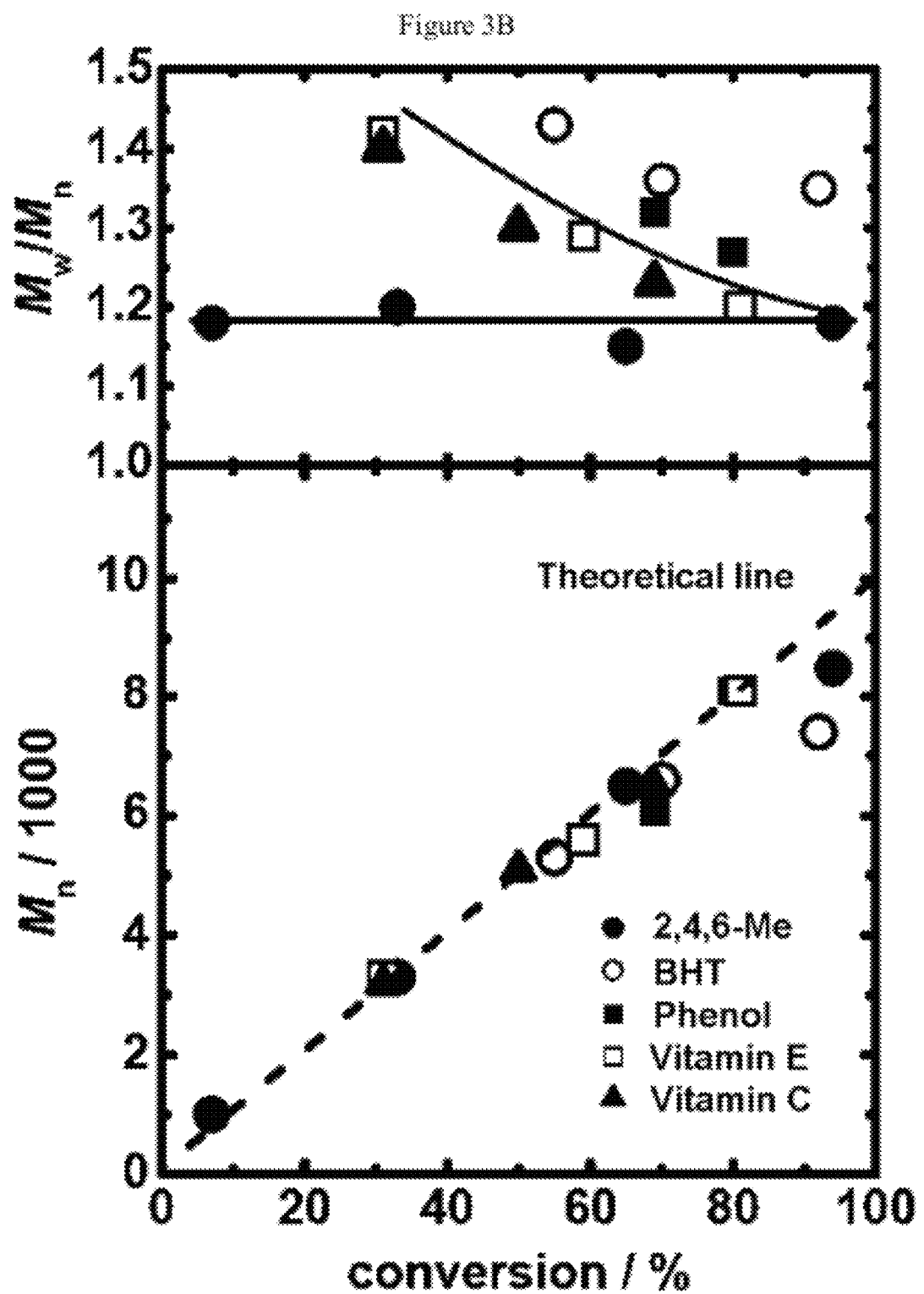

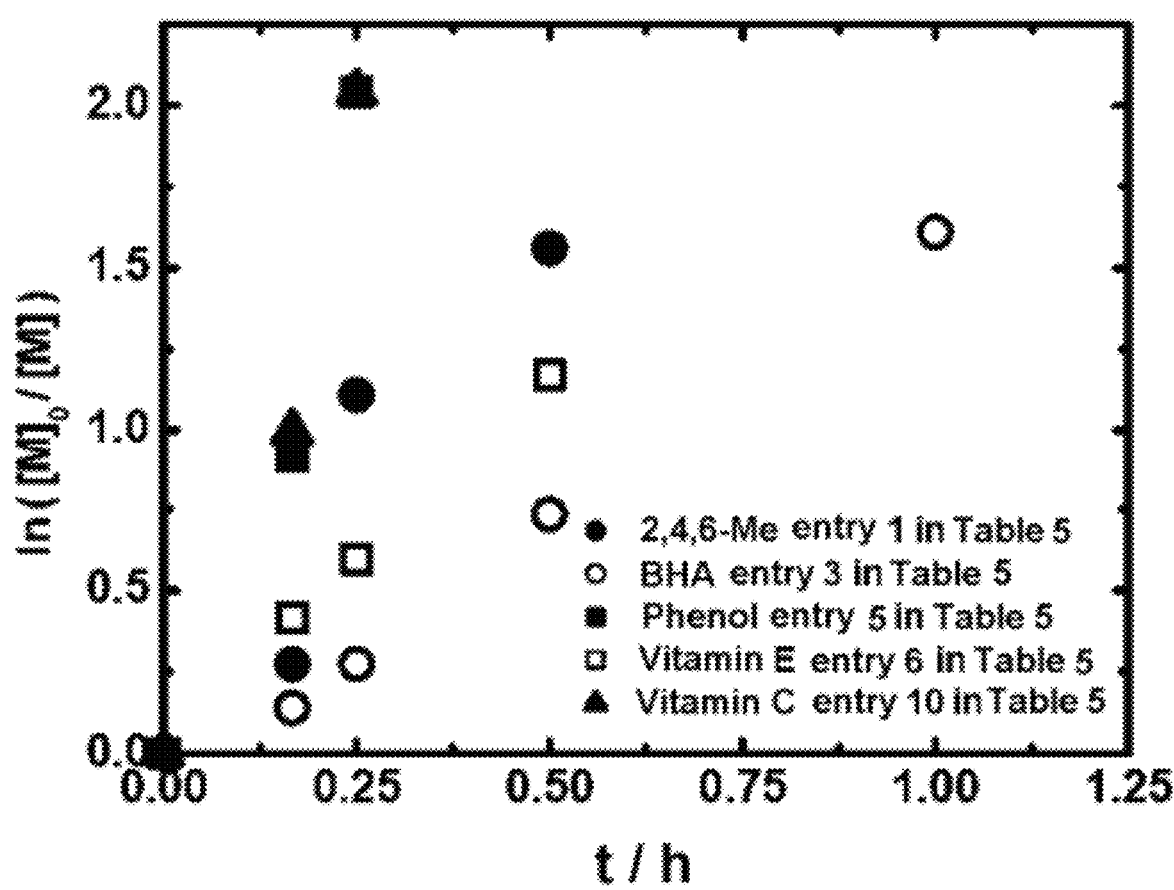

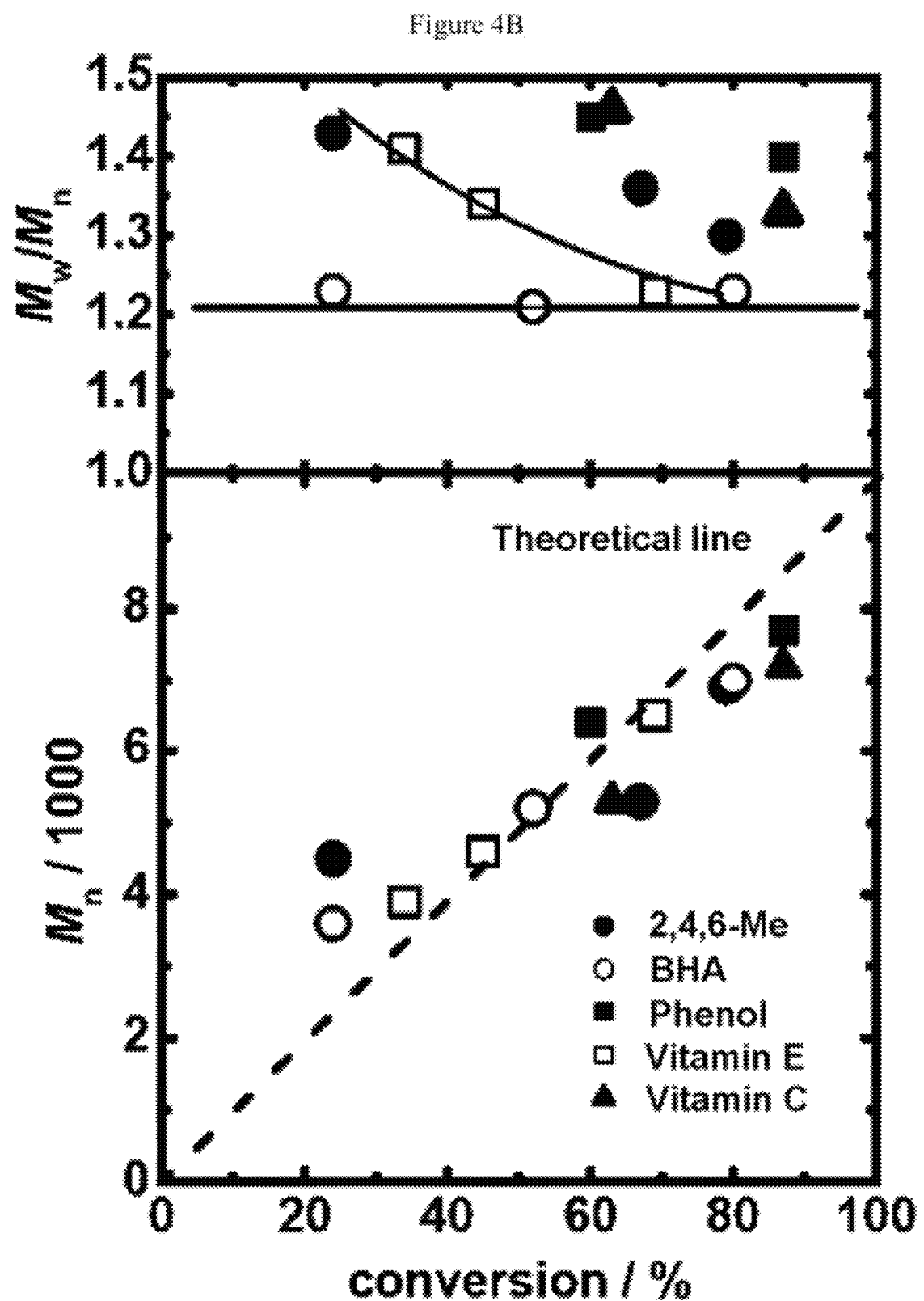

Figure 5
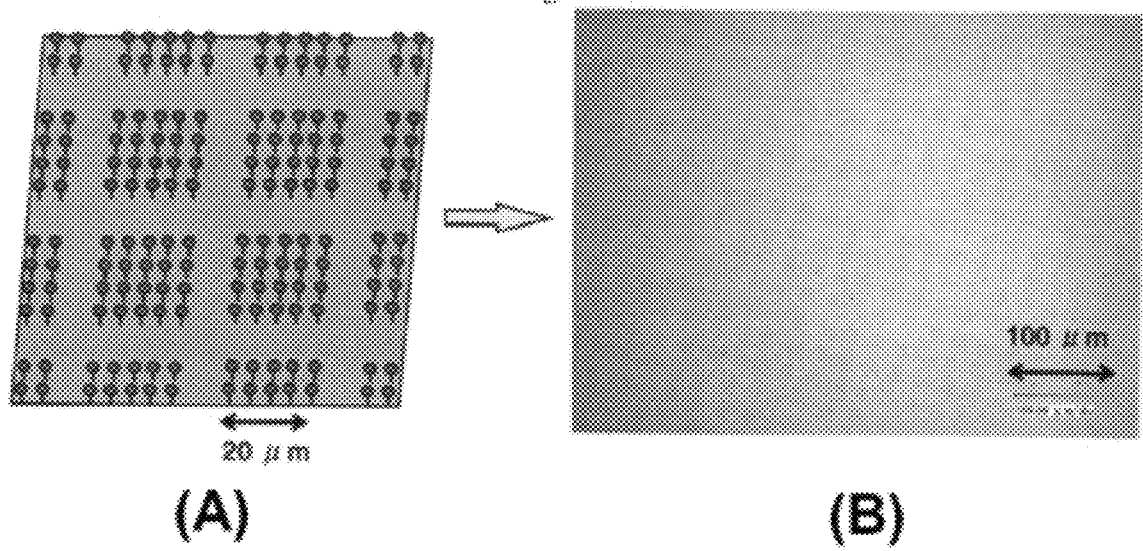
(A)   (B)
[Figure 6]
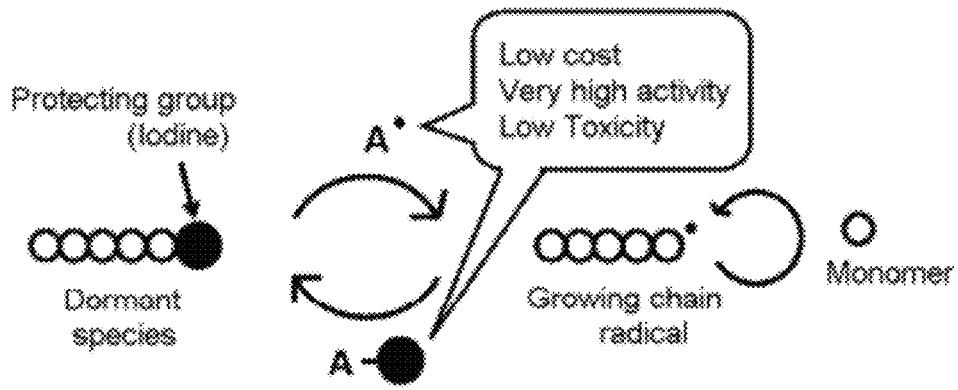

LIVING RADICAL POLYMERIZATION METHOD USING ALCOHOL AS CATALYST

This application is a National Stage of PCT International Application No. PCT/JP2009/052115, filed Feb. 6, 2009, which claims priority under 35 U.S.C. Section 119 to Japan Patent Application No. 2008-123817, filed May 9, 2008, the entire disclosures of which are herein expressly incorporated by reference.

TECHNICAL FIELD

The present invention is directed to a highly active catalyst, which is used in a living radical polymerization method, and a polymerization method using the catalyst.

More specifically, the present invention uses a catalyst having oxygen as a central element in a living radical polymerization method.

BACKGROUND ART

A radical polymerization method has been a well-known method for polymerizing vinyl monomers to obtain a vinyl polymer. Generally, a radical polymerization method has the disadvantage of the difficulty in controlling the molecular weight of the obtained vinyl polymer. Further, there is the disadvantage that the obtained vinyl polymer is a mixture of compounds having various molecular weights, and thus it is difficult to obtain a vinyl polymer having narrow molecular weight distribution. Specifically, even if the reaction is controlled, the ratio of weight-average molecular weight ($M_w$) and number-average molecular weight ($M_a$), ($M_w/M_n$), can be only reduced to about 2 to 3.

As a method for eliminating the aforementioned disadvantages, since around 1990, a living radical polymerization method has been developed. Specifically, according to the living radical polymerization method, it is possible to control the molecular weight. It is also possible to obtain a polymer having narrow molecular weight distribution. Specifically, a polymer having $M_w/M_n$ of 2 or less can easily be obtained. Therefore, this method has come into the limelight as a method for producing a polymer used in a high technology such as nanotechnology.

Catalysts which are currently used in living radical polymerization methods include transition metal complex-type catalysts.

For transition metal complex-type catalysts, complexes in which a ligand is coordinated to a compound having a central metal of Cu, Ni, Re, Rh, Ru, or the like have been used. Such catalysts are described in the following documents for example.

Patent document 1 (Japanese Laid-open Publication No. 2002-249505) discloses that a complex with a central metal which is Cu, Ru, Fe, Ni or the like, and it is used as a catalyst.

It should be noted that Patent Document 1 describes in its claim 1 that an organic halide is used as a polymerization initiator. This description is not intended to mean that a halogenated hydrocarbon acts as a catalyst for living radical polymerization. According to the invention of Patent Document 1, a metal complex having a transition metal as the central metal is used as the catalyst for living radical polymerization. According to the invention of Patent Document 1, an organic halide is used as a dormant species that will be described later in the present specification.

Patent document 2 (Japanese Laid-open Publication No. 11-322822) discloses that hydrido rhenium complex is used as a catalyst.

It should be noted that Patent Document 2 describes a "catalyst for radical living polymerization comprising a combination of a hydrido rhenium complex and a halogenated hydrocarbon" in claim 1. This description is not intended to mean that a halogenated hydrocarbon acts as a catalyst for living radical polymerization. According to the invention of Patent Document 2, the hydrido rhenium complex is used as the catalyst for living radical polymerization. According to the invention of Patent Document 2, the halogenated hydrocarbon is used as a dormant species that will be described later in the present specification. The combination of the catalyst and the dormant species is described as a catalyst in Patent Document 2, and this does not describe that the halogenated hydrocarbon serves as the catalyst for living radical polymerization.

Non-patent document 1 (Journal of The American Chemical Society 119:674-680 (1997)) discloses that a compound in which 4,4'-di-(5-nonyl)-2,2'-bipyridine is coordinated with copper bromide, is used as a catalyst.

It should be noted that Non-Patent Document 1 describes that 1-phenylethyl bromide was used at the time of polymerization of styrene. That is, according to the invention of Patent Document 2, a copper bromide complex is used as a catalyst for living radical polymerization, and 1-phenylethyl bromide is used as the dormant species that will be described later in the present specification.

However, when such transition metal complex catalysts are used, it is necessary to use a large amount of the catalyst. This is disadvantageous as it is not easy to completely remove the large amount of the catalyst used, from the products after the reaction. Another disadvantage is environmental problems which may occur by the disposal of the catalyst. The transition metal for the living radical polymerization method includes many toxic metals. The disposal of a large amount of such toxic metals causes environmental problems. Furthermore, there are cases where toxicities of catalysts remaining in products cause environmental problems. Due to the toxicity, it is difficult to use the transition metal catalysts for the production of food packages, material for living body, and medical material. Additionally, there is a problem associated with a high electroconductivity of the transition metal remaining in polymer, rendering the polymer conductive and hence unsuitable for use in electronic material such as resist material. Furthermore, the transition metal-type catalysts do not dissolve in a reaction solution unless they form a complex. Therefore, it is necessary to use a ligand as an additive to form a complex. This causes problems, i.e., an increase of the cost of production and also an increase of the total weight of the catalyst used. Further, a ligand is usually expensive and requires a complicated synthesis method. Furthermore, the polymerization reaction requires a high temperature (for example, 110° C. or higher). (For example, in aforementioned Non-patent document 1, the polymerization reaction is performed at 110° C.).

It is noted that a living radical polymerization methods, which do not require a catalyst, have also been known. For example, a nitroxyl-type method and dithioester-type method have been known. However, these methods have the following disadvantages. A special protecting group (i.e., a certain nitroxide or dithioester group) must be introduced to the polymer growing chain. The protecting group is very expensive. Further, the polymerization reaction requires a high temperature (for example, 100° C. or higher). Further, the produced polymer is likely to have undesirable properties. For example, the produced polymer is likely to be colored differently from the natural color of the polymer. Further, the produced polymer is likely to have an odor.

On the other hand, Non-Patent Document 2 (Polymer Preprints 2005, 46(2), 245-246) and Patent Document 3 (Japanese Laid-open Patent Publication No. 2007-92014) disclose that compounds having Ge, Sn and the like as central metals are used as catalysts.

In regard to the copper complex catalyst described in Non-Patent Document 1, the cost for the catalyst required to polymerize 1 kg of a polymer sums up to approximately several thousand yens. On the other hand, in regard to a germanium catalyst, the cost is cut down to about one thousand yens. Thus, the invention of Non-Patent Document 2 markedly decreases the cost for the catalyst. However, in order to apply living radical polymerization to general-purpose resin products and the like, a further less expensive catalyst is demanded.

In general, it is known that transition metals or compounds of transition metal elements are preferable as catalysts for various chemical reactions. For example, the following is described on page 311 of "Inorganic Chemistry" by J. D. LEE (Tokyo Kagaku Dojin, edition published on Apr. 15, 1982): "Many transition metals and the compounds of the transition metals have catalytic action . . . in some cases, a transition metal may adopt various valences and form unstable intermediate compounds, while in other cases, a transition metal provides good reaction surfaces, and these serve as catalytic actions." That is, it has been widely understood by those skilled in the art that the properties characteristic to transition metals, such as the ability to form various unstable intermediate compounds, are indispensable in connection with the function of a catalyst.

Furthermore, Ge, Sn and Sb described in Non-Patent Document 2 are not transition metals, but are elements that belong to the $4^{th}$ period and the $5^{th}$ period of the Periodic Table and have large atomic numbers and have a large number of electrons and a large number of electron orbitals. Therefore, it is surmised in regard to Ge, Sn and Sb that the fact that these atoms have a large number of electrons and a large number of electron orbitals, works advantageously in terms of their action as catalysts.

According to such a common technological knowledge in connection with various catalysts of the prior art, it has been believed that the typical elements which belong to the $2^{nd}$ period and the $3^{rd}$ period of the Periodic Table, merely have a small number of electrons and a smaller number of electron orbitals, and thus it is disadvantageous to use them in a catalyst compound, and catalytic action cannot be expected from compounds utilizing these typical elements.

Furthermore, Non-patent document 3 discloses a catalyst using a phosphorus compound, but does not describe the use of oxygen, which has a different electron configuration and significantly different characteristics from phosphorus, as a central element.

[Patent document 1] Japanese Laid-open Patent Publication No. 2002-249505

[Patent document 2] Japanese Laid-open Patent Publication No. 11-322822

[Patent document 3] Japanese Laid-open Patent Publication No. 2007-92014

[Non-patent document 1] Journal of the American Chemical Society 119, 674-680 (1997)

[Non-patent document 2] Polymer Preprints 2005, 46(2), 245-246, "Germanium- and Tin-Catalyzed Living Radical Polymerizations of Styrene," American Chemical Society, Division of Polymer Chemistry

[Non-patent document 3] Polymer Preprints 2007, 56(2), 2452, "A Novel Living Radical Polymerization using Germanium and Phosphorus Compound," The Society of Polymer Science, Japan, 56th Symposium on Macromolecules

DISCLOSURE OF THE INVENTION

Problems to be Solved by the Invention

The present invention aims to solve the aforementioned problems. The objective of the present invention is to provide a catalyst having high activity for use in a living radical polymerization, and a method of polymerization using the catalyst.

Means for Solving the Problems

The present inventors earnestly conducted research to solve the above-mentioned problems and, have accomplished the present invention as a result. Specifically, according to the present invention, the following catalyst and polymerization methods are provided, and thereby the aforementioned problems are solved.

(1) A method of conducting a living radical polymerization, comprising:

reacting a radical generated from a radical initiator and a catalyst precursor compound to form an activated radical; and polymerizing a monomer having a radical reactive unsaturated bond using the activated radical to obtain a polymer, wherein the precursor compound comprises at least one hydroxyl group bound to carbon, silicon, nitrogen, or phosphorus, a radical generated from the radical initiator abstracts a hydrogen atom from the hydroxyl group in the precursor compound to form the activated radical, and the activated radical acts as a living radical catalyst of the polymerization reaction of the monomer.

(2) The method according to the above item 1, wherein an atom bound to the hydroxyl group is carbon.

(3) The method according to the above item 1 or 2, wherein the carbon atom bound to the hydroxyl group has a double bond or triple bond between the carbon atom and an adjacent carbon atom, and an activated radical formed after the hydrogen of the hydroxyl group is abstracted is stabilized by the resonance between the radical and the double bond or triple bond.

(4) The method according to any one of the above items 1 to 3, wherein the catalyst precursor compound is alcohol or phenol represented by the formula (I):

$$R^1{}_n(OH)_m \qquad (I)$$

wherein $R^1$ is substituted or unsubstituted and saturated or unsaturated alkyl, alkenyl, or alkynyl, substituted or unsubstituted aryl, or substituted or unsubstituted heteroaryl;

n is a positive integer;

m is a positive integer;

wherein the substituent is alkyl, alkenyl, alkylcarboxyl, haloalkyl, alkylcarbonyl, amino, cyano, alkoxy, aryl, or alkyl-substituted aryl;

a carbon chain in $R^1$ has a chain structure or cyclic structure; and when $R^1$ has a cyclic structure, the cyclic structure may be a fused cyclic structure in which one or more rings are fused to an aryl or heteroaryl ring, wherein one or more cyclic structures fused to the aryl or heteroaryl ring may be a heterocycle containing an oxygen or nitrogen atom as a heteroatom.

(5) A catalyst for a living radical polymerization method, which consists of a compound comprising at least one central element consisting of oxygen, a halogen atom that is bound to the central element, and a carbon atom that is bound to the central element.

(6) The catalyst according to the above item 5, wherein the central element is bound to a halogen atom and a carbon atom.

(7) The catalyst according to the above item 5, wherein the catalyst has a structure in which an atom bound to the central element has a double bond or triple bond between the atom and an adjacent atom, and an activated radical formed after the halogen atom bound to the central element is eliminated is stabilized by the resonance between the radical and the double bond or triple bond.

The catalyst according to the above item 5, which consists of a compound of the following general formula (Ia):

wherein
$R^1$ is alkyl, alkylcarboxyl, haloalkyl, alkylcarbonyl, alkenyl, alkynyl, aryl, heteroaryl, substituted aryl, or substituted heteroaryl,
n is a positive integer;
m is a positive integer;
$X^1$ is halogen.

(9) The catalyst according to any one of the above items 5 to 8, wherein the halogen is iodine or bromine.

(10) The catalyst according to any one of the above items 5 to 9, wherein the halogen is iodine.

(11) A polymerization method comprising conducting a living radical polymerization, wherein the living radical polymerization step is conducted in the presence of the catalyst according to any one of the above items 5 to 10.

(12) The method according to any one of the above items 1 to 4 and 11, wherein a concentration of the catalyst in a reaction solution is 0.75 wt % of less.

(13) The method according to any one of the above items 1 to 4, 11 and 12, wherein a reaction temperature is 20 to 100° C.

(14) The method according to any one of the above items 1 to 4 and 11 to 13, wherein the living radical polymerization reaction is conducted in the presence of an organic halide having a carbon-halogen bond.

(15) The method according to the above item 14, wherein two or three carbon atoms are bound to the carbon atom to which the halogen in the organic halide is bound.

According to the present invention, further, the following methods are provided.

(16) A method of conducting a living radical polymerization, comprising a step of conducting a radical polymerization reaction of a monomer having a radically reactive unsaturated bond, in the presence of an organic halide having a carbon-halogen bond and the catalyst according to the above item 5.

According to this method, for example, in the method according to the above items 1 to 4 or 11 to 13, the radical polymerization reaction is conducted in the presence of an organic halide having a carbon-halogen bond in addition to the catalyst.

(17) A method according to the above item 16, wherein the organic halide having carbon-halogen bond is a compound having the following general formula (II):

wherein
$R^2$ and $R^3$ are independently halogen, hydrogen, or alkyl, $R^4$ is halogen, hydrogen, alkyl, aryl, or cyano, $X^2$ is halogen, and the monomer having radically reactive unsaturated bond is selected from the following monomers:

(meth)acrylic acid ester monomers, aromatic unsaturated monomers (styrene-type monomers), carbonyl group-containing unsaturated monomers, (meth)acrylonitrile, (meth)acrylamide-type monomers, diene-type monomers, vinyl ester monomers, N-vinyl monomers, (meth)acrylic acid monomer, vinyl halide monomers, and 1-olefin monomers.

Effects of the Invention

According to the present invention, a catalyst having high activity for use in a living radical polymerization and a polymerization method using the catalyst are provided. This catalyst has the advantage of having low toxicity. This catalyst has the advantage of having high solubility in a reaction solution. Therefore, it is not necessary to add a ligand to form a complex. As this catalyst has high activity, the polymerization reaction does not require a high temperature (for example, 110° C. or more). Further, the amount of the catalyst used can be reduced. Furthermore, the polymerization reaction does not require an expensive unique protecting group for protecting a polymer growing chain during a reaction. Additionally, molded products, which are obtained from the polymer obtained by the method of the present invention, have the advantage in which color or odor does not substantially occur during the molding process. Moreover, the present invention has the following advantages.

(1) Economical Efficiency

A low-priced catalyst (catalyst precursor) is provided. For example, 2,6-di-t-butyl-4-methylphenol (BHT) is approximately 30% cheaper as a unit price per kg than diethylphosphite, which is a very low-priced phosphorous catalyst (catalyst precursor).

(2) Safety to the Human Body and Environment.

Vitamin E, vitamin C, BHT, and the like, which are alcohol catalyst precursors, are non-toxic, and thus if they are taken in the human body, it will be harmless. Accordingly, from the viewpoint of the safety, it is not necessary to remove them from a produced polymer. Even in the case of removing them for some reason, because of their characteristics including high water-solubility and the like, the operation for the removal is extremely easy.

(3) Recyclability

A variety of phenol resins and phenol-bearing beads are commercially available. These can be used as a catalyst (catalyst precursor). These beads can be recovered, and can be further used many times.

(4) Effective Utilization of Natural Products

A wide variety of natural products including vitamin E, vitamin C, catechin, flavonoid, polyphenol, and the like can be utilized as catalysts (catalyst precursors).

(5) Versatility of Usable Monomers

For a variety of monomers, a living radical polymerization is allowed to be conducted.

As described above, according to the present invention, a living radical polymerization method, which is significantly more environment-friendly and economically advantageous than conventional methods, has been realized.

BRIEF DESCRIPTION OF THE DRAWINGS

FIG. 1A is a graph showing the changes over time in the monomer concentration during styrene polymerization (styrene/PE-I/VR110 or BPB/TI (100° C.)). Black circles represent the values of entry 1 as given in Table 1. White circles represent the values of entry 2 as given in Table 1.

FIG. 2A is a graph showing the changes over time in the monomer concentration during styrene polymerization (styrene/PE-INR110/R—OH (100° C.)). Black circles represent the values of entry 1 as given in Table 2. White circles represent the values of entry 6 as given in Table 2. Black squares represent the values of entry 23 as given in Table 2. White squares represent the values of entry 27 as given in Table 2. Black triangles represent the values of entry 31 as given in Table 2.

FIG. 2B is a graph plotting $M_n$ and $M_w/M_n$ vs. monomer conversion (ratio of polymerization) in the styrene polymerization (styrene/PE-INR110/R—OH (100° C.)). Regarding $M_n$, results that are consistent with the theoretical values, which are indicated as Theoretical line, are obtained.

FIG. 3A is a graph showing the changes over time in the monomer concentration during styrene polymerization (styrene/PE-I/BPB/R—OH (100° C.)). Black circles represent the values of entry 2 as given in Table 2. White circles represent the values of entry 7 as given in Table 2. Black squares represent the values of entry 24 as given in Table 2. White squares represent the values of entry 28 as given in Table 2. Black triangles represent the values of entry 32 as given in Table 2.

FIG. 3B is a graph plotting $M_n$, and $M_w/M_n$ vs. monomer conversion (ratio of polymerization) in the styrene polymerization (styrene/PE-I/BPB/R—OH (100° C.)). Regarding $M_n$, results that are consistent with the theoretical values, which are indicated as Theoretical line, are obtained.

FIG. 4A is a graph showing the changes over time in the monomer concentration during MMA polymerization (MMA/CP—I/PERKADOX16/R—OH (80° C.)). Black circles represent the values of entry 1 as given in Table 5. White circles represent the values of entry 3 as given in Table 5. Black squares represent the values of entry 5 as given in Table 5. White squares represent the values of entry 6 as given in Table 5. Black triangles represent the values of entry 10 as given in Table 5.

FIG. 4B is a graph plotting $M_n$ and $M_w/M_n$ vs. monomer conversion (ratio of polymerization) in the MMA polymerization (MMA/CP—I/PERKADOX16/R—OH (80° C.)). Regarding $M_n$, results that are consistent with the theoretical values, which are indicated as Theoretical line, are obtained.

FIG. 5 shows the graft polymer of Example 16. Figure (A) is the patterning in immobilizing IHE to a silicon substrate. Round portions are portions where iodine at the tip of IHE exists. Figure (B) is a microphotograph after polymerization using vitamin E, and shows that a thick polymer brush was formed. The deep-colored square spot is a portion where graft polymer is present.

FIG. 6 is a scheme showing the concept of the present invention, and shows the key reaction for the living radical polymerization of the present invention. In this scheme, the radical of the catalyst is indicated by A, and a compound in which iodine is bound to the radical is indicated by a symbol of A bound to a black circle. This catalyst is characterized in that the catalyst is more inexpensive by several orders of magnitude as compared with catalysts of prior art; since the catalyst is ultra-highly active, the catalyst can be used in an extremely small amount; purification is unnecessary at the time of production of the catalyst, or even if purification is needed, the purification is easy; and since the catalyst is low in toxicity or non-toxic, the catalyst is highly safe to the human body and the environment.

THE BEST MODE FOR CARRYING OUT THE INVENTION

Figure 1B:
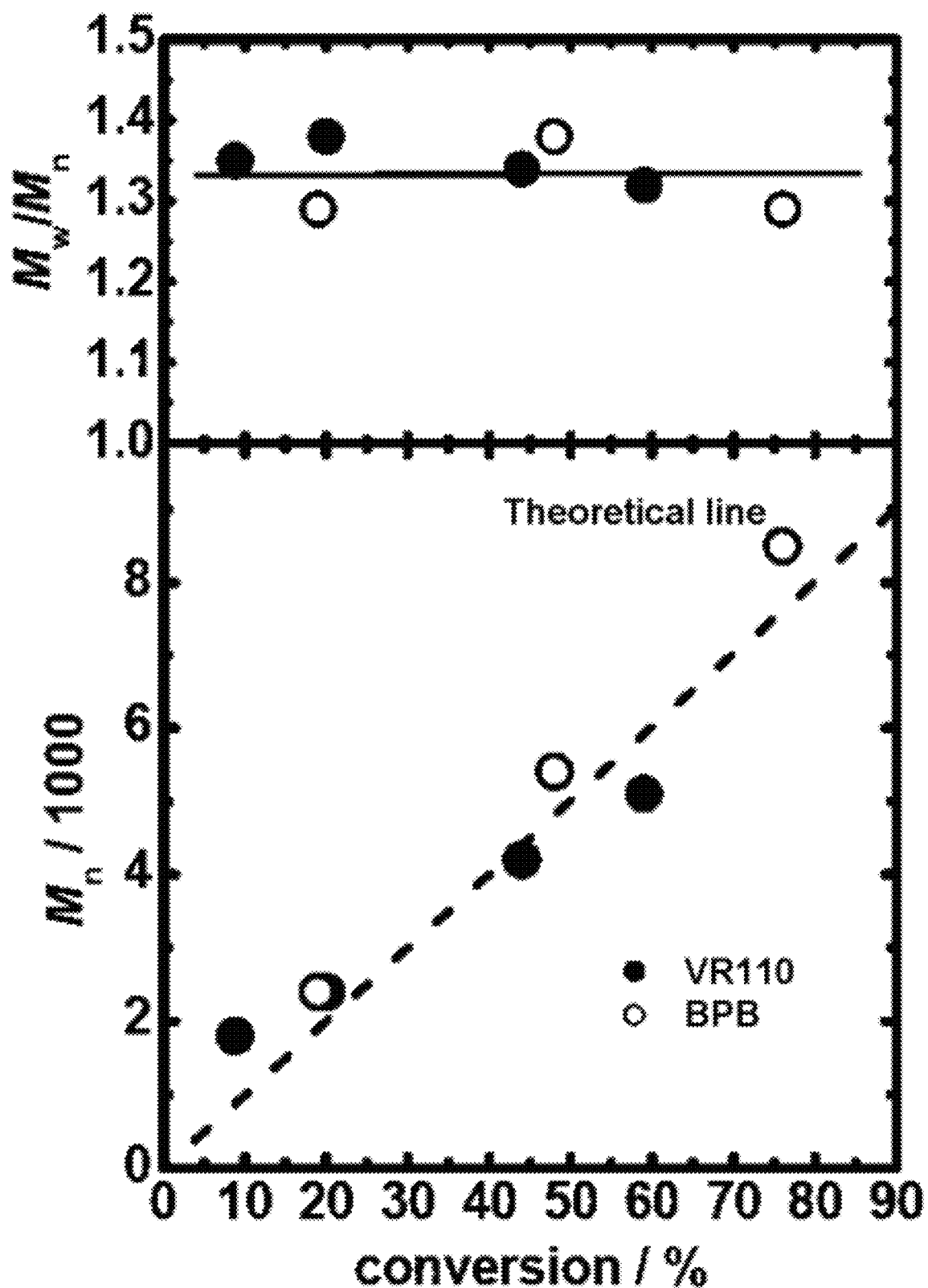
FIG. 1B is a graph plotting $M_n$ and $M_w/M_n$ vs. monomer conversion (ratio of polymerization) in the styrene polymerization (styrene/PE-INR110 or BPB/TI (100° C.)). Regarding $M_n$, results that are consistent with the theoretical values, which are indicated as Theoretical line, are obtained.

Hereinbelow, the present invention will be explained in detail.

General Terms

Hereinafter, the terms, which are particularly used in the present specification, will be explained.

In the present specification, an "alkyl" refers to a monovalent group which is generated after a chain or cyclic aliphatic hydrocarbon (alkane) loses a hydrogen atom. In the cases of a chain alkyl group, the alkyl group is generally represented by $C_kH_{2k+1}$— (wherein k is a positive integer). A chain alkyl group may be a straight chain or branched chain. A cyclic alkyl group may be consisted of a cyclic structure. A cyclic alkyl group may have a structure in which a chain alkyl group is linked to the cyclic structure. An alkyl group may have an arbitrary natural number of carbon atoms. Preferably, an alkyl group has 1 to 30 carbon atoms. More preferably, an alkyl group has 1 to 20 carbon atoms.

In the present specification, a "lower alkyl" refers to an alkyl group having a relatively small number of carbon atoms. Preferably, a lower alkyl is a $C_{1-10}$ alkyl group. More preferably, a lower alkyl is a $C_{1-5}$ alkyl group. Further preferably, a lower alkyl is a $C_{1-3}$ alkyl group. For instance, specific examples include methyl, ethyl, propyl and isopropyl.

In the present specification, an "alkenyl" refers to a monovalent group which is generated after a chain or cyclic aliphatic hydrocarbon (alkene) having a double bond loses a hydrogen atom. In the cases of a chain alkene having one double bond, the alkene group is generally represented by $C_kH_{2k-1}$— (wherein k is a positive integer). The number of double bond may be one, alternatively, the number of double bond may be two or more. There is no particular upper limit in the number of double bonds, but the upper limit may be 10 or less, or 5 or less. Preferred is a structure in which double bonds and single bonds are alternately repeated. A chain alkenyl group may be a straight chain or branched chain. A cyclic alkenyl group may be consisted of a cyclic structure. A cyclic alkenyl group may have a structure in which a chain structure is linked to the cyclic structure. Furthermore, a double bond may be present on a cyclic structure moiety or chain structure moiety. An alkenyl group may have an arbitrary natural number of carbon atoms. Preferably, an alkenyl group has 1 to 30 carbon atoms. More preferably, an alkenyl group has 1 to 20 carbon atoms.

An alkenyl group may be an alkenyl group having a relatively small number of carbon atoms, i.e., lower alkenyl group. In this case, the number of carbon atom is preferably $C_{2-10}$, more preferably, $C_{2-5}$, and further preferably, $C_{2-3}$. For instance, specific examples include vinyl and the like.

In a preferred embodiment, an alkenyl group has a double bond on the carbon at the end of the carbon chain. Preferably, the terminal carbon having the double bond is bound with oxygen that is a central element in the catalyst compound or catalyst precursor compound. That is, it is preferable to select an alkenyl group such that a catalyst compound or a catalyst precursor compound has a structure in which the oxygen is bound to the carbon that is bound to an adjacent carbon via a double bond:

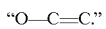

In a preferred embodiment, an alkenyl group is represented by the formula: —$CR^7$=$CR^8R^9$. $R^7$, $R^8$, and $R^9$ may be hydrogen, alkyl, or other substituents (for example, alkenyl, alkylcarboxyl, haloalkyl, alkylcarbonyl, amino, cyano, alkoxy, aryl, or alkyl-substituted aryl). When all of $R^7$, $R^8$, and $R^9$ are hydrogen, this group is a vinyl group. In the present specification, an "alkynyl" refers to a monovalent group which is generated after a chain or cyclic aliphatic hydrocarbon (alkyne) having a triple bond loses a hydrogen atom. In the cases of a chain alkyne having one triple bond, the alkene group is generally represented by $C_kH_{2k-3}$— (wherein k is a positive integer). The number of triple bond may be one; alternatively, the number of triple bond may be two or more. There is no particular upper limit in the number of triple bond, but the upper limit may be 10 or less, or 5 or less. Preferred is a structure in which triple bonds and single bonds are alternately repeated. A chain alkynyl group may be a straight chain or branched chain. A cyclic alkynyl group may be consisted of a cyclic structure. A cyclic alkynyl group may have a structure in which a chain structure is linked to the cyclic structure. Furthermore, a triple bond may be present on a cyclic or chain structure moiety. An alkynyl group may have an arbitrary natural number of carbon atoms. Preferably, an alkynyl group has 1 to 30 carbon atoms. More preferably, an alkynyl group has 1 to 20 carbon atoms.

An alkynyl group may be an alkynyl group having a relatively small number of carbon atoms, i.e., lower alkynyl group. In this case, the number of carbon atoms is preferably $C_{2-10}$, more preferably, $C_{2-5}$, and further preferably, $C_{2-3}$.

In a preferred embodiment, an alkynyl group has a triple bond on the carbon at the end of the carbon chain. Preferably, the terminal carbon having the triple bond is bound with oxygen that is a central element in the catalyst compound or catalyst precursor compound. That is, it is preferable to select an alkynyl group such that a catalyst compound or a catalyst precursor compound has a structure in which the oxygen is bound to the carbon that is bound to an adjacent carbon via a triple bond:

"O—C≡C."

In a preferred embodiment, an alkynyl group is represented by the formula:

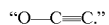

$R^{10}$ may be hydrogen, alkyl, or other substituents (for example, alkenyl, alkylcarboxyl, haloalkyl, alkylcarbonyl, amino, cyano, alkoxy, aryl, or alkyl-substituted aryl).

In the present specification, an "alkoxy" refers to a group in which an oxygen atom is bound to the aforementioned alkyl group. That is, when the alkyl group is represented by R—, the alkoxy refers to a group represented by RO—. A chain alkoxy group may be a straight chain or branched chain. Cyclic alkoxy may be composed only of a cyclic structure, or may have a structure formed from a cyclic structure further linked with chain alkyl. The number of carbon atoms in the alkoxy may be any natural number. The number of carbon atoms is preferably from 1 to 30, and more preferably from 1 to 20.

In the present specification, a "lower alkoxy" refers to an alkoxy group having relatively fewer carbon atoms. The lower alkoxy is preferably $C_{1-10}$ alkoxy, more preferably $C_{1-5}$ alkoxy, and even more preferably $C_{1-3}$ alkoxy. Specific examples thereof include methoxy, ethoxy, butoxy, isopropoxy, and the like.

In the present specification, an "alkylcarboxyl" refers to a group in which a carboxyl group is bound to the aforementioned alkyl group. That is, when the alkyl group is represented by R—, the alkylcarboxyl refers to a group represented by RCOO—. A chain alkylcarboxyl group may be a straight chain or branched chain. A cyclic alkylcarboxyl group may be composed only of a cyclic structure, or may have a structure formed from a cyclic structure further linked with chain alkyl. The number of carbon atoms in the alkylcarboxyl may be any natural number. The number of carbon atoms is preferably from 1 to 30, and more preferably from 1 to 20.

In the present specification, a "lower alkylcarboxyl" refers to an alkylcarboxyl group having relatively fewer carbon atoms. The lower alkylcarboxyl is preferably $C_{1-10}$ alkylcarboxyl, more preferably $C_{1-5}$ alkylcarboxyl, and even more preferably $C_{1-3}$ alkylcarboxyl.

In the present specification, an "alkylcarbonyl" refers to a group in which a carbonyl group is bound to the aforementioned alkyl group. That is, when the alkyl group is represented by R—, the alkylcarbonyl refers to a group represented by RCO—. A chain alkylcarbonyl group may be a straight chain or branched chain. Cyclic alkylcarbonyl may be composed only of a cyclic structure, or may have a structure formed from a cyclic structure further linked with chain alkyl. The number of carbon atoms in the alkylcarbonyl may be any natural number. The number of carbon atoms is preferably from 1 to 30, and more preferably from 1 to 20.

In the present specification, a "lower alkylcarbonyl" refers to, an alkylcarbonyl group having relatively fewer carbon atoms. The lower alkylcarbonyl is preferably $C_{1-10}$ alkylcarbonyl, more preferably $C_{1-5}$ alkylcarbonyl, and even more preferably $C_{1-3}$ alkylcarbonyl.

In the present specification, a "haloalkyl" refers to a group in which a hydrogen atom of the aforementioned alkyl group is substituted with a halogen atom. A chain haloalkyl group may be a straight chain or branched chain. A cyclic haloalkyl group may be composed only of a cyclic structure, or may have a structure formed from a cyclic structure further linked with chain alkyl. The number of carbon atoms in the haloalkyl may be any natural number. The number of carbon atoms is preferably from 1 to 30, and more preferably from 1 to 20. In the haloalkyl, all of the hydrogen atoms may be substituted with halogen, or only some of the hydrogen atoms may be substituted.

In the present specification, a "lower haloalkyl" refers to a haloalkyl group having relatively fewer carbon atoms. The lower haloalkyl is preferably $C_{1-10}$ haloalkyl, more preferably $C_{1-5}$ haloalkyl, and even more preferably $C_{1-3}$ haloalkyl. Specific examples of a preferable lower haloalkyl group include a trifluoromethyl group, and the like.

In the present specification, a "substituted alkyl" refers to a group in which a hydrogen atom of an alkyl group is substituted with a substituent. Such a substituent includes aryl, cyano and the like.

In the present specification, a "halogenated substituted alkyl" refers to a compound in which a hydrogen of an alkyl group is substituted with a halogen, and another hydrogen of the alkyl group is substituted with another substituent. For, example, such another substituent includes an aryl group, a cyano group and the like.

In the present specification, an "aryl" refers to a group which is generated after a hydrogen atom bound to a ring of an aromatic hydrocarbon is removed. The number of aromatic hydrocarbon ring constituting aryl may be one, alternatively, may be two or more. Preferred number of aromatic hydrocarbon ring is one to three. When there are a plurality of aromatic hydrocarbon rings in a molecule, the plurality of rings may be fused or not. Specifically, for example, an aryl includes a phenyl group, naphthyl group, anthracenyl group, and the like.

In the present specification, a "heteroaryl" refers to a group in which elements constituting the ring skeleton of an aromatic ring of aryl contain a heteroatom other than to carbon. Examples of heteroatoms include, specifically, oxygen, nitrogen, sulfur, and the like. The number of heteroatom in the aromatic ring is not particularly limited. The aromatic ring may contain, for example, only one heteroatom, or may be two, three, or four or more heteroatoms.

In the present specification, a "substituted aryl" refers to a group which is generated after a substituent binds to an aryl group.

In the present specification, a "substituted heteroaryl" refers to a group which is generated after a substituent binds to a heteroaryl group.

In the present specification, a "halogen" refers to a monovalent radical of an element, which belongs to the 7B group of the periodic table, such as a fluorine (F), chlorine (Cl), bromine (Br) and iodine (I). Preferred is bromine or iodine, and more preferred is iodine.

In the present specification, a "living radical polymerization" refers to a polymerization reaction, in which a chain transfer reaction does not substantially occur in a radical polymerization reaction and a termination reaction does not substantially occur in the radical polymerization reaction, and the growing chain end maintains the activity even after the monomers have exhaustively reacted. According to this polymerization reaction, after completion of a polymerization reaction, a terminal of the generated polymer maintains the polymerization activity. If a monomer is added, then it is possible to start the polymerization reaction again.

A living radical polymerization is characterized in that, for example, a polymer having an arbitrary average molecular weight can be synthesized by adjusting the ratio of concentrations of a monomer and polymerization initiator, and the generated polymer has very narrow molecular weight distribution, and can be applied to a block copolymer. It is noted that a living radical polymerization is sometimes abbreviated as "LRP".

In the present specification, a "central element" refers to an atom which is bound to a halogen atom and contributes mainly to a catalytic action among atoms constituting a compound that becomes a catalyst. The "central element" has the same meaning as the term "central metal", which is used in the prior art. However, oxygen, which is used in the present invention, is generally not classified as metal. Therefore, in order to avoid misunderstanding, the term "central element" is used in place of the term "central metal" in the prior art.

Hereinafter, the present invention will be explained in detail.

Catalyst

According to the present invention, a compound of which the central element is oxygen is used as a catalyst for a living radical polymerization method.

Preferably, oxygen which is a central element is bound to carbon, silicon, nitrogen, or phosphorus. More preferably, oxygen which is a central element is bound to carbon. An atom bound to a central element preferably has a double bond or triple bond between the atom and an adjacent atom (for example, carbon). That is to say, the atom bound to the oxygen which is a central element is preferably carbon having an unsaturated bond in any group of an alkenyl group (e.g., vinyl group), alkynyl group, or aryl group (e.g., phenyl group). Furthermore, in the case of an alkenyl group or alkynyl group, preferably, a double bond or triple bond is present at the terminal thereof, and more preferably, the oxygen which is a central element is bound to the terminal carbon. It should be noted that the matter that such a structure is preferable similarly applies to a catalyst precursor compound described below.

It is believed that in the case where oxygen of a catalyst or catalyst precursor compound in which the oxygen as a central element is bound to a carbon of a double bond or triple bond as described above becomes an oxygen radical, resonance stabilization causes the oxygen radical to be stable and thus the performance as a living radical polymerization catalyst becomes well.

According to the present invention, the catalyst can be used in combination with an organic halide having a carbon-halogen bond, which is used as a kind of dormant species. The catalyst abstracts halogen from this organic halide at the time of the living radical polymerization, and generates a radical. Therefore, according to the present invention, the catalyst detaches a group of the compound used as a dormant species, which suppresses a growing reaction, and converts the compound into an active species, thereby controlling the growing reaction. It should be noted that the dormant species is not limited to organic halogen.

It is noted that Patent Document 2 describes in its claim 1 that a combination of a hydrido rhenium complex and a halogenated hydrocarbon is a catalyst for radical living polymerization. However, since the halogenated hydrocarbon described in Patent Document 2 is not a catalyst for living radical polymerization but corresponds to a dormant species, the halogenated hydrocarbon described in Patent Document 2 is distinguished from catalysts.

The catalyst compound has at least one central element. In one preferred embodiment, the compound has one central element. However, the compound may have two or more central elements.

Many catalyst compounds using oxygen as the central element do not have electroconductivity. Thus, for example, when a polymer is used for an application where it is not desirable that a conductive material remains in the polymer (for example, electronic material such as resist material or organic electroluminescence material), it is preferable to use an oxygen compound, which has no electroconductivity, as a catalyst.

Further, oxygen is also advantageous in terms of toxicity to the human body and influence to the environment. Therefore, even if some conductive materials are permitted to remain, it is much more advantageous to use a catalyst containing oxygen than a transition metal complex catalyst, which was used in prior art.

Furthermore, the catalyst of the present invention has the characteristic that a small amount of the catalyst can exert its catalytic action. Therefore, as described above, it was made possible that material having little toxicity to the human body and little influence to the environment is used in a small amount. The catalyst of the present invention is much superior to a conventional catalyst.

Halogen Atom in the Catalyst

In the aforementioned compound of the catalyst, at least one halogen atom is bound to the central element. If the aforementioned compound of the catalyst has two or more central elements, at least one halogen atom is bound to each of the central element. The halogen atom is preferably, chlorine, bromine or iodine. More preferably, the halogen atom is iodine. Two or more halogen atoms may exist in one molecule. For example, two atoms, three atoms, or four atoms may exist in one molecule. More than four atoms may exist in one molecule. Preferably, two to four halogen atoms exist in one molecule. When there are two or more halogen atoms in one molecule, the plurality of halogen atoms may be the same or different.

Groups Other than Halogen in the Catalyst

If necessary, the compound of the catalyst may have a group other than halogen. For example, it is possible that an arbitrary organic group or inorganic group is bound to the central element.

Such a group may be an organic group or an inorganic group. An organic group includes an aryl group, substituted aryl group, alkenyl group (e.g., vinyl group), alkynyl group, alkoxy group (methoxy group, ethoxy group, propoxy group, butoxy group, and the like), ester group (aliphatic carboxylic acid ester and the like), alkylcarbonyl group (methylcarbonyl group and the like), haloalkyl group (trifluoromethyl group and the like), and the like. In one preferred embodiment, it is an aryl group, substituted aryl group, alkenyl group (e.g., vinyl group), or alkynyl group.

Further, the inorganic group includes a hydroxyl group, amino group, cyano group and the like.

Regarding a catalyst compound having an aryl group or substituted aryl group as an organic group, its radical tends to have higher activity, and thus it is preferable.

In a substituted aryl group, substituents bound to the aryl group include, for example, an alkyl group, alkyloxy group, cyano group, amino group, and the like. The alkyl group is preferably a lower alkyl group, more preferably, a $C_1$ to $C_5$ alkyl group. The alkyl is further preferably a $C_1$ to $C_3$ alkyl group, and particularly preferably, a methyl group. The alkyl group in the alkyloxy group is preferably a lower alkyl group, more preferably a $C_1$ to $C_5$ alkyl group, further preferably a $C_1$ to $C_3$ alkyl group, and particularly preferably a methyl group. Thus, in one embodiment, an organic group bound to the central element is a phenyl group, lower alkyl phenyl group or lower alkyloxyphenyl group.

There is no limitation for the number of the aforementioned organic groups and inorganic groups. However, the number of the aforementioned organic groups or inorganic groups is preferably three or less, and more preferably one.

It is noted that there is no limitation for the number of the substituents of the substituted aryl group. However, the number of the substituents of the substituted aryl group is preferably 1 to 3, and more preferably 1 to 2, and further preferably 1.

Regarding the position of the substituent in the substituted aryl group, an arbitrary position may be selected. When the aryl group is a phenyl group (that is, the substituted aryl group is a substituted phenyl group), the position of the substituent may be ortho, meta, or para with respect to the central element. Preferably, the position is at para.

In one embodiment, the compound of the following general formula (Ia) can be used as a catalyst.

$$R^1{}_n(OX^1)_m \quad \text{(Ia)}$$

Here, $R^1$ is an organic group. Preferably, $R^1$ is alkyl, alkenyl, alkynyl, alkylcarboxyl, alkylcarbonyl, haloalkyl, hydroxyl, amino, cyano, alkoxy, aryl, or substituted aryl. More preferably, $R^1$ is aryl, substituted aryl, alkenyl, or alkynyl.

Here, $R^1$ may have a chain structure or cyclic structure, or may have both a chain structure and a cyclic structure.

Furthermore, when $R^1$ is substituted aryl, the substituent is preferably alkyl, alkoxy, or cyano. More preferably, the substituent is lower alkyl, lower alkoxy, or cyano.

n is a positive integer. For example, n may be 1, or 2, or may be an integer of 3 or more. In one embodiment, n is 1 to 10, in another embodiment, 1 to 5, in further another embodiment, 1 to 3, in yet another embodiment, 1 to 2.

Furthermore, in the general formula (Ia), $X^1$ is halogen, and m is a positive integer. For example, m may be 1, or 2, or may be an integer of 3 or more. In one embodiment, m is 1 to 10. In another embodiment, m is 1 to 5. In further another embodiment, m is 1 to 3. In yet another embodiment, m is 1 to 2.

In the general formula (Ia), generally, n and m are selected such that the overall valences of the chemical formula (Ia) are balanced.

Furthermore, in the formula (Ia), generally, the oxygen atom 0 is bound to both $R^1$ and $X^1$.

Catalyst Compound Having Oxygen as a Central Element

As specific examples of catalyst compounds having oxygen as a central element, any publicly known compounds falling under the above definition can be used. Preferred specific examples of catalyst compounds having oxygen as the central element include halogenated oxygen (e.g., oxygen iodide), alkoxyhalide or carboxylhalide ($R^1OX$, e.g., benzoic acid iodide (PhCOOI)), a compound in which H of a phenolic hydroxyl group in a phenol-type compound is substituted with halogen (e.g., thymol iodide), and the like.

Preferable catalyst compounds are those which do not have a radically reactive double bond.

Catalyst Precursor Compound Having Oxygen as a Central Element

A compound that is a precursor of a catalyst having oxygen as a central element is a compound in which a halogen bound to an oxygen atom in the catalyst compound is replaced with hydrogen. Except for the replacement of a halogen with hydrogen, the above description of a catalyst compound applies to a catalyst precursor compound as it is.

As a compound that is a precursor of a catalyst having oxygen as a central element, any compound in which a halogen bound to an oxygen atom in the aforementioned catalyst compound is replaced with hydrogen can be used. That is to say, any compound having a structure in which a hydroxyl group is bound to carbon, silicon, nitrogen, or phosphorus can be used.

A catalyst precursor compound is preferably a phenol-type compound having a structure in which OH is attached to the aromatic ring, or an aliphatic alcohol-type compound having a structure in which OH is attached to carbon of an aliphatic group.

An atom bound to a hydroxyl group of a precursor compound (hereinafter referred to as "1-position atom" for convenience) is preferably carbon, nitrogen, or phosphorus, more preferably, carbon. The 1-position atom is preferably bound to only atoms selected from carbon and hydrogen, except for the hydroxyl group. An atom adjacent to the 1-position atom (hereinafter referred to as "2-position atom" for convenience) is preferably carbon. The 2-position atom is preferably bound to only atoms selected from carbon, oxygen, and hydrogen. Furthermore, it is preferable that there is a double bond between the 1-position atom and the 2-position atom. In a preferred embodiment, a compound having two 2-position atoms, in which there is a double bond between one of the two 2-position atoms and the 1-position atom can be used as a catalyst precursor compound. For example, a compound wherein a 1-position atom is carbon, two carbon atoms are present as 2-position atoms, and there is a double bond between one carbon of them and the carbon which is the 1-position atom can be used as a catalyst precursor compound. Furthermore, it is preferable that there are two or more 2-position atoms, and it is preferable that a double bond between one 2-position atom and a 1-position atom, and a single bond between another 2-position carbon atom and the 1-position carbon atom is a part of a conjugate system. For example, it is preferable that a 1-position atom is carbon, two carbon atoms are present as 2-position atoms, and a double bond between one 2-position atom and the 1-position atom, and a single bond between another 2-position atom and the 1-position atom is a part of a conjugate system.

Thus, as a precursor compound, preferred is a phenol-type compound having a structure in which a hydroxyl group is attached to an aromatic ring. For example, preferred is a compound in which a hydroxyl group is attached to aryl or substituted aryl. Here, as the aryl, phenyl or biphenyl is preferred. Here, as substituents of the substituted aryl, an alkyl group, alkoxyl group, cyano group, and the like are preferable. A lower alkyl group and a lower alkoxyl group are more preferable.

A catalyst precursor compound is preferably one that does not have a radically reactive double bond. A catalyst precursor may have a double bond having low reactivity with a radical, such as an aromatic double bond (e.g., a double bond of a benzene ring). Even in the case of an aliphatic double bond, a double bond having low reactivity with a radical, such as the double bond in vitamin C can be used as a catalyst precursor without hindrance. Thus, vitamin C can be used as a catalyst precursor. Generally, a double bond bound to a hydroxyl group does not have reactivity with a radical. For example, vinyl alcohol ($CH_2$=CH—OH) is not a radically polymerizable monomer. Similarly, a triple bond bound to a hydroxyl group is not also radically reactive, and such a compound is not a radically polymerizable monomer.

On the other hand, regarding a compound having a double bond or triple bond only at a position distant from a hydroxyl group (i.e., a compound of which the 1-position carbon does not have a double bond or triple bond and the 2-position carbon or a carbon that is more distant therefrom has a double bond or triple bond), the performance as a catalyst precursor compound tends not to be relatively high. Thus, it is preferable that a compound other than the compound having a double bond or triple bond only at a position distant from a hydroxyl group is selected as a catalyst precursor compound.

Furthermore, in one embodiment of the present invention, it is preferable that a hydroxyl-group-containing compound having the performance as an antioxidant is used as a precursor compound. However, regarding an antioxidant, generally, it is believed important that there is a bulky substituent near a hydroxyl group, but there is not such limitation for a precursor compound of the present invention, and it is unnecessary that there is a bulky substituent near a hydroxyl group. For example, even a compound not having a substituent other than a hydroxyl group, such as unsubstituted phenol, can be appropriately used as a precursor compound in the present invention.

Furthermore, in one embodiment of the present invention, as a precursor compound, a compound having a hydroxyl group bound to silicon, nitrogen, or phosphorus (i.e., Si—OH, N—OH, or P—OH) can be also used.

Manufacturing Method of the Catalyst

Most compounds used as catalysts of the present invention are publicly known. The compounds, which are commercially available from reagents sales company or the like, can be directly used. Alternatively, the compounds can be synthesized by using publicly known methods. Furthermore, compounds existing in natural products, such as vitamins, are available by a method of extracting the natural products, or the like.

When a compound having an organic group $R^1$ (e.g., alkyl, alkoxy, aryl, or substituted aryl) bound to oxygen is used as a catalyst, a commercially available product can be used as such a compound. Alternatively, such a compound can be synthesized by a publicly known method. For example, a compound having halogen and an organic group $R^1$ bound to oxygen can be synthesized. For example, by a method of reacting $R^1$OH with ICl, ROI is synthesized. Alternatively, by a method described in Tetrahedron Letters 21, 2005-2008 (1980), or a method described in Tetrahedron Letters 25, 1953-1956 (1984) or Tetrahedron Letters 30, 4791-4794 (1989), a compound having halogen and an organic group $R^1$ bound to oxygen can be synthesized.

Amount of the Catalyst Used

The catalyst of the present invention has very high activity and can catalyze a living radical polymerization in a small amount. Hereinafter, the amount of use of the catalyst will be described, but the amount employed in the case of using a catalyst precursor is also similar to the case of the amount of catalyst.

In the method of the present invention, the compound that is used as the catalyst or catalyst precursor may be in some cases a liquid compound that can be used as a solvent in theory. However, under the circumstance that such a compound is used as a catalyst or a catalyst precursor, there is no need to use the compound in such a large amount as to provide an effect as a solvent. Therefore, the amount of use of the catalyst or catalyst precursor can be limited to an amount smaller than the so-called "solvent amount" (that is, an amount needed to achieve the effect as a solvent). According to the method of the present invention, the catalyst or catalyst precursor may be used in an amount that is sufficient to catalyze the living radical polymerization as described above, and there is no need to add more than that.

Specifically, for example, in a preferred embodiment, it is possible that the catalyst in an amount of 10 millimoles (mM) or less is used to one liter of reaction solution. In a further preferred embodiment, it is possible that the catalyst in an amount of 5 millimoles (mM) or less is used to one liter of reaction solution. It is also possible that the catalyst in an amount of 2 millimoles (mM) or less is used to one liter of reaction solution. Further, it is possible that the catalyst in an amount of 1 millimole (mM) or less is used to one liter of reaction solution. It is also possible that the catalyst in an amount of 0.5 millimoles (mM) or less is used to one liter of reaction solution. Regarding the weight of the catalyst, the amount of the used catalyst can be 1 weight % or less in a reaction solution. In a preferred embodiment, it is possible to limit the amount to 0.75% by weight or less, and it is also possible to limit the amount to 0.70% by weight or less. In a more preferred embodiment, it is possible to limit the amount to 0.5% by weight or less, and is also possible to limit the amount to 0.2% by weight or less. It is further possible to limit the amount to 0.1% by weight or less, and is possible to limit the amount to 0.05% by weight or less. For example, in the case of a phosphorus catalyst, the amount can be limited to 0.75% by weight or less, and can be also limited to 0.70% by weight or less. In an even more preferred embodiment, the amount can be limited to 0.5% by weight or less, can be limited to 0.2% by weight or less, can be further limited to 0.1% by weight or less, and can be also limited to 0.05% by weight or less. In other words, the amount can be limited to a "remarkably" smaller amount than an amount needed to provide an effect as a solvent.

It should be noted that when a phenol-type compound, i.e., a compound having a phenolic hydroxyl group is used as a catalyst precursor compound, depending on the kind of a monomer, in the case where the amount used is too large, the phenol-type compound may act as a polymerization inhibitor. For example, when styrene or the like is polymerized, if the amount of a phenol-type compound is too large, the polymerization reaction will not proceed. Thus, regarding an amount of a catalyst-precursor-type compound used, it is preferable that the amount is so small that an effect as a polymerization inhibitor is not exerted. It should be noted that in the case of a monomer such as acrylate, methacrylate, or the like, a phenol-type compound is not an effective polymerization inhibitor. Consequently, even if an amount of a phenol-type compound used is large to some extent, there is no disadvantage by a polymerization inhibitory effect.

Further, the amount of the catalyst used is preferably 0.02 millimoles or more to one liter of a reaction solution. More preferably, the amount is 0.1 millimoles or more to one liter of a reaction solution. Further preferably, the amount is 0.5 millimoles or more to one liter of a reaction solution. Regarding the weight of the catalyst, preferably, an amount of the catalyst used is 0.001 weight % or more in a reaction solution. More preferably, the amount is 0.005 weight % or more in a reaction solution. Further preferably, the amount is 0.02 weight % or more in a reaction solution. If the amount of the catalyst used is too small, then the molecular weight distribution is likely to be broad.

According to one embodiment, in the method of living radical polymerization of the present invention, it is possible to carry out the living radical polymerization satisfactorily, even without using a catalyst for living radical polymerization or catalyst precursor compound other than the catalyst or catalyst precursor compound having an oxygen atom as the central element (hereinafter, "other-type catalyst or other-type catalyst precursor compound") in combination. However, if necessary, it is also possible to use an other-type catalyst or other-type catalyst precursor compound in combination. In that case, it is preferable to use a larger amount of the catalyst or catalyst precursor compound that has an oxygen atom as the central element, and to use a smaller amount of the other-type catalyst or other-type catalyst precursor compound, in order to make the best possible use of the advantage of the catalyst or catalyst precursor compound that has an oxygen atom as the central element. Under such circumstances, the amount of use of the other-type catalyst or other-type catalyst precursor compound can be limited to 100 parts by weight or less, can be limited to 50 parts by weight or less, and can also be limited to 20 parts by weight or less, 10 parts by weight or less, 5 parts by weight or less, 2 parts by weight or less, 1 part by weight or less, 0.5 parts by weight or less, 0.2 parts by weight or less, or 0.1 parts by weight or less, relative to 100 parts by weight or less of the catalyst or catalyst precursor compound that has an oxygen atom as the central element.

Protecting Group

The method of the present invention uses a protecting group for protecting the growing chain during the living radical polymerization reaction. Regarding the protecting group, various known protecting groups, which were conventionally used as protecting groups in a living radical polymerization, can be used. In this regard, it is preferable to use halogen as a protecting group. As described above regarding prior art, when a special protecting group is used, there are disadvantages such as the disadvantage that the protecting group is very expensive.

Organic Halide (Dormant Species)

According to the method of the present invention, preferably, an organic halide, which has a carbon-halogen bond, is added to the reaction material. Halogen, which is attached to the growing chain by the organic halide, is used as a protecting group. Such organic halides are relatively inexpensive. Therefore, it is more advantageous than other known compounds which are used as protecting groups in a living radical polymerization. Further, if necessary, dormant species in which halogen is bound to an element other than carbon can be used.

The organic halide is a compound which has at least one carbon-halogen bond in the molecule. There is no other particular limitation to the organic halide. Generally, the organic halide preferably has one or two halogen atoms in the molecule.

The number of hydrogen atoms carried by the carbon to which the halogen atom of the organic halide is bound (hereinafter, referred to as "1-position carbon of the organic halide" for convenience), is preferably two or less, and more preferably one or less, and it is even more preferable that the carbon does not have any hydrogen atom. Further, the number of halogen atoms bound to the 1-position carbon of the organic halide is preferably three or less, more preferably two or less, and even more preferably one. Particularly, when the halogen atom bound to the 1-position carbon of the organic halide is a chlorine atom, the number of the chlorine atoms is very preferably three or less, more preferably two or less, and particularly preferably one.

It is preferable that one or more carbon atoms be bound to the 1-position carbon of the organic halide, and it is particularly preferable that two or three carbon atoms be bound thereto.

The halogen atom in the organic halide may be the same as the halogen atom in the catalyst. The halogen atom in the organic halide may be different from the halogen atom in the catalyst, since even if the halogen atom of the organic halide and the halogen atom of the catalyst are different, it is possible that the halogen atom of the organic halide and the halogen atom of the catalyst are exchanged. However, if the halogen atom in the organic halide and the halogen atom in the catalyst are the same, it is easier to exchange the halogen atoms between the organic halide and the compound of the catalyst. Therefore, preferably, the halogen atom in the organic halide and the halogen atom in the catalyst are the same.

In one embodiment, the organic halide has the following general formula

$$CR^2R^3R^4X^2 \qquad (II)$$

wherein $R^2$ is halogen, hydrogen or alkyl. Preferably, $R^2$ is hydrogen or lower alkyl. More preferably, $R^2$ is hydrogen or methyl.

$R^3$ may be the same as $R^2$, or may be different from $R^2$. $R^3$ is halogen, hydrogen or alkyl. Preferably, $R^3$ is hydrogen or lower alkyl. More preferably, $R^3$ is hydrogen or methyl.

$R^4$ is halogen, hydrogen, alkyl, aryl, or cyano. Preferably, $R^4$ is aryl or cyano. When $R^4$ is halogen, hydrogen or alkyl, $R^4$ may be the same as $R^2$ or $R^3$, or may be different from $R^2$ or $R^3$.

$X^2$ is halogen. Preferably, $X^2$ is chlorine, bromine or iodine. When there is a halogen in $R^2$ to $R^4$, $X^2$ may be the same as the halogen in $R^2$ to $R^4$, or may be different from the halogen in $R^2$ to $R^4$. In one embodiment, $X^2$ may be the same halogen as that contained in the compound of the catalyst. $X^2$ may be different from the halogen contained in the catalyst of the compound.

The aforementioned $R^2$ to $R^4$ and $X^2$ are selected independently from each other. However, preferably, there is no halogen atom or one halogen atom in $R^2$ to $R^4$ (that is, the organic halide contains one or two halogen atoms in the compound).

In one preferable embodiment, the organic halide is halogenated alkyl or halogenated substituted alkyl. More preferably, the organic halide is halogenated substituted alkyl. In this regard, preferably, the alkyl is a secondary alkyl. More preferably, the alkyl is a tertiary alkyl.

In the halogenated alkyl or halogenated substituted alkyl, the number of carbon atoms in the alkyl is preferably 2 or 3. Therefore, further preferably, the organic halide is halogenated substituted ethyl or halogenated substituted isopropyl. The substituent in the halogenated substituted alkyl includes, for example, phenyl, cyano and the like.

Preferable specific examples of the organic halide include $CH(CH_3)(Ph)I$ and $C(CH_3)_2(CN)I$, as shown in the following chemical formulas.

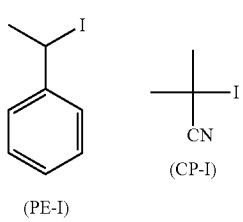

Chemical formula 13

(PE-I)  (CP-I)

Other specific examples of the organic halide include, for example, methyl chloride, methylene chloride, chloroform, chloroethane, dichloroethane, trichloroethane, bromomethyl, dibromomethane, bromoform, bromoethane, dibromoethane, tribromoethane, tetrabromoethane, bromotrichloromethane, dichlorodibromomethane, chlorotribromomethane, iodotrichloromethane, dichlorodiiodomethane, iodotribromomethane, dibromodiiodomethane, bromotriiodomethane, iodoform, diiodomethane, methyl iodide, isopropyl chloride, t-butyl chloride, isopropyl bromide, t-butyl bromide, triiodoethane, ethyl iodide, diiodopropane, isopropyl iodide, t-butyl iodide, bromodichloroethane, chlorodibromoethane, bromochloroethane, iododichloroethane, chlorodiiodoethane, diiodopropane, chloroiodopropane, iododibromoethane, bromoiodopropane,
2-iodo-2-polyethyleneglycosylpropane, 2-iodo-2-amidinopropane, 2-iodo-2-cyanobutane, 2-iodo-2-cyano-4-methylpentane, 2-iodo-2-cyano-4-methyl-4-methoxypentane, 4-iodo-4-cyano-pentanoic acid, methyl-2-iodoisobutylate, 2-iodo-2-methylpropane amide, 2-iodo-2,4-dimethylpentane, 2-iodo-2-cyanobutanol, 4-methylpentane, cyano-4-methylpentane, 2-iodo-2-methyl-N-(2-hydroxyethyl)propionamide 4-methylpentane, 2-iodo-2-methyl-N-(1,1-bis(hydroxymethyl)-2-hydroxyethyl)propionamide 4-methylpentane, 2-iodo-2-(2-imidazolin-2-yl)propane, 2-iodo-2-(2-(5-methyl-2-imidazolin-2-yl)propane, and the like. One of these halide compounds may be used alone, or a combination of two or more of the halide compounds may be used.

According to the method of the present invention, since the organic halide is not to be used as a solvent, it is not necessary to use the organic halide in such a large amount as to provide an effect as a solvent. Thus, the amount of use of the organic halide can be limited to an amount smaller than the so-called "solvent amount" (that is, an amount needed to achieve the effect as a solvent). In the method of the present invention, since the organic halide is used to provide halogen as a protecting group to a growing chain as described above, it is sufficient so long as a sufficient amount of halogen can be provided to the growing chains in the reaction system. Specifically, for example, in the method of the present invention, the amount of the organic halide used is, preferably 0.05 moles or more relative to 1 mole of the radical polymerization initiator in the polymerization reaction system. More preferably, the amount is 0.5 moles or more relative to 1 mole of the radical polymerization initiator. Further preferably, the amount is 1 mole or more relative to 1 mole of the radical polymerization initiator. Further, preferably, the amount is 100 moles or less relative to 1 mole of the radical polymerization initiator in the polymerization system. More preferably, the amount is 30 moles or less relative to 1 mole of the radical polymerization initiator. Further preferably, the amount is 5 moles or less relative to 1 mole of the radical polymerization initiator. Additionally, the amount is preferably 0.001 moles or more relative to 1 mole of the vinyl-type monomer. More preferably, the amount is 0.005 moles or more relative to 1 mole of the vinyl-type monomer. Further, the amount is preferably 0.5 moles or less relative to 1 mole of the vinyl-type monomer. More preferably, the amount is 0.4 moles or less relative to 1 mole of the vinyl-type monomer. Further preferably, the amount is 0.3 moles or less relative to 1 mole of the vinyl-type monomer. Particularly preferably, the amount is 0.2 moles or less relative to 1 mole of the vinyl-type monomer. Most preferably, the amount is 0.1 moles or less relative to 1 mole of the vinyl-type monomer. Further, if necessary, the amount can be 0.07 moles or less, 0.05 moles or less, 0.03 moles or less, 0.02 moles or less, or 0.01 moles or less relative to 1 mole of the vinyl-type monomer.

Most of the aforementioned organic halides are known compounds. Reagents, which are sold from reagent sellers or the like, can directly be used. Alternatively, the compounds may be synthesized with conventionally known synthesizing methods.

In regard to the organic halide, it is also possible that raw materials thereof are introduced so as to generate the organic halide in situ during the polymerization, such that the product can be used as the organic halide for this polymerization method. For example, azobis(isobutyronitrile) and iodine ($I_2$) can be introduced as raw materials, CP—I (the chemical formula is as described above), which is an alkyl iodide, can be generated in situ during the polymerization, and this product can be used as the alkyl iodide for this polymerization method.

As for the organic halide, it is also possible to use a compound that is immobilized at a surface such as an inorganic or organic solid surface, or an inorganic or organic molecular surface. For example, an organic halide immobilized on a silicon substrate surface, a polymer film surface, an inorganic or organic microparticle surface, a pigment surface or the like, can be used. The immobilization can be achieved utilizing, for example, chemical binding, physical binding or the like.

Monomer

As a monomer, the polymerization method of the present invention uses a radical polymerizable monomer. A radical polymerizable monomer refers to a monomer having an unsaturated bond which may be subjected to a radical polymerization under the presence of an organic radical. Such an unsaturated bond may be a double bond or triple bond. That is, the polymerization method of the present invention can use an arbitrary monomer, which was conventionally known as a monomer for performing a living radical polymerization.

More specifically, the so-called vinyl monomers can be used. Vinyl monomer is a general name for monomers which are represented by the general formula "$CH_2=CR^5R^6$".

A monomer having the general formula in which $R^5$ is methyl, and $R^6$ is carboxylate, is referred to as a methacrylate-type monomer, and can preferably be used in the present invention.

Specific examples of the methacrylate-type monomer include methyl methacrylate, ethyl methacrylate, propyl methacrylate, n-butyl methacrylate, t-butyl methacrylate, hexyl methacrylate, 2-ethylhexyl methacrylate, nonyl methacrylate, benzyl methacrylate, cyclohexyl methacrylate, lauryl methacrylate, n-octyl methacrylate, 2-methoxyethyl methacrylate, butoxyethyl methacrylate, methoxytetraethyleneglycol methacrylate, 2-hydroxyethyl methacrylate, 2-hydroxypropyl methacrylate, 3-chloro-2-hydroxypropyl methacrylate, tetrahydrofurfuryl methacrylate, 2-hydroxy-3-phenoxypropyl methacrylate, diethyleneglycol methacrylate, polyethylene glycol methacrylate, 2-(dimethylamino)ethyl methacrylate, and the like. Further, methacrylic acid can be used.

The aforementioned vinyl monomers having the aforementioned general formula in which $R^5$ is hydrogen and $R^6$ is carboxylate, are generally referred to as acrylic type monomers and can preferably be used in the present invention.

Specific examples of the acrylate-type monomer include methyl acrylate, ethyl acrylate, propyl acrylate, n-butyl acrylate, t-butyl acrylate, hexyl acrylate, 2-ethylhexyl acrylate, nonyl acrylate, benzyl acrylate, cyclohexyl acrylate, lauryl acrylate, n-octyl acrylate, 2-methoxyethyl acrylate, butoxyethyl acrylate, methoxytetraethyleneglycol acrylate, 2-hydroxyethyl acrylate, 2-hydroxypropyl acrylate, 3-chloro-2-hydroxypropyl acrylate, tetrahydrofurfuryl acrylate, 2-hydroxy-3-phenoxypropyl acrylate, diethyleneglycol acrylate, polyethyleneglycol acrylate, 2-(dimethylamino)ethyl acrylate, N,N-dimethylacrylamide, N-methyrolacrylamide, N-methyrolmethacrylamide, and the like. Further, an acrylic acid can be used.

A monomer having the aforementioned general formula of a vinyl monomer, in which $R^5$ is hydrogen, and $R^6$ is phenyl, is styrene, which can be suitably used in the present invention. A monomer, in which $R^6$ is phenyl or a phenyl derivative, is referred to as a styrene derivative, which can suitably be used in the present invention. Specifically, such a monomer includes o-, m-, or p-methoxystyrene, o-, m-, or p-t-butoxystyrene, o-, m-, or p-chloromethylstyrene, o-, m-, or p-chlorostyrene, o-, m-, or p-hydroxystyrene, o-, m-, or p-styrenesulfonic acid and the like. Further, a monomer in which $R^6$ is aromatic, (for example, vinylnaphthalene) can be used.

A monomer having the aforementioned general formula of a vinyl monomer, in which $R^5$ is hydrogen and $R^6$ is alkyl, is alkylene, which can be suitably used in the present invention.

In the present invention, monomers having two or more vinyl groups can be used. Specifically, for example, a diene-type compound (e.g., butadiene, isoprene and the like), a compound having two allyl groups (for example, diallyl isophthalate and the like), a dimethacrylate of a diol compound, a diacrylate of a diol compound, and the like, can be used.

Vinyl monomers other than those described above can also be used in the present invention. Specifically, for example, vinyl esters (for example, vinyl acetate, vinyl propionate, vinyl benzoate, vinyl acetate), styrene derivatives other than the aforementioned styrene derivatives (for example, α-methylstyrene), vinyl ketones (for example, vinyl methyl ketone, vinyl hexyl ketone, methyl isopropenyl ketone), N-vinyl compounds (for example, N-vinyl pyrrolidone, N-vinyl pyrrole, N-vinyl carbazole, N-vinyl indole), (meth)acrylamide and its derivatives (for example, N-isopropyl acrylamide, N-isopropylmethacrylamide, N,N-dimethylacrylamide, N,N-dimethylmethacrylamide, N-methylolacrylamide, N-methylolmethacrylamide), acrylonitrile, methacrylonitrile, maleic acid and its derivatives (for example, maleic anhydride), halogenated vinyls (for example, vinyl chloride, vinylidene chloride, tetrachloroethylene, hexachloropropylene, vinyl fluoride), olefins (for example, ethylene, propylene, 1-hexene, cyclohexene), and the like.

One of these monomers may be used alone, or a combination of two or more of the monomers may be used.

It should be noted that in the present invention, a monomer having both a hydroxyl group and a radically polymerizable double bond (e.g., 2-hydroxymethylmethacrylate), and a monomer having both a carboxyl group and a radically polymerizable double bond (e.g., acrylic acid) can be used as a monomer. In these compounds, the radically polymerizable double bond is distant from the hydroxyl group via at least one or more elements (e.g., carbon). The hydroxyl group that is not directly bound to the radically polymerizable double bond has low reactivity with a radical. On the other hand, the radically polymerizable double bond that is not directly bound to the hydroxyl group has high reactivity with a radical. Thus, in these compounds, a reaction of the double bond with a radical occurs more preferentially than a reaction of the hydroxyl group with a radical. Consequently, these compounds act as monomers in living radical polymerization, but do not substantially act as a catalyst precursor. Therefore, in the present invention, these compounds are classified as monomers, not as a catalyst precursor.

On the other hand, the hydroxyl group that is directly bound to the double bond has high reactivity with a radical, while the double bond that is directly bound to the hydroxyl group has no (or very low) reactivity with a radical. Vitamin C has one double bond and four hydroxyl groups in its molecule. However, the double bond in vitamin C is directly bound to the hydroxyl group, (thus exhibits properties similar to an aromatic double bond), and therefore there is no (or very low) reactivity of the double bond and a radical. For the above reasons, in vitamin C, the reactivity of the hydroxyl group and a radical is significantly higher than the reactivity of the double bond and a radical, and thus vitamin C does not act as a monomer, but as a catalyst precursor.

There is no particular limitation to the combination of the aforementioned monomer and the catalyst of the present invention. A catalyst of the present invention, which is arbitrarily selected, may be used for a monomer, which is arbitrarily selected. However, regarding methacrylate-type monomers, a catalyst having a substituent having an aromatic ring, more specifically a catalyst having aryl or substituted aryl is more preferably used in terms of the reactivity, than the other catalysts.

Radical Reaction Initiator

In the living radical polymerization method of the present invention, if necessary, an adequate amount of a radical reaction initiator is used. Initiators, which are known as initiators to be used for a radical reaction, can be used as the radical reaction initiator. For example, azo-type radical reaction initiators and peroxide-type radical initiators can be used. Specific examples of the azo-type radical reaction initiators include, for example, azobis(isobutyronitrile). Among peroxides, organic peroxides are preferable. Specific examples of peroxide-type radical initiators include, for example, benzoylperoxide and dicumyl peroxide, t-butyl peroxybenzoate (BPB), di(4-tert-butylcyclohexyl) peroxydicarbonate (PERKADOX16).

The amount of the radical initiator used is not particularly limited. However, preferably, the amount is 1 millimole or more to 1 liter of the reaction solution. More preferably, the amount is 5 millimoles or more to 1 liter of the reaction solution. Further preferably, the amount is 10 millimoles or more to 1 liter of the reaction solution. Additionally, the amount is preferably 500 millimoles or less to 1 liter of the reaction solution. More preferably, the amount is 100 millimoles or less to 1 liter of the reaction solution. Further preferably, the amount is 50 millimoles or less to 1 liter of the reaction solution.

Solvents

When a reaction mixture of a monomer and other ingredients is liquid at the reaction temperature, it is not always necessary to use a solvent. If necessary, a solvent may be used. Solvents, which were conventionally used for a living radical polymerization, can be used in the method of the present invention. When a solvent is to be used, the amount of use is not particularly limited as long as the polymerization reaction is appropriately carried out; however, it is preferable to use a solvent in an amount of 1 part by weight or more relative to 100 parts by weight of the monomer, more preferable to use 10 parts by weight or more, and even more preferable to use 50 parts by weight or more. When the amount of use of the solvent is too small, the viscosity of the reaction solution may be excessively high. Furthermore, it is preferable to limit the amount to 2000 parts by weight or less, more preferable to limit to 1000 parts by weight or less, and even more preferable to limit to 500 parts by weight or less relative to 100 parts by weight of the monomer. When the amount of use of the solvent is too large, the monomer concentration in the reaction solution may be excessively low.

Emulsion polymerization, dispersion polymerization or suspension polymerization can also be carried out by using a solvent that is not miscible with the monomer. For example, in the case of using styrene or methacrylate as the monomer, water can be used as the solvent, such that emulsion polymerization, dispersion polymerization or suspension polymerization can be carried out.

Other Additives and the Like

To the various aforementioned materials used for the living radical polymerization, known additives may be added as necessary, in their required amounts. Examples of such additives include an antioxidant, a polymerization suppressant, and the like.

Raw Material Composition

By mixing the various raw materials described above, a raw material composition that is appropriate as a material for the living radical polymerization, is obtained. The obtained composition can be used in the conventionally known methods for a living radical polymerization.

According to one embodiment, the raw material composition does not include any raw material other than the various raw materials mentioned above. For example, it is preferable, from the viewpoint of environmental problems and the like, that the raw material composition does not substantially include a raw material containing a transition metal. According to a preferred embodiment, the raw material composition does not substantially include any raw material other than an initiator, a catalyst, a catalyst precursor compound, a monomer having a radical-reactive unsaturated bond, a solvent, and an organic halide having a carbon-halogen bond. It is also preferable that the raw material composition do not substantially include any material irrelevant to living radical polymerization (for example, an episulfide compound or the like). For example, it is preferable to limit the content of a material irrelevant to living radical polymerization (for example, an episulfide compound or the like) to 1 part by weight or less relative to 100 parts by weight of the monomer having a radical-reactive unsaturated bond, more preferable to limit to 0.1 part by weight or less, even more preferable to limit to 0.01 part by weight or less, and particularly preferable to limit to 0.001 part by weight or less. It is possible that the content of a material irrelevant to living radical polymerization is limited to zero part by weight, that is, it is possible that the material is not contained at all.

Furthermore, if it is desired to make the best possible use of the advantage of the catalyst or catalyst precursor that has oxygen as the central element, the raw material composition can be prepared as a composition that does not substantially include any catalyst or catalyst precursor for living radical polymerization other than the catalyst and catalyst precursor that have oxygen as the central element. For example, it is preferable to limit the content of a catalyst or catalyst precursor for living radical polymerization other than the catalyst and catalyst precursor that have oxygen as the central element (for example, transition metal complex, boron compound, and the like) to 1 part by weight or less relative to 100 parts by weight of the monomer having a radical-reactive unsaturated bond, more preferable to limit to 0.1 part by weight or less, even more preferable to limit to 0.01 part by weight or less, much more preferably to limit to 0.001 part by weight or less, and particularly preferable to limit to 0.0001 part by weight or less. It is possible that the content of a catalyst or catalyst precursor for living radical polymerization other than the catalyst and catalyst precursor that have oxygen as the central element (for example, transition metal complex, boron compound, and the like) is limited to zero part by weight, that is, it is possible that they are not contained at all.

It should be noted that in the present specification, hereinafter, when "not substantially contain" is described, generally, it is preferable to limit the content of a substance to 1 part by weight or less relative to 100 parts by weight of the monomer having a radical-reactive unsaturated bond, more preferable to limit to 0.1 part by weight or less, even more preferable to limit to 0.01 part by weight or less, much more preferably to limit to 0.001 part by weight or less, and particularly preferable to limit to 0.0001 part by weight or less. It is possible that the content is limited to zero part by weight, that is, they are not contained at all.

According to one embodiment, the raw material composition includes an, initiator, a catalyst or a catalyst precursor, a monomer having a radical-reactive unsaturated bond, and an organic halide having a carbon-halogen bond, and may further include a solvent.

Raw Material Composition Including Catalyst

In one embodiment that makes use of a catalyst compound, the raw material composition includes an initiator, a catalyst, a monomer having a radical-reactive unsaturated bond, and an organic halide having a carbon-halogen bond. The raw material composition may further include a solvent, in addition to these.

According to one embodiment, the raw material composition is a composition substantially consisting of an initiator, a catalyst, a monomer having a radical-reactive unsaturated bond, an organic halide having a carbon-halogen bond, and a solvent. Here, if not needed, the solvent may be excluded. The raw material composition is, for example, a composition that does not substantially include any component participating in the radical polymerization reaction, other than an initiator, a catalyst, a monomer having a radical-reactive unsaturated bond, an organic halide having a carbon-halogen bond and a solvent. Also, the composition may consist of only an initiator, a catalyst, a monomer having a radical-reactive unsaturated bond, an organic halide having a carbon-halogen bond, and a solvent. In this case as well, if not needed, the solvent may be excluded.

Raw Material Composition Including Catalyst Precursor Compound

In one embodiment that makes use of a catalyst precursor compound, the raw material composition includes a peroxide, a catalyst precursor compound, a monomer having a radical-reactive unsaturated bond, and an organic halide having a carbon-halogen bond. The raw material composition may further include a solvent, in addition to these.

According to one embodiment, the raw material composition is a composition substantially consisting of a peroxide, a catalyst precursor compound, a monomer having a radical-reactive unsaturated bond, an organic halide having a carbon-halogen bond, and a solvent. Here, if not needed, the solvent may be excluded. For example, the raw material composition is a composition that does not include any component participating in the radical polymerization reaction, other than a peroxide, a catalyst precursor compound, a monomer having a radical-reactive unsaturated bond, an organic halide having a carbon-halogen bond, and a solvent. Also, the composition may consist of only a peroxide, a catalyst precursor compound, a monomer having a radical-reactive unsaturated bond, an organic halide having a carbon-halogen bond, and a solvent. In this case as well, if not needed, the solvent may be excluded.

Reaction Temperature

A reaction temperature in the method of the present invention is not particularly limited. Preferably, the reaction temperature is 10° C. or more. More preferably, the reaction temperature is 20° C. or more. Further preferably, the reaction temperature is 30° C. or more. Still preferably, the reaction temperature is 40° C. or more. Particularly preferably, the reaction temperature is 50° C. or more. Additionally, the reaction temperature is preferably 130° C. or less. More preferably, the reaction temperature is 120° C. or less. Further preferably, the reaction temperature is 110° C. or less. Still preferably, the reaction temperature is 105° C. or less. Particularly preferably, the reaction temperature is 100° C. or less.

When the temperature is too high, there is a disadvantage that heating facilities and the like may be expensive. When the temperature is a room temperature or lower, there is a disadvantage that cooling facilities and the like may be expensive. Additionally, if a reaction mixture is prepared such that polymerization occurs at a room temperature or lower, the reaction mixture is unstable at room temperature and may react. Therefore, there is the disadvantage that it is difficult to store the reaction mixture. Therefore, the aforementioned range of the temperature, which is slightly higher than room temperature but is not too high (for example, 50° C. to 100° C.) is very preferable in term of the practical sense.

Reaction Period of Time

The reaction time period in the method of the present invention is not particularly limited. Preferably, the reaction time period is 15 minutes or more. More preferably, the reaction time period is 30 minutes or more. Further preferably, the reaction time period is 1 hour or more. Additionally, the reaction time period is preferably 3 days or less. More preferably, the reaction time period is 2 days or less. Further preferably, the reaction time period is 1 day or less.

If the reaction time period is too short, it is difficult to obtain a sufficient molecular weight. If the reaction period of time is too long, the efficiency of the entire process would be unsatisfactory. Advantageous results (an adequate monomer conversion and reduction of a side reaction) may be achieved by selecting a suitable reaction time period.

Atmosphere

The polymerization reaction in the method of the present invention may be carried out under a condition where air is present in the reaction vessel. Further, if necessary, the air may be replaced with an inert gas such as nitrogen or argon.

Precursor

In the polymerization method of the present invention, the reaction may be carried out by directly using the above-described catalyst (that is, by introducing the catalyst into the polymerization vessel), but the reaction may also be carried out using a precursor of the catalyst, without directly using the catalyst. Here, the precursor of the catalyst refers to a compound that does not conform to the definition of the catalyst as described above at the time of being introduced into the reaction vessel, but undergoes a chemical change in the reaction vessel to be brought to a state of being capable of acting as a catalyst. Here, the phrase "brought to a state of being capable of acting as a catalyst" preferably means that the precursor is converted into the catalyst compound.

A compound that is capable of producing an activated radical similar to an activated radical generated from the catalyst compound at the time of the polymerization reaction corresponds to the precursor. For example, a hydride of oxygen corresponds to the precursor. That is, when a radical generated after a radical initiator is decomposed, or a polymer radical derived therefrom abstracts hydrogen of a hydride of oxygen, an activated radical of the oxygen compound can be generated, and living radical polymerization can be carried out.

Therefore, according to one embodiment of the polymerization method of the present invention, the reaction can be carried out by directly using the catalyst described above, but in another embodiment, a precursor of the catalyst compound can be used without directly using the catalyst described above. In this case, a step of chemically changing the precursor is carried out before the step of carrying out the polymerization reaction. The step of chemically changing the precursor may be carried out within the vessel for carrying out the polymerization reaction, or may be carried out in a vessel different from the polymerization reaction vessel. It is advantageous to carry out the step of chemically changing the precursor simultaneously with the polymerization reaction step in the vessel for performing the polymerization reaction, from the viewpoint that the overall process is simplified.

In regard to the amount of the precursor used, an amount similar to the aforementioned amount of use of the catalyst can be used. It is preferable to use such an amount of the precursor that an amount of the activated radical obtained from the precursor is similar to the amount of the activated radical in the case of using the catalyst in the above-described amount.

The method for living radical polymerization of the present invention can be applied to homopolymerization, that is, production of a homopolymer, but it is also possible to produce a copolymer using the method of the present invention in copolymerization. The copolymerization may be random copolymerization, or may also be block copolymerization.

The block copolymer may be a copolymer having two or more types of blocks linked together, or may be a copolymer having three or more types of blocks linked together.

In the case of block copolymerization using two types of blocks, for example, a block copolymer can be obtained by a method including a step of polymerizing a first block and a step of polymerizing a second block. In this case, the method of the present invention may be used in the step of polymerizing the first block, or the method of the present invention may be used in the step of polymerizing the second block. It is preferable to use the method of the present invention in both of the process of polymerizing the first block and the process of polymerizing the second block.

More specifically, for example, a block copolymer can be obtained by polymerizing the first block, and then carrying out the polymerization of the second block in the presence of the obtained first polymer. The first polymer can be supplied to the polymerization of the second block after isolation and purification, or the polymerization of blocks can also be carried out by adding the second monomer to the first polymerization in the middle of or at the completion of the polymerization of the first polymer, without isolation and purification of the first polymer.

Also in the case of producing a block copolymer having three types of blocks, the steps of polymerizing the respective blocks are carried out in the same manner as in the instance of producing a copolymer having two or more types of blocks linked together, and thereby a desired copolymer can be obtained. It is also preferable to use the method of the present invention in all of the block polymerization steps.

Reaction Mechanism

Although the present invention is not particularly bound to a theory, an inferred mechanism will be explained.

The basic concept of a living radical polymerization method is a reversible activating reaction of a dormant species (polymer-X) to a growing chain radical (polymer). A method, which uses a halogen as protecting group X and uses a transition metal complex as an activating catalyst, is one of useful living radical polymerization methods. According to the present invention, an oxygen compound is used. It is possible to abstract a halogen from an organic halide with high reactivity. It is possible to produce a radical reversibly (Scheme 1).

It has been recognized that, generally, a transition metal can have electrons in various transition states and therefore, a transition metal is superior in the catalytic activity for various chemical reactions. Therefore, regarding catalysts suitable for a living radical polymerization, it was considered that a transition metal is superior. On the contrary, a typical element is considered disadvantageous for such a catalyst.

However, according to the present invention, oxygen is used as a central element in the catalyst. According to the present invention, unexpectedly, as shown in the scheme of FIG. 5, the halogen is exchanged between the catalyst and the growing chain radical, and the polymerization reaction proceeds with very high efficiency. It is considered that this is because the bond between the central element and the halogen is suitable for performing the exchange of the halogen with the reaction intermediate. Basically, it is considered that a compound having the bond between the central element and the halogen can catalyze the living radical polymerization satisfactorily even if the compound has a substituent other than the central element and halogen.

The following Scheme 1 shows the reaction formula in the case of using the catalyst of the present invention.

Scheme 1

Chemical formula 14

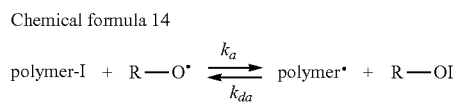

Furthermore, in the case of using a precursor (R—OH (alcohol)), a step of generating an activated radical (R—O.) from the precursor is carried out before the reaction based on the mechanism described above, or at the same time as the reaction. Specifically, a radical generated by decomposition of a radical initiator, or a growing chain radical produced therefrom (both are represented by R'.) abstracts hydrogen of the precursor, and thereby an activated radical can be obtained (Scheme 2(a)).

Scheme 2

Chemical formula 15A

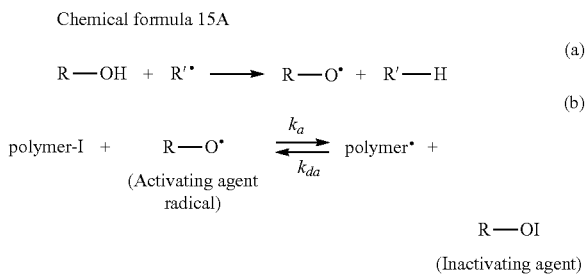

Removal of Halogen Bound to an End of Produced Polymer

The produced polymer that is obtained by the method of the present invention has halogen (for example, iodine) at the chain end. When this polymer is to be used in products, if needed, the polymer can be used after removing the halogen at the end. It is also possible to positively utilize the halogen at the end and to convert this into a different functional group, so as to bring out a new function. The reactivity of the halogen at the end is generally high, and the removal or conversion of the halogen can be carried out by a wide variety of reactions. For example, an example of a method of treating the polymer end when the halogen is iodine, will be shown in the following Scheme 3. The polymer end can be utilized by the reactions shown in these schemes or the like. Even when the halogen is other than iodine, the polymer end can be converted into a functional group in the same manner.

Scheme 3

Chemical formula 15B

Conversion of terminal iodine

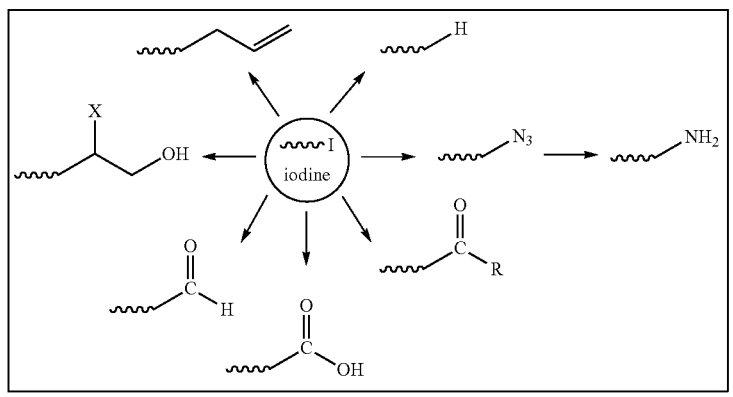

(Reference) Matyjaszewski, K., Davis, T.P., Eds.; *Handbook of Radical Polymerization*; Wiley & Sons: New York, 2002.

Simple removal/conversion of terminal iodine

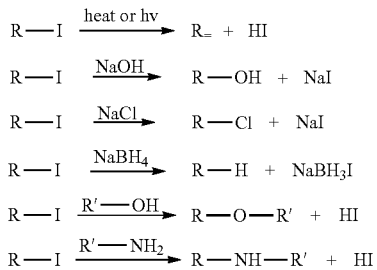

Use of the Polymer

According to the aforementioned living radical polymerization method of the present invention, a polymer having narrow molecular weight distribution is obtained. For example, it is possible to select a suitable formulation of reaction material, reaction conditions and the like, such that a polymer having the $M_w/M_n$ ratio, which is the ratio of the weight average molecular weight Mw to the number average molecular weight $M_n$, is 1.5 or less. It is also possible to select a further suitable formulation of the reaction material and reaction conditions such that a polymer having the $M_w/M_n$ ratio of 1.4 or less, a polymer having the $M_w/M_n$ ratio of 1.3 or less, a polymer having the $M_w/M_n$ ratio of 1.2 or less, or a polymer having the $M_w/M_n$ ratio of 1.1 or less is obtained.

The polymer obtained by the living radical polymerization method of the present invention can be applied for various uses. For example, the polymer can be used for manufacturing resist material, adhesive, lubricant, paint, ink, dispersant, packaging material, pharmaceuticals, a personal care product (hairdressing material, cosmetics and the like), elastomer (material for automobiles, industrial articles, sports article, materials for coating electrical wire, materials for buildings, and the like), resist material, materials for organic and the like. Furthermore, it can be used for creating new electronics material, optical material, dynamic material, crystal material, separation material, lubricant material, and medical material.

The polymer obtained by the living radical polymerization method of the present invention can also be advantageously used in various applications from the viewpoint that the amount of catalyst remaining in the polymer is low. That is, since the amount of catalyst can be decreased relative to the conventional transition metal-based catalysts and the like, the obtained resins acquire high purity, and the polymer can be suitably used in the applications where a high purity resin is required. The catalyst residue may be removed from the produced polymer, or may not be removed, depending on the application. The polymer may be molded, or dissolved or dispersed in a solvent or a dispersion medium depending on such various applications. However, the molded polymer, or the dissolved or dispersed polymer also maintains the advantages of the present invention, and thus these polymers still belong to the scope of the polymer obtained by the polymerization method of the present invention.

The polymer synthesized using the polymerization method of the present invention has advantages such as the advantage that the molecular weight distribution is narrow, the advantage that the amount of catalyst remaining in the polymer is small, and the advantage that the cost is low, and thus the polymer can be utilized in various applications by making the best use of the advantages.

For example, a homopolymer, a random copolymer and a block copolymer formed from benzyl methacrylate and having narrow molecular weight distribution can be used as high performance resist materials.

Further, for example, a polymer of methacrylate (for example, dimethylaminomethacrylate or 2-hydroxyethyl methacrylate), methacrylic acid, acrylate, acrylic acid or the like can be used in applications such as adhesives, paints, inks and pigment dispersants.

Further, when a polybranched polymer is synthesized by the method of the present invention, the polymer is useful as a lubricant.

Further, polymers obtained by the method of the present invention (for example, hydroxyethyl methacrylate, polyethylene glycol methacrylate, and the like) are also useful as drug sustained-release materials or medical materials.

Further, polymers obtained by the method of the present invention (for example, dimethylaminomethacrylate, methacrylic acid, 2-hydroxyethyl methacrylate, polyethylene glycol methacrylate, and the like) are also useful for personal care products (for example, hairdressing materials or cosmetic products).

Further, polymers obtained by the method of the present invention (for example, acrylate, methacrylate, styrene, diene and the like) are also useful in applications such as elastomer or coating.

Further, polymers obtained by the method of the present invention are also useful in the creation and production of non-conventional new electronic materials, optical materials, mechanical materials, crystalline materials, separation materials, lubricant materials, medical materials and the like.

Furthermore, the method of the present invention can be, for example, applied to surface graft polymerization, and can produce high density polymer brushes that can be used in various applications.

Further, when a compound that does not have electroconductivity is used as a catalyst, a polymer that can be suitably used even in applications where the absence of any residual electroconductive impurities in the polymer is required (for example; resist materials, organic electroluminescence materials and the like), may be obtained.

The catalyst of the present invention is characterized in that the central element of the catalyst is oxygen. Regarding oxygen, the electrons (radicals) located in the p-orbital (or a hybrid orbital of the p-orbital and the s-orbital) contribute to the reaction. They are completely different from transition metals in which the electrons of the d-orbital contribute to the reaction. It was found as a result of the researches of the inventors of the present invention that the radicals located in the p-orbital of oxygen have very high power for abstracting halogen from alkyl halides (dormant species) during a living radical polymerization. Further, it was found that the radical of the p-orbital generally have remarkably high power for abstracting halogen from a dormant species, even if compared with the radicals of transition metals. Therefore, oxygen that is capable of producing such a powerful p-orbital radical can serve as potent catalysts.

EXAMPLES

Hereinafter, Examples of the present invention will be explained. However, the present invention is not limited by these Examples.

The monomers, alkyl halides, and catalysts used in the following examples are shown as follows.
Used Compounds
First, the structures of the main compounds used in the Examples are described below.

Monomers

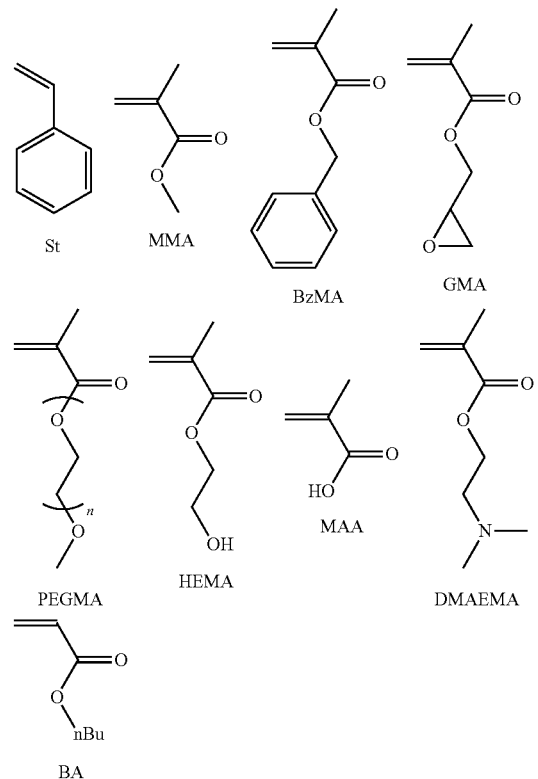

Chemical formula 16

Organic Halide Compounds

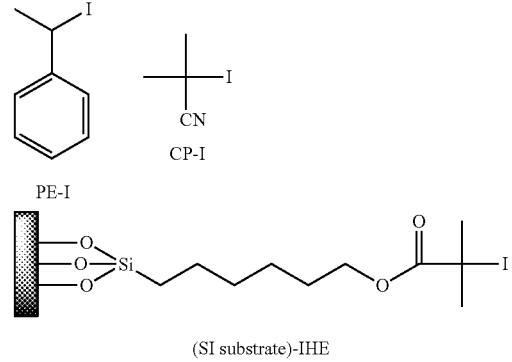

Chemical formula 17

Catalysts

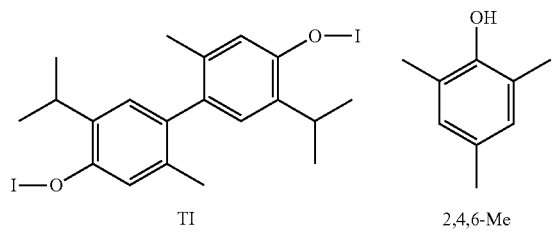

Chemical formula 18

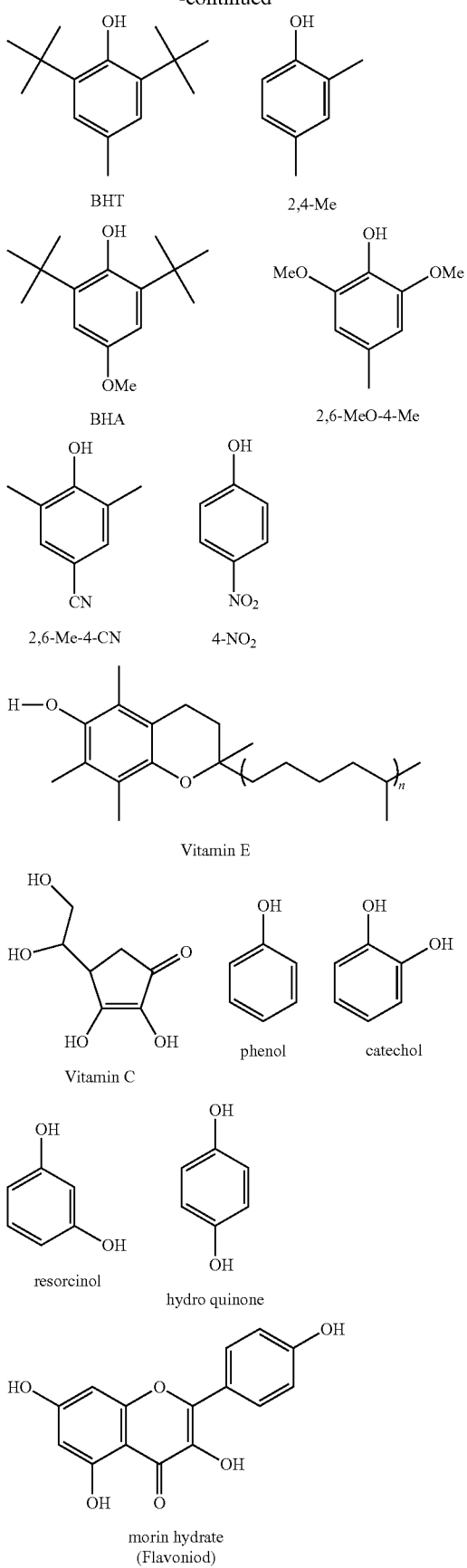

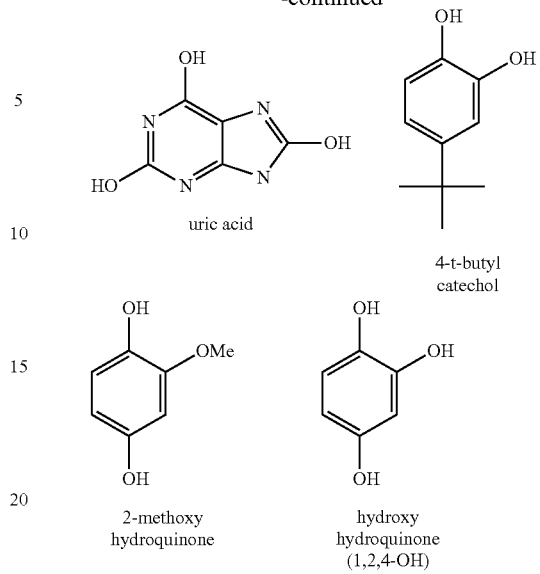

Example 1 and Comparative Example 1

Homopolymerizations of Styrene (St) with Thymol Iodide (Catalyst)

80 mM of 1-phenylethyl iodide (PE-I, the chemical formula is shown above) was used as an alkyl halide. 5 mM of thymol iodide (TI, the chemical formula is shown above) was used as a catalyst. 10 mM of 2,2'-azobis(2,4,4-trimethylpentane) (VR110) was used as a radical initiator. These materials were dissolved in 2 g of styrene to form a reaction solution having the aforementioned concentrations. The monomer concentration was 8 M (bulk). The solubility of these materials was satisfactory, and a homogenous solution was formed. The remaining oxygen was replaced with argon. The reaction solution was heated to 100° C. to perform the polymerization reaction.

It is noted that regarding concentrations, "mM" refers to the number of millimoles relative to 1 liter of a monomer. For example, 80 mM means that 80 millimoles of a solute is dissolved in 1 liter of a monomer. Regarding concentrations, "M" refers to the number of moles relative to 1 liter of a monomer. For example, 8 M means that 8 moles of a solute is dissolved in 1 liter of a monomer.

The experiments of entries 1 to 4 as well as entry C1 were performed using the reaction materials and reaction conditions as shown in Table 1. The experiments of entries 1 to 4 are relevant to the experiments of Example 1. The experiment of entry C1 is relevant to the experiment of Comparative Example 1. In Table 1 and all the other Tables shown below (Tables 1-17), PDI denotes a ratio of $M_w/M_n$. Further, $M_n$ is a number average molecular weight of the obtained polymer. Mw is a weight average molecular weight of the obtained polymer.

$M_{n,theo}$ denotes a theoretical value calculated according to the following formula:

$$M_{n,theo}=([M]_0/[R-I]_0)\times(\text{molecular weight of the monomer})\times(\text{conv})/100,$$

where $[M]_0$ and $[R-I]_0$ are the initial concentrations (charge concentration) of monomer and alkyl iodide, respectively, and cony is the monomer conversion ratio (polymerization ratio).

In this polymerization, a growing chain radical (polymer.), which was generated by cleavage of VR110, abstracts iodine from inactivating agent TI to produce a thymol radical (alcohol radical R—O.), which is an activated radical, in situ (with a polymer-iodine adduct (polymer-I)) (Scheme 1). The activation reaction is based on the action of a thymol radical. The results are shown in Table 1 (entry 1). The results are shown in Table 1 (entry 1) and FIGS. 1A and 1B (●, black circle). In FIG. 1A, [M] in the vertical axis shows a monomer concentration, and $[M]_0$ shows an initial monomer concentration (a monomer concentration at polymerization time zero). For example, at 24 hours, the conversion ratio became 59%, and $M_n$ and PDI were 5,100 and 1.32, respectively. $M_n$ was approximately in proportion to the conversion ratio. PDI was as low as about 1.3 from the early stage of the polymerization, and it can be said that the activation frequency is sufficiently high. By using as a radical initiator t-butyl peroxybenzoate (BPB), of which cleavage is faster, for example, the conversion ratio was largely increased to 76% in 7 hours, and $M_n$ and PDI were 8,500 and 1.29, respectively (Table 1 (entry 2) and FIGS. 1A and 113 (○, white circle)). Thus, while PDI was controlled, the polymerization rate was successfully increased. Further, even though the amount of the catalyst was reduced from 5 mM to 2 mM and the temperature was lowered from 100° C. to 80° C. (entry 3), the molecular weight distribution was controlled (PDI=1.34). In view of the molecular weight of TI (about 560), the amount of 2 mM corresponds to about 0.135 weight % in the styrene monomer solution. This amount is about one sixty-fifth (about 1/65) in comparison with the amount of the catalyst (8.9 weight %) used in the experimental example described in non-patent document 1 which is described later. As described above, a living radical polymerization reaction can be conducted with a quite small amount. Therefore, it was confirmed that the activity of the catalyst is very high. As an alkyl halide, CP—I (the chemical formula is shown above) was also successfully used instead of PE-I (entry 4).

In comparative example 1, i.e., in a system containing no catalyst, $M_w/M_n$ was 1.55. That is, the molecular weight distribution was broader than that of the experimental results of the polymerization of styrene using the catalyst of the present invention (entry C1). It can be said that the molecular weight distribution was controlled by the action of the catalyst. From the tacticity of the polymers produced, it was confirmed that the polymerizations were radical polymerizations.

TABLE 1

HOMOPOLYMERIZATIONS OF STYRENE (ST) WITH THYMOL IODIDE (CATALYST)

| entry | Monomer (equivalent to $[R—I]_0$) | R—I | I | catalyst | Temperature (° C.) | $[R—I]_0/[I]_0/[catalyst]_0$ (mM) | time (h) | conversion ratio (%) | $M_n$ ($M_{n,theo}$) | PDI |
|---|---|---|---|---|---|---|---|---|---|---|
| 1 | St (100 eq) | PE-I | VR 110 | TI | 100 | 80/80/5 | 2 | 8.8 | 1800 (880) | 1.35 |
|   |   |   |   |   |   |   | 4 | 20 | 2400 (2000) | 1.38 |
|   |   |   |   |   |   |   | 7 | 44 | 4200 (4400) | 1.34 |
|   |   |   |   |   |   |   | 24 | 59 | 5100 (5900) | 1.32 |
| 2 | St (100 eq) |   | BPB |   |   | 80/40/5 | 2 | 19 | 2400 (1900) | 1.29 |
|   |   |   |   |   |   |   | 4 | 48 | 5400 (4800) | 1.38 |
|   |   |   |   |   |   |   | 7 | 76 | 8500 (7600) | 1.29 |
| 3 | St (100 eq) |   | BPO |   | 80 | 80/40/2 | 7 | 71 | 7900 (7100) | 1.34 |
| 4 | St (100 eq) | CP—I | VR 110 |   | 100 | 80/80/5 | 7 | 60 | 6800 (6000) | 1.41 |
| C1 | St (100 eq) | PE—I | DCP | none | 100 | 80/20/0 | 4 | 41 | 4200 (4100) | 1.55 |

Monomer: styrene (St)
Monomer concentration: 8M (bulk)
Alkyl halide (R—I): 1-phenylethyl iodide (PE—I), 2-cyanopropyl iodide (CP—I)
Radical initiator (I): 2,2'-azobis(2,4,4-trimethylpentane) (VR110), t-butyl peroxybenzoate(BPB), benzoyl peroxide (BPO)
Catalyst: Thymol iodide (TI)
$M_n$ and PDI: Molecular weight and polydispersity obtained by gel permeation chromatography (GPC) with tetrahydrofuran (THF) as an eluent calibrated by polystyrene (PSt) standard.

Example 2

Homopolymerizations of Styrene (St) with Alcohol (Precursor-Type Catalyst)

Polymerization of styrene (St) was carried out similarly to Example 1 except for the changes of the reaction materials and reaction conditions, as shown in Table 2 (entries 1 to 40).

In a system similar to Example 1, however, instead of thymol iodide (TI), which is an iodide of oxygen, alcohol R—OH, which is a hydride of oxygen, was used as a precursor of a catalyst (Scheme 2). In this polymerization, a radical generated by cleavage of a radical initiator or a growing chain radical (polymer.) that is derived therefrom abstracts hydrogen of R—OH to generate R—O., which is an activated radical (Scheme 2a). Based on the action of the oxygen radical, the reversible activation is conducted (Scheme 2b).

In this Example, as a catalyst (the chemical formulas are shown above), 2,4,6-trimethylphenol (2,4,6-Me), 2,6-di-t-butyl-4-methylphenol (2,6-tBu-4-Me(BHT)), 2,4-dimethylphenol (2,4-Me), 2-isopropyl-5-methylphenol (2-iPr-5-Me), 2,6-di-t-butyl-4-methoxyphenol (2,6-tBu-4-MeO (BHA)), 2,6-dimethoxy-4-methyl (2,6-MeO-4-Me), 2,6-dimethyl-4-cyanophenol (2,6-Me-4-CN), 4-nitrophenol (4-NO$_2$), phenol, vitamin E, vitamin C, hydroquinone, resorcinol, catechol, hydroxyhydroquinone, uric acid, or morin hydrate was used. These hydrides of oxygen have higher stability to water or light in comparison with iodides (e.g., TI), and when a polymerization solution is prepared, easy and simple operation is made possible. Further, the hydrides are very inexpensive.

The results of the polymerization of styrene using 2,4,6-Me as a catalyst are shown in Table 2 (entries 1-5), FIGS. 2A and 2B (●, black circle), and FIGS. 3A and 3B (●, black circle). In using a catalyst in such a small amount as 5 mM, $M_n$ was approximately in proportion to the conversion ratio, PDI was as low as about 1.2 from the early stage of the polymerization, and thus the polymerization was well controlled. As a radical initiator, 2,2'-azobis(2,4,4-trimethylpentane) (VR110) (Table 2 (entry 1 and 3) and FIGS. 2A and 2B), t-butyl peroxybenzoate (BPB) (Table 2 (entry 2 and 4) and FIGS. 3A and 3B) were successfully used. The decomposition of BPB was faster than VR110, and thus, when BPB was used, the polymerization was successfully performed at a higher speed. For example, the conversion ratio reached at such a high conversion ratio as 65% in 7 hours, and $M_n$, and PDI were respectively 6,500 and 1.15. As described above, while PDI was controlled, the polymerization was successfully performed at a high speed. It was effective to use PE-I (entries 1 and 2) and CP—I (entries 3-5) as an alkyl halide. The polymerization was controlled at 100° C. (entries 1-4) and also at a lower temperature, i.e., 80° C. (entry 5).

Even when 2,6-tBu-4-Me (BHT) (entries 6-9), which is bulkier than 2,4,6-Me (entries 1-5), or 2,4-Me (entries 5 and 6), which is less bulkier than 2,4,6-Me, was used, the molecular weight distribution was successfully, highly controlled (PDI=1.19-1.43). Furthermore, 2-iPr-5-Me (thymol) (entry 13) was also successfully used. 2,6-tBu-4-MeO(BHA) (entries 14-16) and 2,6-MeO-4-Me (entries 17-19), which have an electron-donating group, and 2,6-Me-4-CN (entries 20 and 21) and 4-NO$_2$ (entry 22), which have an electron-withdrawing group, were also successfully used. BHT and BHA are widely utilized for a food additive, and are compounds being versatile and quite high in safety. Moreover, unsubstituted phenol (entries 23-26), of which the structure is most simple, thymol (a flavor ingredient of the fragrant herb thyme) (the aforementioned (entry 13)), which is a natural product and non-toxic, vitamin E (entries 27-30), and vitamin C (entries 31-34) were also successfully used. Whichever catalyst was used, when BPB was used, the polymerization was successfully performed at a high speed. For example, the conversion ratio reached at 68-84% in 7 hours.

Additionally, compounds having a plurality of hydroxyl groups were successfully used. In addition to vitamin C mentioned above, for example, as compounds having two hydroxyl groups, hydroquinone (entry 35), resorcinol (entry 36), catechol (entry 37), and 4-t-butylhydroquinone (entry 38) were successfully used. In all cases, the use in such a slight amount as 2.5 mM (hydroxyl group concentration is 5 mM) gave a polymer having narrow molecular weight distribution, i.e., PDI=1.16-1.25. As compounds having three hydroxyl groups, for example, hydroxyhydroquinone (entry 39) and uric acid (entry 40) were successfully utilized. As compounds having five hydroxyl groups, morin hydrate (entry 41), which is a natural flavonol, was successfully utilized.

As described above, by using 18 kinds of alcohol (hydrides of oxygen) as catalysts, the polymerization of styrene was successfully controlled. It should be noted that alcohol suitable for the polymerization is not limited to these 18 kinds of alcohol.

TABLE 2

HOMOPOLYMERIZATIONS OF STYRENE (ST) WITH ALCOHOL (PRECURSOR-TYPE CATALYST)

| entry | Monomer (equivalent to [R—I]$_0$) | R—I | I | catalyst | Temperature (° C.) | [R—I]$_0$/ [I]$_0$/ [catalyst]$_0$ (mM) | time (h) | conversion ratio (%) | $M_n$ ($M_{n,theo}$) | PDI |
|---|---|---|---|---|---|---|---|---|---|---|
| 1 | St (100 eq) | PE—I | VR 110 | 2,4,6-Me | 100 | 80/80/5 | 2 | 17 | 2000 (1700) | 1.20 |
|   |   |   |   |   |   |   | 4 | 28 | 2800 (2800) | 1.17 |
|   |   |   |   |   |   |   | 7 | 38 | 3500 (3800) | 1.17 |
|   |   |   |   |   |   |   | 24 | 50 | 4000 (5000) | 1.17 |
| 2 | St (100 eq) |   | BPB |   |   | 80/40/5 | 2 | 7 | 1000 (700) | 1.18 |
|   |   |   |   |   |   |   | 4 | 33 | 3300 (3300) | 1.20 |
|   |   |   |   |   |   |   | 7 | 65 | 6500 (6500) | 1.15 |
|   |   |   |   |   |   |   | 24 | 94 | 8500 (9400) | 1.18 |
| 3 | St (100 eq) | CP—I | VR 110 |   |   | 80/80/5 | 2 | 14 | 1700 (1400) | 1.17 |
|   |   |   |   |   |   |   | 4 | 25 | 2600 (2500) | 1.15 |
|   |   |   |   |   |   |   | 7 | 36 | 3800 (3600) | 1.19 |
|   |   |   |   |   |   |   | 24 | 52 | 5000 (5200) | 1.24 |
| 4 | St (100 eq) |   | BPB |   |   | 80/40/5 | 4 | 38 | 4400 (3800) | 1.31 |
|   |   |   |   |   |   |   | 7 | 76 | 7700 (7600) | 1.25 |
| 5 | St (100 eq) |   | AIBN |   | 80 | 80/40/5 | 3 | 55 | 6500 (5500) | 1.45 |

TABLE 2-continued

HOMOPOLYMERIZATIONS OF STYRENE (ST) WITH ALCOHOL
(PRECURSOR-TYPE CATALYST)

| entry | Monomer (equivalent to [R—I]$_0$) | R—I | I | catalyst | Temperature (° C.) | [R—I]$_0$/ [I]$_0$/ [catalyst]$_0$ (mM) | time (h) | conversion ratio (%) | M$_n$ (M$_{n,theo}$) | PDI |
|---|---|---|---|---|---|---|---|---|---|---|
| 6 | St (100 eq) | PE—I | VR 110 | 2,6-tBu-4-Me (BHT) | 100 | 80/80/5 | 2 | 14 | 1800 (1400) | 1.26 |
|   |   |   |   |   |   |   | 4 | 24 | 2600 (2400) | 1.23 |
|   |   |   |   |   |   |   | 7 | 33 | 3500 (3300) | 1.22 |
|   |   |   |   |   |   |   | 24 | 51 | 4300 (5100) | 1.23 |
| 7 | St (100 eq) |   | BPB |   |   | 80/40/5 | 4 | 55 | 5300 (5500) | 1.43 |
|   |   |   |   |   |   |   | 7 | 70 | 6600 (7000) | 1.36 |
|   |   |   |   |   |   |   | 24 | 92 | 7400 (9200) | 1.35 |
| 8 | St (100 eq) | CP—I | VR |   |   | 80/80/5 | 2 | 14 | 1800 (1400) | 1.19 |
|   |   |   |   |   |   |   | 4 | 35 | 4200 (3500) | 1.26 |
|   |   |   |   |   |   |   | 24 | 76 | 8500 (7600) | 1.35 |
| 9 | St (100 eq) |   | BPB |   |   | 80/40/5 | 7 | 68 | 8700 (7100) | 1.34 |
| 10 | St (100 eq) | PE—I | VR 110 | 2,4-Me |   | 80/80/5 | 2 | 19 | 2500 (1900) | 1.41 |
|   |   |   |   |   |   |   | 4 | 30 | 3600 (3000) | 1.35 |
|   |   |   |   |   |   |   | 7 | 40 | 4300 (4000) | 1.31 |
|   |   |   |   |   |   |   | 24 | 53 | 4900 (5300) | 1.30 |
| 11 | St (100 eq) |   | BPB |   |   | 80/40/5 | 4 | 49 | 5800 (4900) | 1.41 |
|   |   |   |   |   |   |   | 7 | 77 | 8600 (7700) | 1.29 |
| 12 | St (100 eq) | CP—I | VR 110 |   |   | 80/80/5 | 2 | 14 | 2000 (1400) | 1.23 |
|   |   |   |   |   |   |   | 4 | 27 | 3200 (2700) | 1.24 |
|   |   |   |   |   |   |   | 7 | 40 | 4200 (4000) | 1.25 |
|   |   |   |   |   |   |   | 24 | 68 | 4900 (6800) | 1.25 |
| 13 | St (100 eq) | CP—I | VR 110 | 2-iPr-5-Me |   | 80/80/5 | 2 | 18 | 2200 (1800) | 1.20 |
|   |   |   |   |   |   |   | 4 | 28 | 3200 (2800) | 1.17 |
|   |   |   |   |   |   |   | 7 | 36 | 4100 (3600) | 1.14 |
|   |   |   |   |   |   |   | 24 | 59 | 4700 (5900) | 1.27 |
| 14 | St (100 eq) | PE—I | VR 110 | 2,6-tBu-4-MeO (BHA) | 100 | 80/80/5 | 2 | 11 | 2000 (1100) | 1.38 |
|   |   |   |   |   |   |   | 4 | 24 | 2800 (2400) | 1.35 |
|   |   |   |   |   |   |   | 7 | 45 | 4000 (4500) | 1.29 |
|   |   |   |   |   |   |   | 24 | 55 | 4900 (5500) | 1.26 |
| 15 | St (100 eq) |   | BPB |   |   | 80/40/5 | 4 | 50 | 5300 (5000) | 1.35 |
|   |   |   |   |   |   |   | 7 | 77 | 7800 (7700) | 1.26 |
| 16 | St (100 eq) | CP—I | VR 110 |   |   | 80/80/5 | 24 | 50 | 5700 (5000) | 1.27 |
| 17 | St (100 eq) | PE—I | VR 110 | 2,6-MeO-4-Me |   | 80/80/5 | 2 | 19 | 2700 (1900) | 1.47 |
|   |   |   |   |   |   |   | 4 | 31 | 3600 (3100) | 1.44 |
|   |   |   |   |   |   |   | 7 | 42 | 4300 (4200) | 1.37 |
|   |   |   |   |   |   |   | 24 | 57 | 5000 (5700) | 1.37 |

TABLE 2-continued

HOMOPOLYMERIZATIONS OF STYRENE (ST) WITH ALCOHOL
(PRECURSOR-TYPE CATALYST)

| entry | Monomer (equivalent to [R—I]$_0$) | R—I | I | catalyst | Temperature (°C.) | [R—I]$_0$/ [I]$_0$/ [catalyst]$_0$ (mM) | time (h) | conversion ratio (%) | $M_n$ ($M_{n,theo}$) | PDI |
|---|---|---|---|---|---|---|---|---|---|---|
| 18 | St (100 eq) | BPB | | | | 80/40/5 | 2 | 18 | 2500 (1800) | 1.38 |
| | | | | | | | 4 | 42 | 5000 (4200) | 1.29 |
| | | | | | | | 7 | 74 | 7500 (7400) | 1.21 |
| 19 | St (100 eq) | CP—I | VR 110 | | | 80/80/5 | 7 | 37 | 3800 (3700) | 1.15 |
| 20 | St (100 eq) | PE—I | VR 110 | 2,6-Me-4-CN | | 80/80/5 | 2 | 16 | 2200 (1600) | 1.45 |
| | | | | | | | 4 | 29 | 2900 (2900) | 1.38 |
| | | | | | | | 7 | 37 | 3700 (3700) | 1.32 |
| | | | | | | | 24 | 48 | 4400 (4800) | 1.31 |
| 21 | St (100 eq) | BPB | | | | 80/40/5 | 4 | 56 | 5000 (5600) | 1.40 |
| | | | | | | | 7 | 83 | 6900 (8300) | 1.29 |
| 22 | St (100 eq) | CP—I | VR110 | 4-NO$_2$ | | 80/80/5 | 7 | 36 | 3500 (3700) | 1.17 |
| 23 | St (100 eq) | PE—I | VR110 | Phenol | | 80/80/5 | 2 | 16 | 1800 (1600) | 1.26 |
| | | | | | | | 4 | 27 | 2700 (2700) | 1.24 |
| | | | | | | | 7 | 39 | 3500 (3900) | 1.22 |
| | | | | | | | 24 | 51 | 4100 (5100) | 1.23 |
| 24 | St (100 eq) | BPB | | | | 80/40/5 | 4 | 69 | 6100 (6900) | 1.32 |
| | | | | | | | 7 | 80 | 8100 (8000) | 1.27 |
| 25 | St | CP | VR110 | | | 80/80/5 | 2 | 12 | 2300 (1200) | 1.35 |
| | | | | | | | 4 | 24 | 3300 (2400) | 1.34 |
| | | | | | | | 7 | 36 | 4200 (3600) | 1.35 |
| | | | | | | | 24 | 57 | 4900 (5700) | 1.38 |
| 26 | St (100 eq) | BPB | | | | 80/40/5 | 4 | 51 | 6500 (5100) | 1.37 |
| | | | | | | | 7 | 80 | 9000 (8000) | 1.28 |
| 27 | St (100 eq) | PE—I | VR110 | Vitamin E | 100 | 80/80/5 | 2 | 8 | 1500 (800) | 1.25 |
| | | | | | | | 4 | 20 | 2200 (2000) | 1.30 |
| | | | | | | | 7 | 32 | 3200 (3200) | 1.25 |
| | | | | | | | 24 | 50 | 4300 (5000) | 1.23 |
| 28 | St (100 eq) | BPB | | | | 80/40/5 | 2 | 31 | 3300 (3100) | 1.42 |
| | | | | | | | 4 | 59 | 5600 (5900) | 1.29 |
| | | | | | | | 7 | 81 | 8100 (8100) | 1.20 |
| 29 | St (100 eq) | CP—I | VR110 | | | 80/80/5 | 2 | 8 | 1100 (800) | 1.24 |
| | | | | | | | 4 | 16 | 2200 (1600) | 1.21 |
| | | | | | | | 7 | 30 | 3400 (3000) | 1.23 |
| | | | | | | | 24 | 56 | 4700 (5600) | 1.22 |

TABLE 2-continued

HOMOPOLYMERIZATIONS OF STYRENE (ST) WITH ALCOHOL
(PRECURSOR-TYPE CATALYST)

| entry | Monomer (equivalent to [R—I]$_0$) | R—I | I | catalyst | Temperature (° C.) | [R—I]$_0$/ [I]$_0$/ [catalyst]$_0$ (mM) | time (h) | conversion ratio (%) | M$_n$ (M$_{n,theo}$) | PDI |
|---|---|---|---|---|---|---|---|---|---|---|
| 30 | St (100 eq) | | BPB | | | 80/40/5 | 4 | 63 | 8500 (6300) | 1.42 |
|  |  |  |  |  |  |  | 7 | 84 | 10000 (8400) | 1.27 |
| 31 | St (100 eq) | PE—I | VR110 | Vitamin C | | 80/80/5 | 2 | 11 | 1600 (1100) | 1.18 |
|  |  |  |  |  |  |  | 4 | 26 | 2500 (2600) | 1.16 |
|  |  |  |  |  |  |  | 7 | 34 | 3000 (3400) | 1.15 |
|  |  |  |  |  |  |  | 24 | 44 | 3500 (4400) | 1.20 |
| 32 | St (100 eq) | | BPB | | | 80/40/5 | 2 | 31 | 3200 (3100) | 1.40 |
|  |  |  |  |  |  |  | 4 | 50 | 5100 (5000) | 1.30 |
|  |  |  |  |  |  |  | 7 | 69 | 6500 (6900) | 1.23 |
| 33 | St (100 eq) | CP—I | VR110 | | | 80/80/5 | 2 | 15 | 1800 (1500) | 1.13 |
|  |  |  |  |  |  |  | 4 | 26 | 2900 (2600) | 1.13 |
|  |  |  |  |  |  |  | 7 | 37 | 3800 (3700) | 1.14 |
| 34 | St (100 eq) | | BPB | | | 80/40/5 | 4 | 49 | 7000 (4900) | 1.45 |
|  |  |  |  |  |  |  | 7 | 73 | 10300 (7300) | 1.31 |
| 35 | St (100 eq) | | VR110 | Hydroquinone | | 80/80/2.5 | 2 | 14 | 1900 (1400) | 1.17 |
|  |  |  |  |  |  |  | 4 | 26 | 3100 (2600) | 1.16 |
|  |  |  |  |  |  |  | 7 | 36 | 4000 (3600) | 1.17 |
|  |  |  |  |  |  |  | 24 | 60 | 5100 (6000) | 1.23 |
| 36 | St (100 eq) | | | resorcinol | | 80/80/2.5 | 2 | 15 | 1800 (1500) | 1.21 |
|  |  |  |  |  |  |  | 4 | 26 | 3000 (2600) | 1.17 |
|  |  |  |  |  |  |  | 7 | 39 | 4000 (3900) | 1.18 |
|  |  |  |  |  |  |  | 24 | 57 | 4700 (5700) | 1.19 |
| 37 | St (100 eq) | | | Catechol | | 80/80/2.5 | 2 | 13 | 1600 (1300) | 1.23 |
|  |  |  |  |  |  |  | 4 | 21 | 2700 (2100) | 1.17 |
|  |  |  |  |  |  |  | 7 | 32 | 3500 (3200) | 1.18 |
|  |  |  |  |  |  |  | 24 | 54 | 4800 (5400) | 1.25 |
| 38 | St (100 eq) | | | 4-t-butylcatechol | | 80/80/2.5 | 4 | 14 | 2000 (1400) | 1.23 |
|  |  |  |  |  |  |  | 7 | 24 | 2700 (2400) | 1.25 |
|  |  |  |  |  |  |  | 24 | 48 | 3600 (4800) | 1.28 |
| 39 | St (100 eq) | | | Hydroxyhydroquinone | | 80/80/1.67 | 4 | 11 | 1900 (1100) | 1.26 |
|  |  |  |  |  |  |  | 7 | 20 | 2500 (2000) | 1.26 |
|  |  |  |  |  |  |  | 24 | 39 | 4400 (3900) | 1.18 |
| 40 | St (100 eq) | | | Uric acid | | 80/80/1.67 | 2 | 13 | 1600 (1300) | 1.29 |
|  |  |  |  |  |  |  | 4 | 22 | 2600 (2200) | 1.21 |
|  |  |  |  |  |  |  | 7 | 36 | 4100 (3600) | 1.16 |
|  |  |  |  |  |  |  | 24 | 46 | 5300 (4600) | 1.19 |

TABLE 2-continued

HOMOPOLYMERIZATIONS OF STYRENE (ST) WITH ALCOHOL
(PRECURSOR-TYPE CATALYST)

| entry | Monomer (equivalent to [R—I]$_0$) | R—I | I | catalyst | Temperature (° C.) | [R—I]$_0$/ [I]$_0$/ [catalyst]$_0$ (mM) | time (h) | conversion ratio (%) | $M_n$ ($M_{n,theo}$) | PDI |
|---|---|---|---|---|---|---|---|---|---|---|
| 41 | St (100 eq) | CP—I | VR110 | Morinhydrate | 100 | 80/80/1 | 2 | 18 | 2500 (1800) | 1.12 |
| | | | | | | | 4 | 29 | 3800 (2900) | 1.17 |
| | | | | | | | 7 | 34 | 4700 (3400) | 1.13 |
| | | | | | | | 24 | 43 | 5500 (4300) | 1.14 |

Monomer: styrene (St)
Monomer concentration: 8M (bulk)
Alkyl halide (R—I): 1-phenylethyl iodide (PE—-I), 2-cyanopropyl iodide (CP—I)
Radical initiator (I): 2,2'-azobis (2,4,4-trimethylpentane) (VR110), t-butyl peroxybenzoate (BPB)
Catalyst: 2,4,6-trimethylphenol (2,4,6-Me), 2,6-di-t-butyl-4-methylphenol (2,6-tBu-4-Me(BHT)), 2,4-dimethylphenol (2,4-Me), 2-isopropyl-5-methylphenol (2-iPr-5-Me), 2,6-di-t-butyl-4-methoxyphenol (2,6-tBu-4-MeO(BHA)), 2,6-dimethoxy-4-methyl (2,6-MeO-4-Me), 2,6-dimethyl-4-cyanophenol (2,6-Me-4-CN), 4-nitrophenol (4-NO$_2$), phenol, vitamin E, vitamin C, hydroquinone, resorcinol, catechol, 4-t-butylcatechol, hydroxyhydroquinone, uric acid, morin hydrate
$M_n$ and PDI: Molecular weight and polydispersity obtained by gel permeation chromatography (GPC) with tetrahydrofuran (THF) as an eluent calibrated by polystyrene (PSt) standard.

Example 3

Homopolymerizations of Styrene (St) with Alcohol (Precursor-Type Catalyst) Utilizing In Situ Synthesis of Alkyl Halide In a system similar to Example 2, experiments were performed. However, instead of 2-cyanopropyl iodide (CP—I) isolated and purified as alkyl iodide, azobisisobutyronitrile (AIBN) and iodine (I$_2$), which are raw materials thereof, were used as alkyl halide. Bulk homopolymerization of styrene (St) was carried out using 2,4,6-Me as a catalyst (precursor) at 80° C. (Table 3). The production process of CP—I is shown in Scheme 4. Due to the degradation of AIBN, 2-cyanopropyl radical (CP.) is generated. CP. reacts with I$_2$ to give CP—I. After completion of the reaction of AIBN and I$_2$, the remaining AIBN acts as a radical initiator, which provides a growing chain radical. AIBN gives free CP., which can react with I$_2$, with efficiency of about 60%. AIBN was added in an excessive amount (2 equivalents) in comparison with I$_2$.

Scheme 4

Chemical formula 19

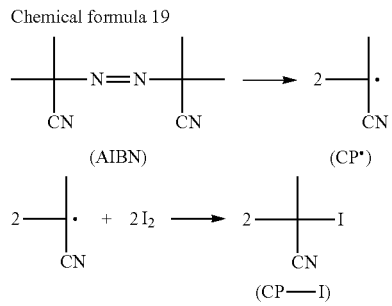

Under the conditions shown in Table 3 (entry 1), the polymerization did not proceed for initial 0.5 hour. During this period, some of AIBN was degraded, and the degradation product was reacted with iodine to give CP—I. All I$_2$ was consumed in 0.5 hours. Thereafter, polymerization was initiated with the CP—I, remaining AIBN, and 2,4,6-Me, which was used as a catalyst (precursor), and then a polymer having narrow molecular weight distribution was obtained. The molecular weights approximately corresponded to theoretical values of those when CP—I is quantitatively produced from I$_2$ (80 mM of CP—I is produced from 40 mM of I$_2$).

TABLE 3

HOMOPOLYMERIZATIONS OF STYRENE (ST) WITH ALCOHOL
(PRECURSOR-TYPE CATALYST) UTILIZING IN SITU SYNTHESIS OF ALKYL HALIDE

| entry | Monomer (equivalent to [R—I]$_0$) | R—I | I | catalyst | Temperature (° C.) | [R—I]$_0$/ [I]$_0$/ [catalyst]$_0$ (mM) | time (h) | conversion ratio (%) | $M_n$ ($M_{n,theo}$) | PDI |
|---|---|---|---|---|---|---|---|---|---|---|
| 1 | St (100 eq) | I$_2$ | AIBN | 2,4,6-Me | 80 | 40/80/5 | 0.5 | 0 | — | — |
| | | | | | | | 1 | 29 | 3900 (2900) | 1.49 |
| | | | | | | | 2 | 48 | 5300 (4800) | 1.47 |

TABLE 3-continued

HOMOPOLYMERIZATIONS OF STYRENE (ST) WITH ALCOHOL
(PRECURSOR-TYPE CATALYST) UTILIZING IN SITU SYNTHESIS OF ALKYL HALIDE

| entry | Monomer (equivalent to [R—I]$_0$) | R—I | I | catalyst | Temperature (° C.) | [R—I]$_0$/ [I]$_0$/ [catalyst]$_0$ (mM) | time (h) | conversion ratio (%) | $M_n$ ($M_{n,theo}$) | PDI |
|---|---|---|---|---|---|---|---|---|---|---|
| | | | | | | | 3 | 61 | 6400 (6100) | 1.42 |

Monomer: styrene (St)
Monomer concentration: 8M (bulk)
Radical initiator (I): azobisisobutyronitrile (AIBN)
Catalyst: 2,4,6-trimethylphenol (2,4,6-Me)
$M_n$ and PDI: Molecular weight and polydispersity obtained by gel permeation chromatography (GPC) with tetrahydrofuran (THF) as an eluent calibrated by polystyrene (PSt) standard Example 4

Homopolymerizations of Methyl Methacrylate (MMA) with Thymol Iodide (Catalyst)

Instead of the polymerizations of styrene (Example 1), the polymerizations of methyl methacrylate (MMA) were carried out. In this experiment, 2-cyanopropyl iodide (CP—I, the chemical formula is shown above) was used as an alkyl halide. The polymerizations were carried out at 95° C. using 2,2'-azobis(2,4,4-trimethylpentane) (VR110) as a radical initiator, and thymol iodide (TI) as a catalyst. The monomer concentration was 8 M. The results are shown in Table 4 (entry 1). When 80 mM of CP—I, 40 mM of VR110, and 15 mM of the catalyst were used, for example, the conversion ratio was 37% in 4 h, and a polymer having narrow molecular weight distribution ($M_n$=3800, PDI=1.37) was obtained. As described above, by using TI, the polymerization of MMA was successfully controlled.

in 30 minutes, the conversion ratio reached at such a high conversion ratio as 79%, and a polymer having narrow molecular weight distribution ($M_n$=6,900, PDI=1.30) was obtained (Table 5 (entry 1) and FIGS. 4A and 4B (●, black circle)). As described above, while the polymerization was performed at a high speed, the molecular weight distribution was successfully well controlled. It should be noted that the unit of polymerization time in Table 5 is minute.

Similarly, 2,6-di-t-butyl-4-methylphenol (2,6-tBu-4-Me (BHT)) (entry 2), 2,6-di-t-butyl-4-methoxyphenol (2,6-tBu-4-MeO(BHA)) (entries 3 and 4), or unsubstituted phenol (entry 5), or further vitamin E (entries 6-9) or vitamin C (entry 10), which is a natural product, was used, and consequently the molecular weight distribution was successfully controlled. As compounds having a plurality of hydroxyl groups, for example, hydroquinone (entry 11), catechol (entry 12), and 2-methoxy hydroquinone (entry 13), which have two

TABLE 4

HOMOPOLYMERIZATIONS OF METHYL METHACRYLATE (MMA) WITH
THYMOL IODIDE (CATALYST)

| entry | Monomer (equivalent to [R—I]$_0$) | R—I | I | catalyst | Temperature (° C.) | [R—I]$_0$/ [I]$_0$/ [catalyst]$_0$ (mM) | time (h) | conversion ratio (%) | $M_n$ ($M_{n,theo}$) | PDI |
|---|---|---|---|---|---|---|---|---|---|---|
| 1 | MMA (100 eq) | CP—I | VR110 | TI | 95 | 80/40/15 | 2 | 26 | 3200 (2600) | 1.30 |
| | | | | | | | 4 | 37 | 3800 (3700) | 1.37 |

Monomer: methyl methacrylate (MMA)
Monomer concentration: 8M (bulk)
Alkyl halide (R—I): 2-cyanopropyl iodide (CP—I)
Radical initiator (I): 2,2'-azobis(2,4,4-trimethylpentane) (VR110)
Catalyst: thymol iodide
$M_n$ and PDI: Molecular weight and polydispersity obtained by gel permeation chromatography (GPC) with tetrahydrofuran (THF) as an eluent calibrated by poly(methyl methacrylate) (PMMA) standard Example 5

Homopolymerizations of Methyl Methacrylate (MMA) with Alcohol (Precursor-Type Catalyst)

Alcohol was used as a catalyst (precursor) to carry out the polymerizations of methyl methacrylate (MMA) (Table 5 and FIGS. 4A and 4B). 2-cyanopropyl iodide (CP—I) (80 mM) as an alkyl iodide, di(4-tert-butylcyclohexyl)peroxydicarbonate (PERKADOX16) (80 mM) as a radical initiator, and 2,4,6-trimethylphenol (2,4,6-Me) (10 mM) as a catalyst were used and the polymerization was carried out at 80° C. For example, hydroxyl groups, were also successfully used. By reducing the concentration of CP—I, $M_n$ was successfully increased (entry 9). Furthermore, whichever catalyst was used, by using PERKADOX16 or 2,2'-azobis(4-methoxy-2,4-dimethylvaleronitrile) (V70), the polymerization was successfully performed at a high speed. Under all conditions in the Example, the conversion ratios reached at 59% or higher within 1 hour. As described above, nine kinds of alcohol (hydrides of oxygen) were used as catalysts and the polymerization of MMA was successfully controlled. It should be noted that alcohol suitable for the polymerization is not limited to these nine kinds of alcohol.

TABLE 5

HOMOPOLYMERIZATIONS OF METHYL METHACRYLATE (MMA) WITH ALCOHOL
(PRECURSOR-TYPE CATALYST)

| entry | Monomer (equivalent to [R—I]$_0$) | R—I | I | catalyst | Temperature (° C.) | [R—I]$_0$/ [I]$_0$/ [catalyst]$_0$ (mM) | time (min) | Conversion ratio (%) | M$_n$ (M$_{n,theo}$) | PDI |
|---|---|---|---|---|---|---|---|---|---|---|
| 1 | MMA (100 eq) | CP—I | PERKADOX16 | 2,4,6-Me | 80 | 80/80/10 | 10 | 24 | 4500 (2400) | 1.43 |
|   |   |   |   |   |   |   | 15 | 67 | 5300 (6700) | 1.36 |
|   |   |   |   |   |   |   | 30 | 79 | 6900 (7900) | 1.30 |
| 2 | MMA (100 eq) |   |   | 2,6-tBu-4-Me (BHT) |   | 80/80/10 | 15 | 100 | 8300 (10000) | 1.36 |
| 3 | MMA (100 eq) |   |   | 2,6-tBu-4-MeO (BHA) |   | 80/80/10 | 15 | 24 | 3600 (2400) | 1.23 |
|   |   |   |   |   |   |   | 30 | 52 | 5200 (5200) | 1.21 |
|   |   |   |   |   |   |   | 60 | 80 | 7000 (8000) | 1.23 |
| 4 | MMA (100 eq) |   | V70 |   |   | 80/40/10 | 30 | 59 | 7500 (5900) | 1.29 |
| 5 | MMA (100 eq) |   | PERKADOX16 | Phenol |   | 80/80/10 | 10 | 60 | 6400 (6000) | 1.45 |
|   |   |   |   |   |   |   | 15 | 87 | 7700 (8700) | 1.40 |
| 6 | MMA (100 eq) |   |   | Vitamin E |   | 80/80/10 | 10 | 34 | 3900 (3400) | 1.41 |
|   |   |   |   |   |   |   | 15 | 45 | 4600 (4500) | 1.34 |
|   |   |   |   |   |   |   | 30 | 69 | 6500 (6900) | 1.23 |
| 7 | MMA (100 eq) |   |   |   |   | 80/40/10 | 15 | 60 | 4800 (6000) | 1.38 |
| 8 | MMA (100 eq) |   |   |   |   | 80/160/20 | 6 | 29 | 3200 (2900) | 1.33 |
|   |   |   |   |   |   |   | 10 | 46 | 4400 (4600) | 1.24 |
|   |   |   |   |   |   |   | 30 | 80 | 6800 (8000) | 1.22 |
| 9 | MMA (200 eq) |   |   |   |   | 40/40/5 | 30 | 61 | 10000 (12200) | 1.40 |
|   |   |   |   |   |   |   | 60 | 72 | 12000 (14400) | 1.35 |
| 10 | MMA (100 eq) |   |   | Vitamin C |   | 80/80/10 | 10 | 63 | 5300 (6300) | 1.46 |
|   |   |   |   |   |   |   | 15 | 87 | 7200 (8700) | 1.33 |
| 11 | MMA (100 eq) |   |   | hydroquinone |   | 80/80/10 | 15 | 65 | 5100 (6500) | 1.46 |

TABLE 5-continued

HOMOPOLYMERIZATIONS OF METHYL METHACRYLATE (MMA) WITH ALCOHOL
(PRECURSOR-TYPE CATALYST)

| entry | Monomer (equivalent to [R—I]$_0$) | R—I | I | catalyst | Temperature (° C.) | [R—I]$_0$/ [I]$_0$/ [catalyst]$_0$ (mM) | time (min) | Conversion ratio (%) | M$_n$ (M$_{n,theo}$) | PDI |
|---|---|---|---|---|---|---|---|---|---|---|
| 12 | MMA (100 eq) | | | catechol | | 80/80/10 | 15 | 85 | 6000 (8500) | 1.43 |
| 13 | MMA (100 eq) | | | 2-methoxyhydroquinone | | 80/80/10 | 10 | 87 | 5500 (8700) | 1.40 |

Monomer: methyl methacrylate (MMA)
Monomer concentration: 8M (bulk)
Alkyl halide (R—I): 2-cyanopropyl iodide (CP—I)
Radical initiator (I): di(4-tert-butylcyclohexyl) peroxydicarbonate (PERKADOX16), 2,2'-azobis(4-methoxy-2,4-dimethylvaleronitrile)(V70)
Catalyst: 2,4,6-trimethylphenol (2,4,6-Me), 2,6-di-t-butyl-4-methylphenol (2,6-tBu-4-Me (BHT)), 2,6-di-t-butyl-4-methoxyphenol (2,6-tBu-4-MeO (BHA)), phenol, vitamin E, vitamin C, hydroquinone, catechol, 2-methoxy hydroquinone
M$_n$ and PDI: Molecular weight and polydispersity obtained by gel permeation chromatography (GPC) with tetrahydrofuran (THF) as an eluent calibrated by poly(methyl methacrylate) (PMMA) standard

Example 6

Homopolymerizations of Benzyl Methacrylate (BzMA) with Alcohol (Precursor-Type Catalyst)

Alcohol was used as a catalyst (precursor) and the polymerizations of benzyl methacrylate (BzMA) was carried out (Table 6). 2-Cyanopropyl iodide (CP—I) (80 mM) as an alkyl iodide, di(4-tert-butylcyclohexyl)peroxydicarbonate (PERKADOX16) (80 mM) as a radical initiator, catechol (30 mM) as a catalyst, and I$_2$ (3 mM) as an additive for enhancing an ability to control polymerization by iodinating an oxygen-centered radical generated by catechol, were used and the polymerization was carried out at 80° C. For example, in 30 minutes, the conversion ratio reached at such a high conversion ratio as 60%, and a polymer having narrow molecular weight distribution (M$_n$=12,600, PDI=1.17) was obtained (Table 6 (entry 1)). Furthermore, even when the concentration of the additive I$_2$ was reduced to 1 mM, the molecular weight distribution was successfully controlled (PDI=1.31) (entry 2). Even when the concentration of catechol was reduced from 30 mM to 10 mM (entry 3), and further to 5 mM (entry 4), satisfactory control of the molecular weight distribution was attained. For example, under the condition of entry 3, in 10 minutes, the conversion ratio reached at such a high conversion ration as 83%, and a polymer having narrow molecular weight distribution (M$_n$=11,600, PDI=1.32) was obtained. As described above, while the polymerization was performed at a high speed, the molecular weight distribution was successfully well controlled. It should be noted that the unit of polymerization time in Table 6 is minute.

TABLE 6

HOMOPOLYMERIZATIONS OF BENZYL METHACRYLATE (BzMA) WITH ALCOHOL
(PRECURSOR-TYPE CATALYST)

| entry | Monomer (equivalent to [R—I]$_0$) | R—I | I | catalyst | Temperature (° C.) | [R—I]$_0$/ [I]$_0$/ [catalyst]$_0$/ [I$_2$]$_0$ (mM) | time (min) | conversion ratio (%) | M$_n$ (M$_{n,theo}$) | PDI |
|---|---|---|---|---|---|---|---|---|---|---|
| 1 | BzMA (100 eq) | CP—I | PERKADOX16 | catechol | 80 | 80/80/30/3 | 30 | 52 | 12600 (10400) | 1.17 |
| 2 | BzMA (100 eq) | | | | | 80/80/30/1 | 10 | 59 | 8300 (8800) | 1.31 |
| 3 | BzMA (100 eq) | | | | | 80/80/10/2 | 10 | 83 | 3600 (2400) | 1.23 |
| 4 | BzMA (100 eq) | | | | | 80/80/5/1 | 10 | 64 | 7700 (11300) | 1.28 |

Monomer: benzyl methacrylate (BzMA)

Monomer concentration: 8M (bulk)

Alkyl halide (R—I): 2-cyanopropyl iodide (CP—I)

Radical initiator (I): di(4-tert-butylcyclohexyl) peroxydicarbonate (PERKADOX16)

Catalyst: catechol

M$_n$ and PDI: Molecular weight and polydispersity determined by multi-angle laser light scattering (MALLS) detector with gel permeation chromatography (GPC) with tetrahydrofuran (THF) as an eluent

Example 7

Homopolymerizations of Glycidyl Methacrylate (GMA) with Alcohol (Precursor-Type Catalyst)

Alcohol was used as a catalyst (precursor) and the polymerization of glycidyl methacrylate (GMA) was carried out (Table 7). 2-Cyanopropyl iodide (CP—I) (80 mM) as an alkyl iodide, di(4-tert-butylcyclohexyl)peroxydicarbonate (PERKADOX16) (80 mM) as a radical initiator, catechol (10 mM) as a catalyst, and $I_2$ (1 mM) as an additive for enhancing an ability to control polymerization, were used and the polymerization was carried out at 80° C. A polymer having narrow molecular weight distribution ($M_n$=6,700, PDI=1.39) was obtained (Table 7 (entry 1)).

TABLE 7

HOMOPOLYMERIZATIONS OF GLYCIDYL METHACRYLATE (GMA) WITH ALCOHOL (PRECURSOR-TYPE CATALYST)

| entry | Monomer (equivalent to [R—I]$_0$) | R—I | I | catalyst | Temperature (° C.) | [R—I]$_0$/ [I]$_0$/ [catalyst]$_0$/ [I$_2$]$_0$ (mM) | time (min) | conversion ratio (%) | $M_n$ ($M_{n,theo}$) | PDI |
|---|---|---|---|---|---|---|---|---|---|---|
| 1 | BzMA (100 eq) | CP—I | PERKADOX16 | catechol | 80 | 80/80/10/1 | 35 | 45 | 6700 (6400) | 1.39 |

Monomer: glycidyl methacrylate (GMA)
Monomer concentration: 8M (bulk)
Alkyl halide (R—I): 2-cyanopropyl iodide (CP—I)
Radical initiator (I): di(4-tert-butylcyclohexyl) peroxydicarbonate (PERKADOX16)
Catalyst: catechol
$M_n$ and PDI: Molecular weight and polydispersity determined by multi-angle laser light scattering (MALLS) detector with gel permeation chromatography (GPC) with tetrahydrofuran (THF) as an eluent

Example 8

Homopolymerizations of Polyethyleneoxide Methacrylate (PEGMA) with Alcohol (Precursor-Type Catalyst)

Alcohol was used as a catalyst (precursor) and the polymerization of polyethyleneoxide methacrylate (PEGMA) (molecular weight (M.W.)=246) was carried out (Table 8). 2-Cyanopropyl iodide (CP—I) (80 mM) as an alkyl iodide, di(4-tert-butylcyclohexyl)peroxydicarbonate (PERKADOX16) (80 mM) as a radical initiator, and catechol (10 mM) as a catalyst were used and the polymerization was carried out at 80° C. A polymer having narrow molecular weight distribution ($M_n$=10,200, PDI=1.18) was obtained (Table 8 (entry 1)).

TABLE 8

HOMOPOLYMERIZATIONS OF POLYETHYLENEOXIDE METHACRYLATE (PEGMA) WITH ALCOHOL (PRECURSOR-TYPE CATALYST)

| entry | Monomer (equivalent to [R—I]$_0$) | R—I | I | catalyst | Temperature (° C.) | [R—I]$_0$/ [I]$_0$/ [catalyst]$_0$ (mM) | time (min) | conversion ratio (%) | $M_n$ ($M_{n,theo}$) | PDI |
|---|---|---|---|---|---|---|---|---|---|---|
| 1 | PEGMA (M.W. = 246) (100 eq) | CP—I | PERKADOX16 | catechol | 80 | 80/80/10 | 10 | 45 | 10200 (11000) | 1.18 |

Monomer: polyethyleneoxide methacrylate (PEGMA)
Monomer concentration: 8M (bulk)
Alkyl halide (R—I): 2-cyanopropyl iodide (CP—I)
Radical initiator (I): di(4-tert-butylcyclohexyl) peroxydicarbonate (PERKADOX16)
Catalyst: catechol
$M_n$ and PDI: Molecular weight and polydispersity determined by multi-angle laser light scattering (MALLS) detector with gel permeation chromatography (GPC) with dimethylformamide (DMF) as an eluent

Example 9

Homopolymerizations of 2-Hydroxyethyl Methacrylate (HEMA) with Alcohol (Precursor-Type Catalyst)

Alcohol was used as a catalyst (precursor) and the solution polymerization of 2-hydroxyethyl methacrylate (HEMA) (4 M) was carried out (Table 9). In a solution containing 2-cyanopropyl iodide (CP—I) (40 mM) as an alkyl iodide, di(4-tert-butylcyclohexyl)peroxydicarbonate (PERKADOX16) (40 mM) as a radical initiator, catechol (15 mM) as a catalyst, and methyl ethyl ketone (MEK) (35 vol %) and 1-propanol (15 vol %) as solvent, the solution polymerization was carried out (monomer, 50 vol %) at 80° C. A polymer having narrow molecular weight distribution ($M_n$=7,000, PDI=1.36) was obtained (Table 9 (entry 1)).

TABLE 9

HOMOPOLYMERIZATIONS OF 2-HYDROXYETHYL METHACRYLATE (HEMA) WITH ALCOHOL (PRECURSOR-TYPE CATALYST)

| entry | Monomer (equivalent to $[R—I]_0$) | Solvent | R—I | I | catalyst | Temperature (° C.) | $[R—I]_0/[I]_0/[catalyst]_0$ (mM) | time (min) | conversion ratio (%) | $M_n$ ($M_{n,theo}$) | PDI |
|---|---|---|---|---|---|---|---|---|---|---|---|
| 1 | HEMA (100 eq) | MEK/1-propanol (35/15 vol %) | CP—I | PERKADOX16 | catechol | 80 | 40/40/15 | 10 | 57 | 7000 (7400) | 1.36 |

Monomer: 2-hydroxyethyl methacrylate (HEMA)
Monomer concentration: 4M (50 vol %) (solution polymerization)
Solvent: methyl ethyl ketone (MEK) (35 vol %), 1-propanol (15 vol %)
Alkyl halide (R—I): 2-cyanopropyl iodide (CP—I)
Radical initiator (I): di(4-tert-butylcyclohexyl) peroxydicarbonate (PERKADOX16)
Catalyst: catechol
$M_n$ and PDI: Molecular weight and polydispersity determined by multi-angle laser light scattering (MALLS) detector with gel permeation chromatography (GPC) with dimethylformamide (DMF) as an eluent

Example 10

Random Copolymerization of Methyl Methacrylate (MMA) and 2-Hydroxyethyl Methacrylate (HEMA) with Alcohol (Precursor-Type Catalyst)

Alcohol was used as a catalyst (precursor) and the random copolymerization of methyl methacrylate (MMA) and 2-hydroxyethyl methacrylate (HEMA) was carried out by solution polymerization (the total monomer concentration was 4 M) (Table 10). Regarding the monomer composition, each of the monomers was 50 mol %. In a solution containing 2-cyanopropyl iodide (CP—I) (40 mM) as an alkyl iodide, di(4-tert-butylcyclohexyl)peroxydicarbonate (PERKADOX16) (40 mM) as a radical initiator, catechol (15 mM) as a catalyst, and methyl ethyl ketone (MEK) (35 vol %) and 1-propanol (15 vol %) as solvent, the solution polymerization was carried out (monomer, 50 vol %) at 80° C. A polymer (random copolymer) having narrow molecular weight distribution ($M_n$=5,000, PDI=1.27) was obtained (Table 10 (entry 1)).

TABLE 10

RANDOM COPOLYMERIZATION OF METHYL METHACRYLATE (MMA) AND 2-HYDROXYETHYL METHACRYLATE (HEMA) WITH ALCOHOL (PRECURSOR-TYPE CATALYST)

| Entry | Monomer (equivalent to $[R—I]_0$) | Solvent | R—I | I | catalyst | Temperature (° C.) | $[R—I]_0/[I]_0/[catalyst]_0$ (mM) | time (min) | conversion ratio (%) | $M_n$ ($M_{n,theo}$) | PDI |
|---|---|---|---|---|---|---|---|---|---|---|---|
| 1 | MMA/HEMA (50/50 eq) | MEK/1-propanol (35/15 vol %) | CP—I | PERKADOX16 | catechol | 80 | 40/40/15 | 10 | 71 | 5000 (8200) | 1.27 |

Monomer: methyl methacrylate (MMA), 2-hydroxyethyl methacrylate (HEMA)
Monomer concentration: 4M (50 vol %) (solution polymerization)
Solvent: methyl ethyl ketone (MEK) (35 vol %), 1-propanol (15 vol %) Alkyl halide (R—I): 2-cyanopropyl iodide (CP—I)
Radical initiator (I): di(4-tert-butylcyclohexyl) peroxydicarbonate (PERKADOX16)
Catalyst: catechol
$M_n$ and PDI: Molecular weight and polydispersity obtained by gel permeation chromatography (GPC) with dimethylformamide (DMF) as an eluent calibrated by poly(methyl methacrylate) (PMMA) standard

Example 11

Random Copolymerization of Methyl Methacrylate (MMA) and Methacrylic Acid (MAA) with Alcohol (Precursor-Type Catalyst)

Alcohol was used as a catalyst (precursor) and the random copolymerization of methyl methacrylate (MMA) and methacrylic acid (MAA) was carried out (Table 11). Regarding the monomer compositions, the monomers were 75 mol % and 25 mol % respectively. 2-Cyanopropyl iodide (CP—I) (80 mM) as an alkyl iodide, di(4-tert-butylcyclohexyl)peroxydicarbonate (PERKADOX16) (80 mM) as a radical initiator, and catechol (20 mM) as a catalyst were used and the polymerization was carried out at 80° C., a polymer (random copolymer) having narrow molecular weight distribution ($M_n$=3,400, PDI=1.38) was obtained (Table 11 (entry 1)).

TABLE 11

RANDOM COPOLYMERIZATION OF METHYL METHACRYLATE (MMA) AND METHACRYLIC ACID (MAA) WITH ALCOHOL (PRECURSOR-TYPE CATALYST)

| entry | Monomer (equivalent to [R—I]$_0$) | R—I | I | catalyst | Temperature (° C.) | [R—I]$_0$/ [I]$_0$/ [catalyst]$_0$ (mM) | time (min) | conversion ratio (%) | $M_n$ ($M_{n,theo}$) | PDI |
|---|---|---|---|---|---|---|---|---|---|---|
| 1 | MMA/MAA (75/25 eq) | CP—I | PERKADOX16 | catechol | 80 | 80/80/20 | 10 | 24 | 3400 (2400) | 1.38 |

Monomer: methyl methacrylate (MMA), methacrylic acid (MAA)
Monomer concentration: 8M (bulk)
Alkyl halide (R—I): 2-cyanopropyl iodide (CP—I)
Radical initiator (I): di(4-tert-butylcyclohexyl) peroxydicarbonate (PERKADOX16)
Catalyst: catechol
$M_n$ and PDI: Molecular weight and polydispersity obtained by gel permeation chromatography (GPC) with tetrahydrofuran (THF) as an eluent calibrated by poly(methyl methacrylate) (PMMA) standard

Example 12

Random Copolymerization of N-Butyl Acrylate (BA) and Styrene (St) with Alcohol (Precursor-Type Catalyst)

The random copolymerization of n-butyl acrylate (BA) and styrene (St) was carried out using alcohol as a catalyst (precursor) (Table 11). Using 1-phenylethyl iodide (PE-I) as an alkyl iodide, t-butyl peroxybenzoate (BPB) as a radical initiator, and 2,4,6-trimethylphenol (2,4,6-Me) as a catalyst, the polymerization was carried out at 100° C. With 5 mM of the catalyst, a polymer (random copolymer) having narrow molecular weight distribution was obtained (Table 12 (entry 1)).

TABLE 12

RANDOM COPOLYMERIZATION OF N-BUTYL ACRYLATE (BA) AND STYRENE (ST) WITH ALCOHOL (PRECURSOR-TYPE CATALYST)

| entry | Monomer (equivalent to [R—I]$_0$) | R—I | I | catalyst | Temperature (° C.) | [R—I]$_0$/ [I]$_0$/ [catalyst]$_0$ (mM) | time (h) | conversion ratio (%) | $M_n$ ($M_{n,theo}$) | PDI |
|---|---|---|---|---|---|---|---|---|---|---|
| 1 | BA/St (22/78 eq) | PE-I | BPB | 2,4,6-Me | 100 | 80/40/5 | 4 | 45 | 6700 (4900) | 1.42 |
|  |  |  |  |  |  |  | 7 | 62 | 8700 (6800) | 1.31 |

Monomer: n-butyl acrylate (BA), styrene (St)
Monomer concentration: 8M (bulk)
Alkyl halide (R—I): 1-phenylethyl iodide (PE-I)
Radical initiator (I): t-butyl peroxybenzoate (BPB)
Catalyst: 2,4,6-trimethylphenol (2,4,6-Me)
$M_n$ and PDI: Molecular weight and polydispersity obtained by gel permeation chromatography (GPC) with tetrahydrofuran (THF) as an eluent calibrated by polystyrene (PSt) standard

Example 13

Random Copolymerization of N-Butyl Acrylate (BA) and Methyl Methacrylate (MMA) with Alcohol (Precursor-Type Catalyst)

The random copolymerization of n-butyl acrylate (BA) and methyl methacrylate (MMA) was carried out using alcohol as a catalyst (precursor) (Table 13). 2-Cyanopropyl iodide (CP—I) as an alkyl iodide, di(4-tert-butylcyclohexyl)peroxydicarbonate (PERKADOX16) as a radical initiator, and vitamin E as a catalyst were used and the polymerization was carried out at 80° C., and consequently a polymer (random copolymer) having narrow molecular weight distribution was obtained (Table 13 (entry 1)). It should be noted that the unit of polymerization time in Table 13 is minute.

TABLE 13

RANDOM COPOLYMERIZATION OF N-BUTYL ACRYLATE (BA) AND METHYL METHACRYLATE (MMA) WITH ALCOHOL (PRECURSOR-TYPE CATALYST)

| entry | Monomer (equivalent to $[R-I]_0$) | R—I | I | catalyst | Temperature (° C.) | $[R-I]_0/[I]_0/[catalyst]_0$ (mM) | time (h) | conversion ratio (%) | $M_n$ ($M_{n,theo}$) | PDI |
|---|---|---|---|---|---|---|---|---|---|---|
| 1 | BA/MMA (10/90 eq) | CP—I | PERKADOX16 | 2,4,6-Me | 80 | 80/80/10 | 6 | 19 | 3600 (1900) | 1.46 |
| | | | | | | | 15 | 47 | 5100 (4700) | 1.33 |
| | | | | | | | 30 | 87 | 8200 (8700) | 1.43 |

Monomer: n-butyl acrylate (BA), methyl methacrylate (MMA)
Monomer concentration: 8M (bulk)
Alkyl halide (R—I): 2-cyanopropyl iodide (CP—I)
Radical initiator (I): di(4-tert-butylcyclohexyl) peroxydicarbonate (PERKADOX16)
Catalyst: vitamin E
$M_n$ and PDI: Molecular weight and polydispersity obtained by gel permeation chromatography (GPC) with tetrahydrofuran (THF) as an eluent calibrated by poly(methyl methacrylate) (PMMA) standard

Example 14

Block Copolymerization of Methyl Methacrylate (MMA) (Homopolymerization: First Block) and Benzyl Methacrylate (BzMA) (Homopolymerization: Second Block) with Alcohol (Precursor-Type Catalyst)

Polymerization of benzyl methacrylate (BzMA) was carried out using alcohol as a catalyst (precursor). Poly(methyl methacrylate)-iodine adduct (PMMA-I) (M=2,700 and PDI=1.15) (80 mM) as alkyl iodide, di(4-tert-butylcyclohexyl) peroxydicarbonate (PERKADOX16) (80 mM) as a radical initiator, catechol (10 mM) as a catalyst, and $I_2$ (2 mM) as an additive for enhancing an ability to control the polymerization, were used and the polymerization was carried out at 80° C. In 10 minutes, the conversion ratio reached at such a high conversion ratio as 84%, and a block copolymer (PMMA-b-PBzMA) having narrow molecular weight distribution (Mn=1230, PDI=1.33) was obtained (Table 14 (entry 1)). It should be noted that PBzMA is poly benzyl methacrylate herein.

TABLE 14

BLOCK COPOLYMERIZATION OF METHYL METHACRYLATE (MMA) (HOMOPOLYMERIZATION: FIRST BLOCK) AND BENZYL METHACRYLATE (BZMA) (HOMOPOLYMERIZATION: SECOND BLOCK) WITH ALCOHOL (PRECURSOR-TYPE CATALYST)

| entry | Monomer (equivalent to $[R-I]_0$) | R—I | I | catalyst | Temperature (° C.) | $[R-I]_0/[I]_0/[catalyst]_0/[I_2]_0$ (mM) | time (min) | conversion ratio (%) | $M_n$ ($M_{n,theo}$) | PDI |
|---|---|---|---|---|---|---|---|---|---|---|
| 1 | BzMA (100 eq) | PMMA—I ($M_n$ = 2700, PDI = 1.15) | PERKADOX16 | catechol | 80 | 80/80/10/2 | 10 | 94 | 12300 (14800) | 1.33 |

Monomer: benzyl methacrylate (BzMA)
Monomer concentration: 8M (bulk)
Alkyl halide (R—I): poly(methyl methacrylate)-iodine adduct (PMMA-I) ($M_n$ = 2,700 and PDI = 1.15)
Radical initiator (I): di(4-tert-butylcyclohexyl) peroxydicarbonate (PERKADOX16)
Catalyst: catechol
$M_n$ and PDI: Molecular weight and polydispersity obtained by gel permeation chromatography (GPC) with tetrahydrofuran (THF) as an eluent calibrated by poly(methyl methacrylate) (PMMA) standard

Example 15

Block Copolymerization of Methyl Methacrylate (MMA) (Homopolymerization: First Block) and Benzyl Methacrylate (BzMA) (Homopolymerization: Second Block) with Alcohol (Precursor-Type Catalyst)—Successive Addition of MMA and BzMA Block copolymerization using the homopolymerization of methyl methacrylate (MMA) as a first block and the random copolymerization of MMA and benzyl methacrylate (BaMA) as a second block was carried out with alcohol as a catalyst (precursor). As the first block, the solution polymerization (toluene, 25 vol %) of MMA (6 M) was carried out at 80° C. for 10 minutes using 2-cyanopropyl iodide (CP—I) (60 mM) as an alkyl iodide, di(4-tert-butylcyclohexyl)peroxydicarbonate (PERKADOX16) (60 mM) as a radical initiator, catechol (7.5 mM) as a catalyst, and $I_2$ (1.5 mM) as an additive for enhancing an ability to control polymerization, and consequently the conversion ratio was 21% and a poly(methyl methacrylate)-iodine adduct (PMMA-I) ($M_n$=3,400, PDI=1.29) was produced. To the resulting solution (without isolation and purification of PMMA-I) was added BzMA and PERKADOX16 (0.005 equivalents of BzMA), and then polymerization was carried out at 80° C. As a result, as the second block, random copolymerization of MMA (unpolymerized monomer at the time of the first block) and BzMA occurred to produce PMMA-block-(PMMA-random-PBzMA) having narrow molecular weight distribution (Table 15 (entry 1)). It should be noted that PBzMA stands for poly benzyl methacrylate.

stirred in dry acetone (100 mL) at 50° C. for two days. Chloroform was added thereto. Precipitated NaI (which contained NaBr) was filtered. The filtrate was dried in vacuum. 6-(2-iodo-2-isobutyloxy)hexyltriethoxysilane (IHE: Scheme 5) was obtained with yield of 98%.

Figure 7:
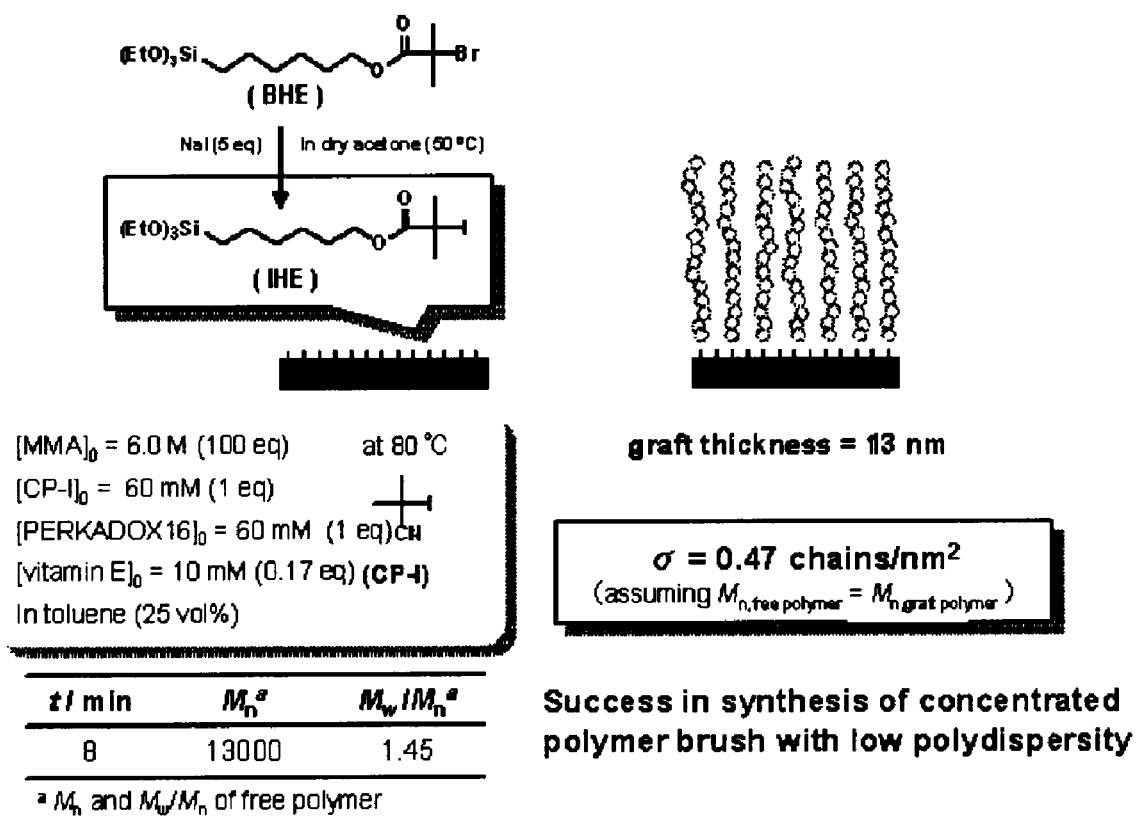
FIG. 7 illustrates surface-initiated graft polymerization with Vitamin E.

As illustrated in FIG. 7, a silicon substrate was immersed in a solution of IHE (1 wt %) and $NH_3$ (1 wt %) in tetrahydrofuran (THF) for 12 hours to immobilize IHE on the surface of the silicone substrate.

In a solution containing benzyl methacrylate (BzMA) (3 g (6 M)) as a monomer, toluene (1 g) as solvent, 2-cyanopropyl iodide (CP—I) (0.0585 g (60 mM)) as an alkyl iodide, di(4-tert-butylcyclohexyl)peroxydicarbonate (PERKADOX16) (0.120 g (60 mM)) as a radical initiator, and vitamin E (0.0161 g (10 mM)) as a catalyst, the silicon substrate, on which IHE was immobilized, was immersed. It was heated at 80° C. for 8 minutes (Table 16 (entry 1)). The free polymer (which was not immobilized on the substrate) produced in the solution had $M_n$, of 13,000, and PDI of 1.45. A polymer having narrow molecular weight distribution was obtained.

Film thickness of the graft polymer, which was grown from the surface of the substrate, was 13 nm. From previous cases it has been understood that a molecular weight and molecular weight distribution of a free polymer and those of a graft polymer are approximately the same. Accordingly, the surface density of the graft polymer was calculated as 0.48 chains/$nm^2$. This surface density is very high and reaches a

TABLE 15

BLOCK COPOLYMERIZATION OF METHYL METHACRYLATE (MMA) (HOMOPOLYMERIZATION: FIRST BLOCK) AND BENZYL METHACRYLATE (BZMA) (HOMOPOLYMERIZATION: SECOND BLOCK) WITH ALCOHOL (PRECURSOR-TYPE CATALYST)-SUCCESSIVE ADDITION OF MMA AND BZMA

| entry | First monomer (equivalent to [R—I]$_0$) | Second monomer (equivalent to [R—I]$_0$) | R—I | I | catalyst | Temperature (° C.) | [R—I]$_0$/ [I]$_0$/ [catalyst]$_0$/ [I$_2$]$_0$ (mM) (first block) | time (min) | conversion ratio (%) | $M_n$ ($M_{n,theo}$) | PDI |
|---|---|---|---|---|---|---|---|---|---|---|---|
| 1 | MMA (100 eq) (25 vol % toluene) | BzMA (100 eq) | CP—I | PERKADOX16 | NIS | 80 | 60/60/ 7.5/1.5 | 10 +10 | 21 +37 | 3400 (2100) 9700 (13600) | 1.29 1.37 |

Monomer: methyl methacrylate (MMA), benzyl methacrylate (BzMA)
Monomer concentration: 6M in the polymerization of the first monomer (solution polymerization (75 vol % monomer)).
Solvent: toluene (25 vol %) in the polymerization of the first monomer
Alkyl halide (R—I): 2-cyanopropyl iodide (CP—I)
Radical initiator (I): di(4-tert-butylcyclohexyl) peroxydicarbonate (PERKADOX16)
Catalyst: catechol
$M_n$ and PDI: Molecular weight and polydispersity obtained by gel permeation chromatography (GPC) with tetrahydrofuran (THF) as an eluent calibrated by poly(methyl methacrylate) (PMMA) standard

Example 16

Surface Graft Polymerization of Benzyl Methacrylate (BzMA) with Alcohol (Precursor-Type Catalyst) from a Surface of a Silicon Substrate 6-(2-bromo-2-isobutyloxy)hexyltriethoxysilane (BHE: Scheme 5) (6.2 g: 15 mmol) and NaI (11.23 g: 75 mmol) were concentrated region. As described above, a concentrated polymer brush (graft polymer layer in the concentrated region), whose molecular weight distribution is controlled, was successfully produced. Furthermore, when IHE was immobilized on the silicon substrate, by performing patterning (FIG. 5(a)) (Circles in FIG. 5(a) represent IHE), a two-dimensional pattern of the concentrated polymer brush was successfully formed (5(b)).

TABLE 16

SURFACE GRAFT POLYMERIZATION OF BENZYL METHACRYLATE (BZMA) WITH ALCOHOL
(PRECURSOR-TYPE CATALYST) FROM A SURFACE OF A SILICON SUBSTRATE

| entry | Monomer (equivalent to $[R-I]_0$) | Solvent | R—I | I | catalyst | Temperature (° C.) | $[R-I]_0/$ $[I]_0/$ $[catalyst]_0$ (mM) | time (min) | conversion ratio (%) | $M_n$ ($M_{n,theo}$) | PDI | σ (chains/ $nm^2$) |
|---|---|---|---|---|---|---|---|---|---|---|---|---|
| 1 | BzMA (100 eq) | toluene | CP—I and IHE immobilized on the silicon substrate | PERKADOX16 | Vitamin E | 80 | 60/60/10 | 8 | 80 | 13000 (14000) | 1.45 | 0.48 |

Monomer: benzyl methacrylate (BzMA)
Monomer concentration: 6M (solution polymerization (monomer 75 vol %))
Solvent: toluene
Alkyl halide (R—I): 2-cyanopropyl iodide (CP—I) and 6-(2-iodo-2-isobutyloxy)hexyltriethoxysilane (IHE) immobilized on the silicon substrate
Radical initiator (I): di(4-tert-butylcyclohexyl) peroxydicarbonate (PERKADOX16)
Catalyst: vitamin E
$M_n$ and PDI: Molecular weight and polydispersity obtained by gel permeation chromatography (GPC) with tetrahydrofuran (THF) as an eluent calibrated by poly(methyl methacrylate) (PMMA) standard Comparative Example 2

Polymerization experiments were performed similarly to Example 1, with the proviso that the following formulations were used:
Monomer: styrene, 8.0 M (1 g);
Alkyl halide: 1-phenylethyl bromide, 80 mM (0.016 g) (This is abbreviated as "PEB" in the following table);
Catalyst: CuBr 5 mM (0.00071 g); and
Ligand: 4,4'-di-(5-nonyl)-2,2'-bipyridine 10 mM (0.0035 g) (This is abbreviated as "dHbipy" in the following table).

A ligand is always required in order to dissolve CuBr (catalyst) in a monomer. In a case of dHbipy, two equivalents are required with respect to CuBr. The concentration of the catalyst in this experiment (CuBr complex concentration) was 5 mM. Please note that no peroxide was used in these experiments, since it was technical common knowledge of those skilled in the art that no peroxide is used in cases of copper complex catalysts. The reasons are as follows: (1) in the cases of copper complex catalysts, the radical reaction is initiated even if a peroxide is not used; and (2) if a peroxide is added to a copper complex catalyst, then an inactivation reaction of the growing species can occur significantly and as a result, the molecular weight distribution becomes broader. Specifically, for example, the aforementioned non-patent document 1 describes that a reaction material which contains no peroxide is used.

These materials were dissolved in a monomer to obtain a reaction solution. The reaction solution was heated to 80° C. The results are as follows.

TABLE 17

RESULTS OF POLYMERIZATION WITH A COPPER COMPLEX

| No. | XA | $[PEB]_0/$ $[CuBr/2$ $dHbipy]_0$ (mM) | Temperature (° C.) | time (h) | conversion ratio (%) | $M_n$ | PDI |
|---|---|---|---|---|---|---|---|
| 1 | CuBr | 80/5 | 80 | 2 | 1.8 | 1200 | 1.40 |
|   |      |      |    | 4 | 3.5 | 1300 | 1.40 |
|   |      |      |    | 8 | 6.0 | 1400 | 1.38 |

PEB: 1-phenylethylbromide
dHbipy: a ligand for dissolving CuBr into a monomer (styrene)

As a result, the monomer conversion was much lower than those of styrene in Example 1. Further, the values of $M_n$ after the reaction were 1200 to 1400, which are significantly low. Polystyrene having high molecular weight was not obtained. Furthermore, the values of $M_w/M_n$ (PDI) were much larger than the values in the experiments of Example 1 which uses the catalyst of the present invention. Therefore, the activity of the transition metal catalyst is significantly inferior to the activity of the catalyst of the present invention.

As can be seen from the comparison of the results of Comparative Example 2 and the results of Example 1, the catalyst of the present invention has a significantly higher activity than a transition metal complex catalyst used in the prior art.

The aforementioned Examples show that the present invention has superior properties in comparison with the catalysts of the prior art, which is disclosed in the prior art.

For example, according to the Example described in the aforementioned non-patent document 1, the following reaction solution is subjected to a reaction:
styrene: 8.7 M (1 g);
1-phenylethyl bromide: 87 mM (0.016 g);
CuBr: 87 mM (0.013 g); and
4,4'-di-(5-nonyl)-2,2'-bipyridine: 174 mM (0.076 g).

This reaction solution was heated to 110° C. for 7 hours, and a polymer was obtained. 0.089 g of the complex compound was used with respect to 1 g of the monomer. That is, the catalyst was used in a large amount of 8.9 weight % based on the monomer.

In comparison with this example, the present invention can significantly reduce the amount of catalyst used, and can also reduce the reaction temperature by 10 to 40° C., without the need for a ligand.

As described above, the present invention has been illustrated using the preferred embodiments of the present invention. However, the present invention should not be construed to be limited to these embodiments. It is understood that the scope of the present invention should be construed solely on the basis of the claims. It is understood that those skilled in the art can carry out an invention within the scope equivalent to the description of the specification, based on the description of the specific preferred embodiments, the description of the present invention and the common technical knowledge. It is understood that the patents, patent applications, and other documents cited in the present specification should be incorporated by reference in the present specification as if the contents thereof are specifically described herein.

Industrial Applicability As described above, the inventors obtained an invention of a new living radical polymerization method (a precisely controlled radical polymerization), which uses an oxygen atom as a central atom of a catalyst. The method is characterized by the low toxicity of the catalyst, low amount of the catalyst necessary, high solubility of the catalyst (a ligand is unnecessary), mild reaction conditions, no coloration, no odor (treatment after a polymerization reaction is unnecessary), and the like. The method is significantly more environment-friendly and economically advantageous than the conventional living radical polymerization methods.

One half or more of the amount of polymer compounds produced in the world is produced by radical polymerizations. A living radical polymerization method can be applied to the production of high value added material. Specifically, it can be used for production of, for example, thermoplastic elastomer (material for automobiles, industrial articles, medical materials, footwear, sports articles, toys, materials for coating electrical wire, materials for buildings or construction, materials for modifying resins, and the like), resist material, materials for organic electroluminescence device), adhesives, polymer alloy, various filler additives, lubricant, surfactant, paint, ink, packaging material, pharmaceuticals (for example, materials for sustained release medicaments), personal care products (cosmetics, hairdressings, and the like), and the like. The scale of the market is very large. The living radical polymerization of the present invention can be widely used as a satisfactory process for producing new material for electronics, material for optics, material for separation; or material for a living body.

A biggest problem in the prior art concerning the practical utilization of living radical polymerization has been the high cost of the catalyst. That is, when a living radical polymerization is carried out, the catalyst enters a state in which the catalyst has been incorporated into the resulting polymer, and therefore, it takes time and effort to recover the catalyst from the polymer. This, as a result, increases the process costs enormously, and is not practical. For this reason, it is difficult to practically recover and recycle the catalyst, and under the current situation, the catalyst is substantially used once and thrown away.

The inventors of the present invention discovered that inexpensive oxygen compounds act as excellent catalysts in a living radical polymerization, and thus realized living radical polymerization at far lower costs as compared with the conventional techniques. Specifically, when the cost of catalyst required in synthesizing 1 kg of a polymer is calculated based on the prices described in the catalogue of Sigma-Aldrich Company, for example, the cost of catalyst sums approximately to several thousand yens, with a copper complex catalyst that is most frequently used as a conventional type catalyst. Further, even if a germanium catalyst is used, the cost sums to about one thousand yens. On the other hand, in the present invention, the cost sums only to several ten yens, or even to several yens, when catalysts of oxygen iodides or nitrogen iodides are used. When catalysts of far more inexpensive chlorides or the like are used, the cost for catalyst is further reduced. When far more inexpensive hydrides (alcohol) are used, the cost for catalyst is still further reduced. For example, in the case of the catalyst of an alcohol-type compound described in the examples, the cost sums only to several yens to several hundredths of a yen. In other words, according to the present invention, it is possible to reduce the cost by significant differences, as compared with the conventional catalysts.

Upon considering that the prices of various general-purpose monomers are generally around 100 yens to several hundred yens per kilogram, a cost for catalyst that is about ten times the cost for monomer, has been needed in the conventional techniques. In this regard, the present invention requires a cost for catalyst that is only about one-tenth or about one-hundredth of the cost for monomer, and thus the cost reducing effect is dramatic.

In addition, the advantages possessed by germanium catalysts, such as low toxicity (or non-toxicity) of catalyst, high dissolubility (no need of ligand), mild reaction conditions, no coloration/no odor (no need of treatment after polymerization reaction), are all possessed by the catalyst and catalyst precursor of the present invention having oxygen as the central element. Furthermore, a polymerization can be controlled with an amount of catalyst that is far lower (for example, down to one-third) than the small amount of catalyst realized by germanium catalysts. Although germanium catalysts (iodides) are somehow weak to moisture and light, the catalyst and catalyst precursor having oxygen as the central element are very strong to moisture and light, and further facilitate the operation of polymerization. As such, the present invention exhibits high environmental safety which is not possessed by conventional processes, as well as excellent economic efficiency and superior convenience that exceed the conventional techniques by far, and is highly excellent in practicality.

The invention claimed is:

1. A method of conducting a living radical polymerization, comprising:
   reacting a radical generated from a radical initiator and a catalyst precursor compound to form an activated radical; and
   polymerizing a monomer having a radical reactive unsaturated bond using the activated radical to obtain a polymer;
   wherein the precursor compound comprises at least one hydroxyl group bonded to carbon, silicon, nitrogen, or phosphorus,
   a radical generated from the radical initiator abstracts a hydrogen atom from the hydroxyl group in the precursor compound to form the activated radical, and
   the activated radical acts as a living radical catalyst of the polymerization reaction of the monomer,
   wherein an organic halide having a carbon-halogen bond is used in the living radical polymerization reaction, and a halogen given from the organic halide is used as a protecting group of a growing chain.

2. The method according to claim 1, wherein an atom bonded to the hydroxyl group is carbon.

3. The method according to claim 1, wherein the atom bonded to the hydroxyl group has a double bond or triple bond between the atom and an adjacent atom, and an activated radical formed after the hydrogen of the hydroxyl group is abstracted is stabilized by the resonance between the radical and the double bond or triple bond.

4. The method according to claim 1, wherein the catalyst precursor compound is alcohol or phenol represented by the formula (I):

$$R^1{}_n(OH)_m \qquad (I)$$

wherein
R$^1$ is substituted or unsubstituted alkyl, alkenyl, or alkynyl, substituted or unsubstituted aryl, or substituted or unsubstituted heteroaryl;

n is a positive integer;

m is a positive integer;

wherein the substituent is alkyl, alkenyl, alkylcarboxyl, haloalkyl, alkylcarbonyl, amino, cyano, alkoxy, aryl, or alkyl-substituted aryl;

a carbon chain in $R^1$ has a chain structure or cyclic structure; and when $R^1$ has a cyclic structure, the cyclic structure may be a fused cyclic structure in which one or more rings are fused to an aryl or heteroaryl ring, wherein one or more cyclic structures fused to the aryl or heteroaryl ring may be a heterocycle containing an oxygen or nitrogen atom as a heteroatom.

5. A catalyst for a living radical polymerization method, which consists of a compound comprising: at least one central element which is oxygen; a halogen atom bonded to the central element; and a carbon atom, silicon atom, nitrogen atom or phosphorus atom bonded to the central element.

6. The catalyst according to claim 5, wherein the central element is bonded to a halogen atom and a carbon atom.

7. The catalyst according to claim 5, wherein the catalyst has a structure in which an atom bonded to the central element has a double bond or triple bond between the atom and an adjacent atom, and an activated radical formed after the halogen atom bonded to the central element is eliminated is stabilized by the resonance between the radical and the double bond or triple bond.

8. The catalyst according to claim 5, which consists of a compound of the following general formula (Ia):

$$R^1{}_n(OX^1)_m \qquad (Ia)$$

wherein $R^1$ is alkyl, alkylcarboxyl, haloalkyl, alkylcarbonyl, alkenyl, alkynyl, aryl, heteroaryl, substituted aryl, or substituted heteroaryl, n is a positive integer;

m is a positive integer;

$X^1$ is halogen.

9. The catalyst according to claim 5, wherein the halogen is iodine or bromine.

10. The catalyst according to claim 5, wherein the halogen is iodine.

11. A polymerization method comprising conducting a living radical polymerization, wherein the living radical polymerization step is conducted in the presence of the catalyst according to claim 5.

12. The method according to claim 1, wherein a concentration of the catalyst in a reaction solution is 0.75 wt % or less.

13. The method according to claim 1, wherein a reaction temperature is 20 to 100° C.

14. The method according to claim 1, wherein two or three carbon atoms are bonded to the carbon atom to which the halogen in the organic halide is bonded.

* * * * *